(12) United States Patent
Tokuda et al.

(10) Patent No.: US 9,553,333 B2
(45) Date of Patent: Jan. 24, 2017

(54) NONAQUEOUS ELECTROLYTIC SOLUTION AND NONAQUEOUS ELECTROLYTE SECONDARY BATTERY

(71) Applicant: MITSUBISHI CHEMICAL CORPORATION, Chiyoda-ku (JP)

(72) Inventors: Hiroyuki Tokuda, Yokohama (JP); Shuhei Sawa, Inashiki-gun (JP); Minoru Kotato, Inashiki-gun (JP); Kunihisa Shima, Yokkaichi (JP); Youichi Ohashi, Inashiki-gun (JP); Koji Fukamizu, Inashiki-gun (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 591 days.

(21) Appl. No.: 13/842,473

(22) Filed: Mar. 15, 2013

(65) Prior Publication Data

US 2013/0216919 A1 Aug. 22, 2013

Related U.S. Application Data

(63) Continuation of application No. PCT/JP2011/060926, filed on May 12, 2011.

(30) Foreign Application Priority Data

Sep. 16, 2010 (JP) ................................. 2010-208444
Apr. 21, 2011 (JP) ................................. 2011-095370

(51) Int. Cl.
*H01M 10/0567* (2010.01)
*H01M 10/052* (2010.01)
*H01M 10/056* (2010.01)
*H01M 10/42* (2006.01)

(52) U.S. Cl.
CPC ....... *H01M 10/0567* (2013.01); *H01M 10/052* (2013.01); *H01M 10/056* (2013.01); *H01M 10/4235* (2013.01); *Y02E 60/122* (2013.01)

(58) Field of Classification Search
CPC ................ H01M 10/0567; H01M 10/4235; H01M 10/052; Y02E 60/122
See application file for complete search history.

(56) References Cited

U.S. PATENT DOCUMENTS

| | | |
|---|---|---|
| 5,626,981 A | 5/1997 | Simon et al. |
| 6,479,191 B1 | 11/2002 | Hamamoto et al. |
| 6,670,078 B1 | 12/2003 | Sato et al. |
| 2005/0084765 A1* | 4/2005 | Lee .................. H01M 10/0567 429/329 |
| 2006/0246356 A1 | 11/2006 | Abe et al. |
| 2009/0053598 A1 | 2/2009 | Abe et al. |
| 2009/0061303 A1 | 3/2009 | Inagaki et al. |
| 2009/0253044 A1 | 10/2009 | Nogi et al. |
| 2010/0239919 A1 | 9/2010 | Abe et al. |
| 2013/0071730 A1 | 3/2013 | Tokuda et al. |
| 2013/0071731 A1 | 3/2013 | Tokuda et al. |

FOREIGN PATENT DOCUMENTS

| | | |
|---|---|---|
| CN | 101107745 A | 1/2008 |
| CN | 101373848 A | 2/2009 |
| CN | 102893441 A | 1/2013 |
| CN | 102893442 A | 1/2013 |
| EP | 1 508 934 A1 | 2/2005 |
| EP | 1 650 826 A1 | 4/2006 |
| EP | 1 758 198 A1 | 2/2007 |
| EP | 1 772 924 A1 | 4/2007 |
| JP | 4-087156 | 3/1992 |
| JP | 7-176322 | 7/1995 |
| JP | 8-45545 | 2/1996 |
| JP | 11-162511 | 6/1999 |
| JP | 2000-040526 | 2/2000 |
| JP | 2002-100399 A | 4/2002 |
| JP | 2002-110234 A | 4/2002 |
| JP | 2002-124297 A | 4/2002 |
| JP | 2005-235591 | 9/2005 |
| JP | 2006-164759 | 6/2006 |
| JP | 2007-042329 | 2/2007 |

(Continued)

OTHER PUBLICATIONS

International Search Report issued Aug. 23, 2011 in PCT/JP2011/060926 filed May 12, 2011.

(Continued)

*Primary Examiner* — Laura Weiner
(74) *Attorney, Agent, or Firm* — Oblon, McClelland, Maier & Neustadt, L.L.P.

(57) ABSTRACT

Provided are a nonaqueous electrolyte solution having improved durability properties in terms of cycling, storage and the like and improved discharge characteristic at a high current density, and a nonaqueous electrolyte battery that uses that nonaqueous electrolyte solution. The nonaqueous electrolyte solution containing a lithium salt and a nonaqueous solvent that dissolves the lithium salt, wherein the nonaqueous electrolyte solution contains a compound represented by formula (1) and at least one compound selected from the group consisting of a compound having a cyano group, a cyclic ester compound having a sulfur atom and a compound having an isocyanate group.

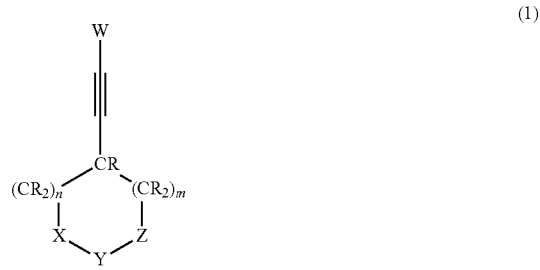

(1)

8 Claims, No Drawings

(56) References Cited

FOREIGN PATENT DOCUMENTS

| | | |
|---|---|---|
| JP | 2007-242496 | 9/2007 |
| JP | 2010-118355 | 5/2010 |
| JP | 2010-192457 | 9/2010 |
| WO | 2006/077763 | 7/2006 |

OTHER PUBLICATIONS

Office Action issued Jul. 1, 2015 in European Patent Application No. 11 824 833.5.
International Preliminary Report on Patentability issued Apr. 18, 2013 in PCT/JP2011/060926.
English Translation of the Written Opinion of the International Searching Authority issued Aug. 23, 2011 in PCT/JP2011/060926.
U.S. Appl. No. 14/523,094, filed Oct. 24, 2014, Tokuda, et al.
Office Action and Search Report issued on Nov. 3, 2014 in the corresponding Chinese Patent Application No. 201180043857.6 (with English Translation).
Office Action as received in the corresponding European Application No. 11 824 833.5-1360 dated Feb. 3, 2016.
European Office Action issued Jul. 14, 2016 in European Patent Application No. 11 824 833.5.
Extended European Search Report issued Jan. 7, 2014 in Patent Application No. 11824833.5.

* cited by examiner

NONAQUEOUS ELECTROLYTIC SOLUTION AND NONAQUEOUS ELECTROLYTE SECONDARY BATTERY

CROSS-REFERENCE TO RELATED APPLICATIONS

This is a continuation of International Application PCT/JP2011/060926, filed on May 12, 2011, and designated the U.S., (and claims priority from Japanese Patent Applications 2010-208444 which was filed on Sep. 16, 2010 and 2010-169176 which was filed on Jul. 28, 2010, 2011-095370 which was filed on Apr. 21, 2011) the entire contents of which are incorporated herein by reference.

TECHNICAL FIELD

The present invention relates to a nonaqueous electrolyte solution and to a nonaqueous electrolyte secondary battery. More particularly, the present invention relates to a nonaqueous electrolyte solution containing a specific cyclic compound having a carbon-carbon triple bond, and containing also one or more compounds from among a compound having a cyano group, a cyclic ester compound comprising a sulfur atom and a compound having an isocyanate group.

BACKGROUND ART

Nonaqueous electrolyte secondary batteries, such as lithium secondary batteries, are being used as a wide variety of power sources, ranging from power sources for so-called portable electronic devices such as mobile phones and notebooks, to large stationary power sources as well as automotive power sources for driving, in automobiles or the like. However, the demands placed on the secondary batteries that are used have become ever more challenging in recent years, accompanying the higher performances of electronic devices and the growing use of secondary batteries as automotive power sources for driving and as large stationary power sources. It is now required that the characteristics of secondary batteries afford high battery performance levels in terms of, for instance, higher capacity, and improved high-temperature storage characteristic and cycle characteristic.

Ordinarily, the electrolyte solutions that are used in nonaqueous electrolyte solution lithium secondary batteries are mainly made up of an electrolyte and a nonaqueous solvent. Examples of the main component of the nonaqueous solvent include, for instance, cyclic carbonates such as ethylene carbonate or propylene carbonate; linear carbonates such as dimethyl carbonate, diethyl carbonate or ethyl methyl carbonate; and cyclic carboxylic acid esters such as γ-butyrolactone, γ-valerolactone or the like.

Various nonaqueous solvents, electrolytes and additives, such as auxiliary agents, have been proposed in order to improve battery characteristics such as the load characteristic, cycle characteristic, storage characteristic and low-temperature characteristic of the battery in which the nonaqueous electrolyte solution is used. For instance, Patent Documents 1 and 2 disclose nonaqueous electrolytes that utilize a carbon material in the negative electrode, wherein a good coating film is formed, on the surface of the negative electrode, through a preferential reaction of a cyclic carbonate having a double bond with the negative electrode, by using a vinylene carbonate and derivatives thereof, or vinylethylene carbonate derivatives. The storage characteristic and the cycle characteristic of the battery are enhanced as a result. Patent Documents 3 and 4 disclose the feature of enhancing the storage characteristic and cycle characteristic of a battery by adding a compound having a cyano group or 1,3-propanesultone to a nonaqueous electrolyte solution.

Patent Document 1: Japanese Patent Application Publication No. H8-45545
Patent Document 2: Japanese Patent Application Publication No. H4-87156
Patent Document 3: Japanese Patent Application Publication No. H7-176322
Patent Document 4: Japanese Patent Application Publication No. H11-162511

DISCLOSURE OF THE INVENTION

As mentioned above, the characteristics of lithium secondary batteries, specifically higher capacity and improved high-temperature storage characteristic, cycle characteristic and so forth, call for ongoing improvement given the relentless demand for higher performance in secondary batteries in recent years.

Against this background, problems have arisen in nonaqueous electrolyte batteries that use the electrolyte solutions set forth in Patent Documents 1 and 2, namely generation of carbon dioxide through oxidative decomposition of an unsaturated cyclic carbonate or a derivative thereof, on the positive electrode, when the battery is left to stand at high temperature, in a charged state, or upon continuous charge-discharge cycles. Generation of carbon dioxide under such usage environments may trigger the operation of a safety valve of the battery, or may render the battery itself unusable on account of battery swelling or the like.

Oxidative decomposition of an unsaturated cyclic carbonate on the positive electrode is also problematic on account of generation of solid-state decomposition products, in addition to generation of carbon dioxide. Generation of such solid decomposition products may cause clogging of electrode layers and separators, and may inhibit lithium ion migration as a result. The solid decomposition products may also remain on the electrode active material surface, thereby inhibiting the intercalation and deintercalation reactions of the lithium ions. As a result, this may lead to a gradual drop in charge-discharge capacity during a continuous charge-discharge cycle, to a drop in charge-discharge capacity below the initial charge-discharge capacity, upon high-temperature storage of the battery or continuous charge-discharge cycles, or to a drop in load characteristic.

Oxidative decomposition of unsaturated cyclic carbonates on the positive electrode has become a particularly serious problem in the design of high-performance secondary batteries in recent years. Oxidative decomposition tends to become pronounced when the potential at which lithium becomes intercalated and deintercalated in the positive electrode active material rises above the redox potential of lithium. For instance, these oxidation reactions become particularly noticeable when the battery is operated at a higher voltage than 4.2 V, which is the battery voltage upon full charge of currently commercially-available secondary batteries.

Other methods under study for enhancing the capacity of nonaqueous electrolyte batteries involve cramming as much active material as possible within the limited battery volume. In batteries thus designed so that the density of the active material layers of the electrodes are made denser through pressing, or so that the occupied volume in the battery, other than the volume of the active material, is reduced to the utmost, voids become fewer in the interior of the battery, and hence, the internal pressure of the battery rises significantly, on account of even small amounts of gas generated through oxidative decomposition. This rise in pressure may trigger the operation of a safety valve or may render the battery itself unusable on account of battery swelling or the like.

In addition, the nonaqueous electrolyte battery that uses the electrolyte solution disclosed in Patent Documents 1 and 2 had the problem of lowered charge and discharge characteristics at high current density, since the resistance of the negative electrode coating was substantial.

And problems arose in that sufficient storage and cycle characteristics cannot be elicited on account of degradation caused by side reactions on the electrode, even when the nonaqueous electrolyte comprises the additives set forth in Patent Documents 3 and 4.

The present invention provides a nonaqueous electrolyte battery that solves the above-described various problems that arise when attempting to attain the performance that has come to be required of secondary batteries in recent years. In particular, the present invention provides a nonaqueous electrolyte battery having improved durability properties in terms of cycling, storage and the like, and improved discharge characteristic at high current density.

As a result of diligent research directed at solving the above problems, the inventors found that a nonaqueous electrolyte secondary battery having improved durability properties in terms of cycling, storage and the like could be realized by incorporating a compound represented by formula (1), and any one or more compounds from among a compound having a cyano group, a cyclic ester compound comprising a sulfur atom and a compound having an isocyanate group, into a nonaqueous electrolyte solution that is used in a nonaqueous electrolyte battery, and perfected the present invention on the basis of that finding.

The gist of the present invention is as follows.

a) A nonaqueous electrolyte solution containing a lithium salt and a nonaqueous solvent that dissolves the lithium salt, wherein the nonaqueous electrolyte solution contains a compound represented by formula (1) and at least one compound selected from the group consisting of a compound having a cyano group, a cyclic ester compound having a sulfur atom and a compound having an isocyanate group.

[Chem. 1]

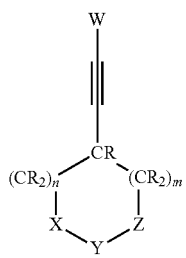

(1)

(In formula (1), X and Z, which may be identical or dissimilar, represent $CR^1_2$, C=O, C=N—$R^1$, C=P—$R^1$, O, S, N—$R^1$ and P—$R^1$; Y represents $CR^1_2$, C=O, S=O, $S(=O)_2$, P(=O)—$R^2$ and P(=O)—$OR^3$. In formula (1), R and $R^1$, which may be mutually identical or dissimilar, are each hydrogen, a halogen or a C1 to C20 hydrocarbon group optionally having a functional group; $R^2$ is a C1 to C20 hydrocarbon group optionally having a functional group; $R^3$ is Li, $NR^4_4$ or a C1 to C20 hydrocarbon group optionally having a functional group; $R^4$ are mutually identical or dissimilar C1 to C20 hydrocarbon groups optionally having a functional group; and n and m are integers equal to or greater than 0; adjacent endocyclic carbons may form further bonds with each other, whereupon respective R of the carbons is decreased by one; and W has the same ranges as R, and may be identical to or dissimilar from R.)

b) The nonaqueous electrolyte solution according to a), wherein the compound represented by formula (1) is a compound represented by formula (2).

[Chem. 2]

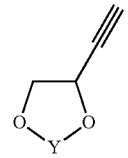

(2)

(In formula (2) Y represents C=O, S=O, $S(=O)_2$, P(=O)—$R^2$ and P(=O)—$OR^3$; $R^2$ is a C1 to C20 hydrocarbon group optionally having a functional group; $R^3$ is Li, $NR^4_4$ or a C1 to C20 hydrocarbon group optionally having a functional group; and $R^4$, which are mutually identical or dissimilar, are C1 to C20 hydrocarbon groups optionally having a functional group.)

c) The nonaqueous electrolyte solution according to a) or b), wherein the compound having a cyano group is a compound represented by formula (3).

[Chem. 3]

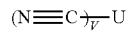

(3)

(In formula (3), U is a C1 to C10 V-valent organic group comprising atoms selected from the group consisting of carbon atoms, hydrogen atoms, nitrogen atoms, oxygen atoms, sulfur atoms, phosphorus atoms and halogen atoms; and V is an integer equal to or greater than 1.)

d) The nonaqueous electrolyte solution according to c) wherein the compound having a cyano group is a compound represented by NC—$(CH_2)_n$—CN (n=2 to 6).

e) The nonaqueous electrolyte solution according to any one of a) to d), wherein the cyclic ester compound having a sulfur atom is a compound represented by formula (4).

[Chem. 4]

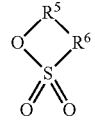

(4)

(In formula (4), $R^5$ and $R^6$ represent each independently a C1 to C10 organic group comprising atoms selected from the group consisting of carbon atoms, hydrogen atoms, nitrogen atoms, oxygen atoms, sulfur atoms, phosphorus atoms and halogen atoms; and $R^5$ and $R^6$ may mutually include —O—$SO_2$— and an unsaturated bond.)

f) The nonaqueous electrolyte solution according to any one of a) to e), wherein the compound having an isocyanate group is a compound represented by formula (5).

[Chem. 5]

$$A(-NCO)_{n'} \quad (5)$$

(In the formula, A represents a C1 to C20 organic group comprising atoms selected from the group consisting of hydrogen atoms, carbon atoms, nitrogen atoms, oxygen atoms, sulfur atoms, phosphorus atoms and halogen atoms; and n' is an integer equal to or greater than 2.)

g) The nonaqueous electrolyte solution according to a) to f), wherein the nonaqueous electrolyte solution contains at least one compound selected from the group consisting of a cyclic carbonate having a carbon-carbon double bond and a cyclic carbonate having a fluorine atom.

h) A nonaqueous electrolyte battery that comprises a negative electrode and a positive electrode that are capable of absorbing and releasing lithium ions, and a nonaqueous electrolyte solution, wherein the nonaqueous electrolyte solution is the nonaqueous electrolyte solution according to any one of a) to g).

One of the characterizing features of the present invention is the use, in a nonaqueous electrolyte battery, of a compound in which a carbon-carbon triple bond is bonded to a ring structure via a single bond, and not via some other functional group or heteroelement, together with any one or more compounds from among a compound having a cyano group, a cyclic ester compound comprising a sulfur atom and a compound having an isocyanate group. As exemplified in Patent Documents 1 to 2, many materials that enhance battery durability, for instance in terms of storage characteristic and cycle characteristic, through protection of electrode surfaces, are compounds that have a cyclic structure and that have also multiple bonding sites. Focusing on that feature, the inventors conducted detailed studies on binding sites of functional groups and heteroelements in a ring structure, on sites at which multiple bonds bind to a ring structure, and on the hybridization state of electron orbitals of multiple-bond moieties. As a result, the inventors found that compounds in which a multiple bond is bonded to a ring structure exhibit superior stability with the positive electrode than compounds in which part of the ring skeleton that makes up the cyclic compound is in the form of a multiple bond, and found that bonding of carbon-carbon triple-bond substituents to the ring structure resulted in better durability properties than in the case of carbon-carbon double bonds. The above-described problem could thus be solved. Using by itself a compound having a cyano group, a cyclic ester compound comprising a sulfur atom or a compound having an isocyanate group, results ordinarily in enhanced battery characteristics, but results also in electrode degradation on account of side reactions. This was problematic in that, accordingly, the storage characteristic and cycle characteristic of the battery were inadequate, even if these compounds are present, as additives, in the nonaqueous electrolyte. Focusing on this issue, the inventors found that side reactions by these additives on the electrodes could be suppressed in a specific manner, and that the storage characteristic of the secondary battery could be improved, by concomitantly using, in a nonaqueous electrolyte solution, any one or more compounds from among a compound having a cyano group, a cyclic ester compound comprising a sulfur atom and a compound having an isocyanate group, together with the abovementioned carbon-carbon triple bond compound, and perfected the present invention on the basis of that finding.

By using the present invention, a nonaqueous electrolyte battery is provided that has improved load characteristic and durability properties, in terms of cycling, storage and the like, in the design, in particular, of lithium secondary batteries of higher capacity and for higher voltages.

BEST MODE FOR CARRYING OUT THE INVENTION

Embodiments of the present invention are explained in detail next, but the present invention is not limited to these embodiments, and may be carried out in various ways.

1. Nonaqueous Electrolyte Solution
1-1. Electrolyte
<Lithium Salt>

A lithium salt is ordinarily used as the electrolyte. The electrolyte is not particularly limited and any lithium salt can be used, so long as it is a known lithium salt that is utilized in the application in question. Specific examples of the lithium salt are given below.

For instance, inorganic lithium salts such as $LiPF_6$, $LiBF_4$, $LiClO_4$, $LiAlF_4$, $LiSbF_6$, $LiTaF_6$, $LiWF_7$ or the like;

lithium fluorophosphates such as $Li_2PO_3F$, $LiPO_2F_2$ or the like;

lithium tungstates such as $LiWOF_5$;

lithium carboxylate salts such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, $CF_3CF_2CF_2CF_2CO_2Li$ or the like;

lithium sulfonate salts such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, $CF_3CF_2CF_2CF_2SO_3Li$ or the like;

lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiN(CF_3SO_2)(C_4F_9SO_2)$ or the like;

lithium methide salts such as $LiC(FSO_2)_3$, $LiC(CF_3SO_2)_3$, $LiC(C_2F_5SO_2)_3$ or the like;

lithium oxalatoborate salts such as lithium difluorooxalatoborate, lithium bis(oxalate)borate or the like;

lithium oxalatophosphate salts such as lithium tetrafluorooxalatophosphate, lithium difluorobis(oxalate)phosphate, lithium tris(oxalate)phosphate; and fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, $LiBF_2(C_2F_5SO_2)_2$ or the like.

Particularly preferred among the foregoing are $LiPF_6$, $LiBF_4$, $LiSbF_6$, $LiTaF_6$, $LiPO_3F$, $LiPO_2F_2$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethanedisulfonylimide, lithium cyclic 1,3-perfluoropropanedisulfonylimide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, $LiPF_3(C_2F_5)_3$ and the like, in terms of the effect of enhancing the output characteristic, high-rate charge-discharge characteristic, high-temperature storage characteristic, cycle characteristic and the like.

The above lithium salts may be used singly or concomitantly in combinations of two or more types. Preferred examples of two or more types being used concomitantly include, for instance, $LiPF_6$ and $LiBF_4$; $LiPF_6$ and $FSO_3Li$; $LiPF_6$ and $LiPO_2F_2$; $LiPF_6$ and $LiN(FSO_2)_2$; $LiPF_6$ and $LiN(CF_3SO_2)_2$; $LiPF_6$ and lithium bisoxalatoborate; $LiPF_6$ and lithium difluorooxalatoborate; $LiPF_6$ and lithium tetrafluorooxalatophosphate; $LiPF_6$ and lithium difluorobis(oxalato)phosphate; $LiPF_6$ and lithium tris(oxalato)phosphate; $LiPF_6$, $FSO_3Li$ and $LiPO_2F_2$; $LiPF_6$, $FSO_3Li$ and lithium bis(oxalato)borate; $LiPF_6$, $FSO_3Li$ and lithium tetrafluorooxalatophosphate; $LiPF_6$, $FSO_3Li$ and lithium difluorobis(oxalato)phosphate; $LiPF_6$, $FSO_3Li$ and lithium tris(oxalato)phosphate; $LiPF_6$, $LiPO_2F_2$ and lithium bis(oxalato)borate; $LiPF_6$, $LiPO_2F_2$ and lithium tetrafluorooxalatophosphate; $LiPF_6$, $LiPO_2F_2$ and lithium difluorobis(oxalato)phosphate; $LiPF_6$, $LiPO_2F_2$ and lithium tris(oxalato)phosphate. The load characteristic and the cycle characteristic are thus enhanced as a result.

Particularly preferred among the foregoing is the concomitant use of, for instance, $LiPF_6$ and $FSO_3Li$; $LiPF_6$ and $LiPO_2F_2$; $LiPF_6$ and lithium bis(oxalato)borate; $LiPF_6$ and lithium tetrafluorooxalatophosphate; $LiPF_6$ and lithium tris(oxalato)phosphate; $LiPF_6$ and lithium difluorobis(oxalato)phosphate; $LiPF_6$, $FSO_3Li$ and $LiPO_2F_2$; $LiPF_6$, $FSO_3Li$ and lithium bis(oxalato)borate; $LiPF_6$, $LiPO_2F_2$ and lithium bis (oxalato)borate; $LiPF_6$ and $FSO_3Li$ and lithium tris(oxalato) phosphate; $LiPF_6$ and $FSO_3Li$ and lithium difluorobis(oxalato)phosphate; $LiPF_6$, $FSO_3Li$ and lithium tetrafluorooxalatophosphate; $LiPF_6$, $LiPO_2F_2$ and lithium tris(oxalato)phosphate; and $LiPF_6$, $LiPO_2F_2$ and lithium difluorobis(oxalato)phosphate; $LiPF_6$, $LiPO_2F_2$ and lithium tetrafluorooxalatophosphate, since the effect elicited thereby is pronounced in such cases.

In a case where $LiPF_6$ is used concomitantly with $LiBF_4$, $LiPO_2F_2$, $FSO_3Li$, $LiN(FSO_2)_2$, $LiN(CF_3SO_2)_2$, lithium bis(oxalato)borate, lithium difluorooxalatoborate, lithium tetrafluorooxalatophosphate, lithium difluorobis(oxalato)phosphate, lithium tris(oxalato)phosphate or the like, the blending amount of $LiBF_4$, $LiPO_2F_2$, $FSO_3Li$, $LiN(FSO_2)_2$, $LiN(CF_3SO_2)_2$, lithium bis(oxalato)borate, lithium difluorooxalatoborate, lithium tetrafluorooxalatophosphate, lithium difluorobis(oxalato)phosphate, lithium tris(oxalato)phosphate or the like with respect to 100 wt % of total nonaqueous electrolyte solution is not particularly limited, so long as the effect of the present invention is not significantly impaired thereby, but is ordinarily 0.01 wt % or more, preferably 0.1 wt % or more with respect to the nonaqueous electrolyte solution of the present invention, and the upper limit is ordinarily 12 wt % or less, preferably 10 wt % or less. Within these ranges there are enhanced the effects on output characteristic, load characteristic, low-temperature characteristic cycle characteristic, high-temperature characteristic and the like. If the blending amount is excessive, battery characteristics may be impaired on account of precipitation at low temperature, while an excessively small content may result in a lowered effect on enhancing the low-temperature characteristic, cycle characteristic, high-temperature storage characteristic and so forth.

The preparation of the electrolyte solution containing $LiPO_2F_2$ may involve a method wherein $LiPO_2F_2$, synthesized separately in accordance with a known method, is added to an electrolyte solution comprising $LiPF_6$, or an method wherein water is caused to be present among battery constituent elements such as the below-described active material, electrode plate and so forth; thereupon $LiPO_2F_2$ is generated within the system, during assembly of the battery, by using an electrolyte solution that comprises $LiPF_6$. Both methods may be used in the present invention.

The method for measuring the content of $LiPO_2F_2$ in the nonaqueous electrolyte solution and nonaqueous electrolyte battery is not particularly limited, and any known method may be used. Specific examples include, for instance, ion chromatography or F nuclear magnetic resonance spectroscopy (hereafter also shortened to NMR).

The concentration of these lithium salts in the nonaqueous electrolyte solution is not particularly limited, so long as the effect of the present invention is not impaired by the content of the lithium salt. However, the total molar concentration of the lithium salt in the nonaqueous electrolyte solution is preferably 0.3 mol/L or higher, more preferably 0.4 mol/L or higher, and yet more preferably 0.5 mol/L or higher, and preferably 3 mol/L or lower, more preferably 2.5 mol/L or lower, and yet more preferably 2.0 mol/L or lower, in terms of securing the favorable electrical conductivity of the electrolyte solution to improve the battery performance. If the total molar concentration of lithium is excessively low, the electrical conductivity of the electrolyte solution may be insufficient in some instances. If the concentration is excessively high, on the other hand, viscosity becomes higher, and hence electric conductance may decrease, and battery performance may decrease.

1-2. Solvent

As the nonaqueous solvent there can be used saturated cyclic carbonates, cyclic carbonates having a fluorine atom, linear carbonates, cyclic and linear carboxylates, ether compounds, sulfone compounds and the like. These nonaqueous solvents may be used in arbitrary combinations.

<Saturated Cyclic Carbonate>

Examples of saturated cyclic carbonates include, for instance, saturated cyclic carbonates having a C2 to C4 alkylene group. Specific examples of C2 to C4 saturated cyclic carbonates include, for instance, ethylene carbonate, propylene carbonate, butylene carbonate and the like. Particularly preferred among the foregoing are ethylene carbonate and propylene carbonate, in terms of enhancing battery characteristics as a result of an enhanced degree of dissociation of lithium ions.

The saturated cyclic carbonate may be used singly as one type, or as two or more concurrent types in any combinations and ratios.

The blending amount of the saturated cyclic carbonate is not particularly limited, and may be any blending amount so long as the effect of the present invention is not significantly impaired thereby. In a case where one type of saturated cyclic carbonate is used singly, the lower limit of the blending amount is 5 vol % or more, and more preferably 10 vol % or more, with respect to 100 vol % of nonaqueous solvent. Through setting of this range, drops in electrical conductivity derived from decreased permittivity of the nonaqueous electrolyte solution are readily avoided, and the large-current discharge characteristic, stability towards the negative electrode and cycle characteristic of the nonaqueous electrolyte battery are readily brought to within good ranges. The upper limit is 95 vol % or less, more preferably 90 vol % or less, and yet more preferably 85 vol % or less. By setting these ranges, the viscosity of the nonaqueous electrolyte solution is brought to within an appropriate range and drops in ion conductance are suppressed; accordingly, the load characteristic of the nonaqueous electrolyte secondary battery is readily brought to within a good range.

<Cyclic Carbonate Having a Fluorine Atom>

The cyclic carbonate having a fluorine atom (hereafter also referred to as fluorinated cyclic carbonate) is not particularly limited, so long as it is a cyclic carbonate that has a fluorine atom.

Examples of fluorinated cyclic carbonates include, for instance, derivatives of cyclic carbonates having a C2 to C6 alkylene group, for instance ethylene carbonate derivatives. Examples of ethylene carbonate derivatives include, for instance, fluorinated products of ethylene carbonate and of ethylene carbonate that is substituted with an alkyl group (for instance, a C1 to C4 alkyl group). Preferred among the foregoing are ethylene carbonate derivatives having 1 to 8 fluorine atoms.

Specific examples include, for instance, monofluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate and the like.

More preferably, there is used at least one compound selected from the group consisting of monofluoroethylene carbonate, 4,4-difluoroethylene carbonate, 4,5-difluoroethylene carbonate and 4,5-difluoro-4,5-dimethylethylene carbonate, in terms of imparting high ionic conductivity and forming an appropriate interface protective coating.

The fluorinated cyclic carbonate may be used singly as one type, or as two or more concurrent types in any combinations and ratios. The blending amount of the fluorinated cyclic carbonate is not particularly limited, and may be any blending amount, so long as the effect of the present invention is not significantly impaired thereby. Preferably, the blending amount is 0.01 vol % or greater, more preferably 0.1 vol % or greater, and yet more preferably 0.2 vol % or greater, and preferably 90 vol % or smaller, more preferably 70 vol % or smaller and yet more preferably 60 vol % or smaller, with respect to 100 vol % of nonaqueous solvent. The fluorinated cyclic carbonate functions not only as a solvent, but also as the "auxiliary agent" set forth in the below section 1-5. When the fluorinated cyclic carbonate functions as a solvent, the blending amount thereof is preferably 5 vol % or greater, more preferably 7 vol % or greater, and yet more preferably 8 vol % or greater, and preferably 90 vol % or smaller, more preferably 70 vol % or smaller and yet more preferably 60 vol % or smaller, with respect to 100 vol % of nonaqueous solvent. Within these ranges, there can be suppressed side decomposition reactions in the nonaqueous electrolyte solution upon high-voltage operation of the battery, battery durability can be enhanced, and extreme drops in the electrical conductivity of the nonaqueous electrolyte solution can be suppressed. If the fluorinated cyclic carbonate functions as an auxiliary agent, the blending amount thereof is preferably 0.01 wt % or greater, more preferably 0.1 wt % or greater, and yet more preferably 0.2 wt % or greater, and preferably 5 wt % or smaller, more preferably 4 wt % or smaller and yet more preferably 3 wt % or smaller, with respect to 100 wt % of nonaqueous electrolyte solution. Within these ranges, durability can be enhanced without incurring excessive increases in charge transfer resistance. Charge-discharge durability at a high current density can be enhanced as a result.

Instances where the fluorinated cyclic carbonate functions as a solvent and as an auxiliary agent have been explained above, but in actual use, there is no clear boundary between solvent and auxiliary agent, and the nonaqueous electrolyte solution can be prepared to any proportion.

<Linear Carbonate>

The linear carbonate is preferably a C3 to C7 linear carbonate.

Specific examples of C3 to C7 linear carbonates include, for instance, dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butylethyl carbonate, isobutylethyl carbonate, t-butylethyl carbonate and the like.

Preferred among the foregoing are dimethyl carbonate, diethyl carbonate, di-n-propyl carbonate, diisopropyl carbonate, n-propyl isopropyl carbonate, ethyl methyl carbonate and methyl-n-propyl carbonate, and particularly preferably, dimethyl carbonate, diethyl carbonate and ethyl methyl carbonate.

The linear carbonate may be used singly as one type, or as two or more concurrent types in any combinations and ratios.

The blending amount of the linear carbonate is preferably 5 vol % or more, more preferably 8 vol % or more, and yet more preferably 10 vol % or more with respect to 100 vol % of nonaqueous solvent. Setting such a lower limit has the effect of bringing the viscosity of the nonaqueous electrolyte solution to within an appropriate range, and of suppressing drops in ion conductance; accordingly, the large-current discharge characteristic of the nonaqueous electrolyte battery can be readily brought to within a good range. The content of linear carbonate is preferably 90 vol % or less, and more preferably 85 vol % or less, with respect to 100 vol % of nonaqueous solvent. By setting such an upper limit, drops in electrical conductivity derived from decreased permittivity of the nonaqueous electrolyte solution are avoided, and the large-current discharge characteristic nonaqueous electrolyte battery can be readily brought to within a good range.

<Linear Carbonate Having a Fluorine Atom>

A linear carbonate having a fluorine atom (hereafter also referred to as fluorinated linear carbonate) may also be used appropriately. The number of fluorine atoms in the fluorinated linear carbonate is not particularly limited, so long as it is one or more, and is ordinarily 6 or less, preferably 4 or less. If the fluorinated linear carbonate has a plurality of fluorine atoms, the latter may be mutually bonded to a same carbon, or may be bonded to different carbons. Examples of fluorinated linear carbonates include, for instance, fluorinated dimethyl carbonate derivatives, fluorinated ethyl methyl carbonate derivatives, fluorinated diethyl carbonate derivatives and the like.

Examples of fluorinated dimethyl carbonate derivatives include, for instance, fluoromethyl methyl carbonate, difluoromethyl methyl carbonate, trifluoromethyl methyl carbonate, bis(fluoromethyl)carbonate, bis(difluoromethyl)carbonate, bis(trifluoromethyl)carbonate and the like.

Examples of fluorinated ethyl methyl carbonate derivatives include, for instance, 2-fluoroethyl methyl carbonate, ethylfluoromethyl carbonate, 2,2-difluoroethyl methyl carbonate, 2-fluoroethylfluoromethyl carbonate, ethyldifluoromethyl carbonate, 2,2,2-trifluoroethyl methyl carbonate, 2,2-difluoroethylfluoromethyl carbonate, 2-fluoroethyldifluoromethyl carbonate, ethyltrifluoromethyl carbonate and the like.

Examples of fluorinated diethyl carbonate derivatives include, for instance, ethyl-(2-fluoroethyl)carbonate, ethyl-(2,2-difluoroethyl)carbonate, bis(2-fluoroethyl)carbonate, ethyl-(2,2,2-trifluoroethyl)carbonate, 2,2-difluoroethyl-2'- fluoroethyl carbonate, bis(2,2-difluoroethyl)carbonate, 2,2,2-trifluoroethyl-2'-fluoroethyl carbonate, 2,2,2-trifluoroethyl-2',2'-difluoroethyl carbonate, bis(2,2,2-trifluoroethyl)carbonate and the like.

The linear carbonate may be used singly as one type, or as two or more concurrent types in any combinations and ratios.

The blending amount of the fluorinated linear carbonate is not particularly limited, and may be any blending amount, so long as the effect of the present invention is not significantly impaired thereby. The blending amount is preferably 0.01 vol % or greater, more preferably 0.1 vol % or greater, yet more preferably 0.2 vol % or greater and preferably 95 vol % or smaller, more preferably 90 vol % or smaller, and yet more preferably 85 vol % or smaller, with respect to 100 vol % of nonaqueous solvent. The fluorinated linear carbonate functions not only as a solvent, but also as the "auxiliary agent" set forth in the below section 1-5. When the fluorinated linear carbonate functions as a solvent, the blending amount thereof is preferably 5 vol % or greater, more preferably 7 vol % or greater, and yet more preferably 8 vol % or greater, and preferably 95 vol % or smaller, more preferably 90 vol % or smaller and yet more preferably 85 vol % or smaller, with respect to 100 vol % of nonaqueous solvent. Within these ranges, there can be suppressed side decomposition reactions in the nonaqueous electrolyte solution upon high-voltage operation of the battery, battery durability can be enhanced, and extreme drops in the electrical conductivity of the nonaqueous electrolyte solution can be suppressed. If the fluorinated linear carbonate functions as an auxiliary agent, the blending amount is preferably 0.01 wt % or greater, more preferably 0.1 wt % or greater, and yet more preferably 0.2 wt % or greater, and preferably 5 wt % or smaller, more preferably 4 wt % or smaller and yet more preferably 3 wt % or smaller, with respect to 100 wt % of nonaqueous electrolyte solution. Within these ranges, durability can be enhanced without incurring excessive increases in charge transfer resistance. Charge-discharge durability at a high current density can be enhanced as a result.

Instances where the fluorinated linear carbonate functions as a solvent and as an auxiliary agent have been explained above, but in actual use, there is no clear boundary between solvent and auxiliary agent, and the nonaqueous electrolyte solution can be prepared to any proportion.

<Cyclic Carboxylic Acid Ester>

Examples of the cyclic carboxylic acid ester include, for instance, cyclic carboxylic acid esters having a total of 3 to 12 carbon atoms in the structural formula. Specific examples thereof include, for instance, gamma-butyrolactone, gamma-valerolactone, gamma-caprolactone, epsilon-caprolactone and the like. Particularly preferred among the foregoing is gamma-butyrolactone, in terms of enhancing battery characteristics as a result of an enhanced degree of dissociation of lithium ions.

The cyclic carboxylic acid ester may be used singly as one type, or as two or more concurrent types in any combinations and ratios.

Ordinarily, the blending amount of the cyclic carboxylic acid ester is preferably 5 vol % or more, and more preferably 10 vol % or more with respect to 100 vol % of nonaqueous solvent. By setting such a lower limit, the electrical conductivity of the nonaqueous electrolyte solution is improved, and the large-current discharge characteristic of the nonaqueous electrolyte battery is readily enhanced. The blending amount of the cyclic carboxylic acid ester is preferably 50 vol % or less, and more preferably 40 vol % or less. By setting such an upper limit, the viscosity of the nonaqueous electrolyte solution is brought to within an appropriate range, drops in electrical conductivity are avoided, increases in negative electrode resistance are suppressed, and the large-current discharge characteristic of the nonaqueous electrolyte secondary battery is readily brought to within a good range.

<Linear Carboxylic Acid Ester>

Examples of the linear carboxylic acid ester include, for instance, linear carboxylic acid esters having a total of 3 to 7 carbon atoms in the structural formula. Specific examples thereof include, for instance, methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, isopropyl isobutyrate and the like.

Preferred among the foregoing are methyl acetate, ethyl acetate, n-propyl acetate, n-butyl acetate, methyl propionate, ethyl propionate, n-propyl propionate, isopropyl propionate, methyl butyrate, ethyl butyrate and the like, in terms of enhancing ion conductance through lowered viscosity.

The linear carboxylic acid ester may be used singly as one type, or as two or more concurrent types in any combinations and ratios.

Ordinarily, the blending amount of the linear carboxylic acid ester is preferably 10 vol % or more, more preferably 15 vol % or more with respect to 100 vol % of nonaqueous solvent. By setting such a lower limit, the electrical conductivity of the nonaqueous electrolyte solution is improved, and the large-current discharge characteristic of the nonaqueous electrolyte battery is readily enhanced. The blending amount of the linear carboxylic acid ester is preferably 60 vol % or less, more preferably 50 vol % or less, with respect to 100 vol % of nonaqueous solvent. By setting such an upper limit, increases in negative electrode resistance are suppressed, and the large-current discharge characteristic, as well as the cycle characteristic of the nonaqueous electrolyte battery, are readily brought to within good ranges.

<Ether Compound>

The ether compound is preferably a C3 to C10 linear ether or a C3 to C6 cyclic ether in which some of hydrogen atoms are optionally substituted with fluorine. Specific examples of C3 to C10 linear ethers include, for instance, diethylether, di(2-fluoroethyl)ether, di(2,2-difluoroethyl)ether, di(2,2,2-trifluoroethyl)ether, ethyl(2-fluoroethyl)ether, ethyl(2,2,2-trifluoroethyl)ether, ethyl(1,1,2,2-tetrafluoroethyl)ether, (2-fluoroethyl)(2,2,2-trifluoroethyl)ether, (2-fluoroethyl)(1,1,2,2-tetrafluoroethyl)ether, (2,2,2-trifluoroethyl)(1,1,2,2-tetrafluoroethyl)ether, ethyl-n-propylether, ethyl(3-fluoro-n-propyl)ether, ethyl(3,3,3-trifluoro-n-propyl)ether, ethyl(2,2,3,3-tetrafluoro-n-propyl)ether, ethyl(2,2,3,3,3-pentafluoro-n-propyl)ether, 2-fluoroethyl-n-propylether, (2-fluoroethyl)(3-fluoro-n-propyl)ether, (2-fluoroethyl)(3,3,3-trifluoro-n-propyl)ether, (2-fluoroethyl)(2,2,3,3-tetrafluoro-n-propyl)ether, (2-fluoroethyl)(2,2,3,3,3-pentafluoro-n-propyl)ether, 2,2,2-trifluoroethyl-n-propylether, (2,2,2-trifluoroethyl)(3-fluoro-n-propyl)ether, (2,2,2-trifluoroethyl)(3,3,3-trifluoro-n-propyl)ether, (2,2,2-trifluoroethyl)(2,2,3,3-tetrafluoro-n-propyl)ether, (2,2,2-trifluoroethyl)(2,2,3,3,3-pentafluoro-n-propyl)ether, 1,1,2,2-tetrafluoroethyl-n-propylether, (1,1,2,2-tetrafluoroethyl)(3-fluoro-n-propyl)ether, (1,1,2,2-tetrafluoroethyl)(3,3,3-trifluoro-n-propyl)ether, (1,1,2,2-tetrafluoroethyl)(2,2,3,3-tetrafluoro-n-propyl)ether, (1,1,2,2-tetrafluoroethyl)(2,2,3,3,3-pentafluoro-n-propyl)ether, di-n-propylether, (n-propyl)(3-fluoro-n-propyl)ether, (n-propyl)(3,3,3-trifluoro-n-propyl)ether, (n-propyl)(2,2,3,3-tetrafluoro-n-propyl)ether, (n-propyl)(2,2,3,3,3-pentafluoro-n-propyl)ether, di(3-fluoro-n-propyl)ether, (3-fluoro-n-propyl)(3,3,3-trifluoro-n-propyl)ether, (3-fluoro-n-propyl)(2,2,3,3-tetrafluoro-n-propyl)ether, (3-fluoro-n-propyl)(2,2,3,3,3-pentafluoro-n-propyl)ether, di(3,3,3-trifluoro-n-propyl)ether, (3,3,3-trifluoro-n-propyl)(2,2,3,3-tetrafluoro-n-propyl)ether, (3,3,3-trifluoro-n-propyl)(2,2,3,3,3-pentafluoro-n-propyl)ether, di(2,2,3,3-tetrafluoro-n-propyl)ether, (2,2,3,3-tetrafluoro-n-propyl)(2,2,3,3,3-pentafluoro-n-propyl)ether, di(2,2,3,3,3-pentafluoro-n-propyl)ether, di-n-butylether, dimethoxymethane, methoxyethoxymethane, methoxy(2-fluoroethoxy)methane, methoxy(2,2,2-trifluoroethoxy)methane, methoxy(1,1,2,2-tetrafluoroethoxy)methane, diethoxymethane, ethoxy(2-fluoroethoxy)methane, ethoxy(2,2,2-trifluoroethoxy)methane, ethoxy(1,1,2,2-tetrafluoroethoxy)methane, di(2-fluoroethoxy)methane, (2-fluoroethoxy)(2,2,2-trifluoroethoxy)methane, (2-fluoroethoxy)(1,1,2,2-tetrafluoroethoxy)methane, di(2,2,2-trifluoroethoxy)methane, (2,2,2-trifluoroethoxy)(1,1,2,2-tetrafluoroethoxy)methane, di(1,1,2,2-tetrafluoroethoxy)methane, dimethoxyethane, methoxyethoxyethane, methoxy(2-fluoroethoxy)ethane, methoxy(2,2,2-trifluoroethoxy)ethane, methoxy(1,1,2,2-tetrafluoroethoxy)ethane, diethoxyethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy)ethane, (2-fluoroethoxy)(2,2,2-trifluoroethoxy)ethane, (2-fluoroethoxy)(1,1,2,2-tetrafluoroethoxy)ethane, di(2,2,2-trifluoroethoxy)ethane, (2,2,2-trifluoroethoxy)(1,1,2,2-tetrafluoroethoxy)ethane, di(1,1,2,2-tetrafluoroethoxy)ethane, ethylene glycol di-n-propylether, ethylene glycol di-n-butylether, diethylene glycol dimethylether and the like.

Specific examples of C3 to C6 cyclic ethers include, for instance, tetrahydrofuran, 2-methyltetrahydrofuran, 3-methyltetrahydrofuran, 1,3-dioxane, 2-methyl-1,3-dioxane, 4-methyl-1,3-dioxane, 1,4-dioxane and the like, and fluorinated compounds of the foregoing.

Preferred among the foregoing are dimethoxymethane, diethoxymethane, ethoxymethoxymethane, ethylene glycol di-n-propyl ether, ethylene glycol di-n-butyl ether and diethylene glycol dimethyl ether, in terms of enhancing ion dissociation ability by virtue of their high solvating power on lithium ions. Particularly preferred among the foregoing are dimethoxymethane, diethoxymethane and ethoxymethoxymethane, on account of their low viscosity and the high ion conductance that they impart.

The ether compound may be used singly as one type, or as two or more concurrent types in any combinations and ratios.

Ordinarily, the blending amount of the ether compound is preferably 5 vol % or more, more preferably 10 vol % or more and yet more preferably 15 vol % or more, and preferably 70 vol % or less, more preferably 60 vol % or less and yet more preferably 50 vol % or less, with respect to 100 vol % of nonaqueous solvent. Within such ranges, there is readily secured the enhancing effect on ion conductance, derived from a enhanced degree of dissociation of lithium ions and a drop in viscosity, that is exerted by the linear ether. In the case where the negative electrode active material is a carbonaceous material, drops in capacity caused by co-intercalation of the linear ether together with lithium ions are likelier to be avoided as a result.

<Sulfone Compound>

The sulfone compound is preferably a C3 to C6 cyclic sulfone or a C2 to C6 linear sulfone. The number of sulfonyl groups in one molecule is preferably 1 or 2.

Examples of cyclic sulfones include, for instance, trimethylene sulfones, tetramethylene sulfones and hexamethylene sulfones, which are monosulfone compounds; and trimethylene disulfones, tetramethylene disulfones hexamethylene disulfones and the like, which are disulfone compounds. More preferred among the foregoing, in terms of permittivity and viscosity, are tetramethylene sulfones, tetramethylene disulfones, hexamethylene sulfones and hexamethylene disulfones, and particularly preferably tetramethylene sulfones (sulfolanes).

The sulfolane is preferably sulfolane and/or a sulfolane derivative (hereafter also referred to as sulfolanes such as sulfolane). The sulfolane derivative is preferably a sulfolane derivative wherein one or more hydrogen atoms bonded to the carbon atoms that make up the sulfolane ring are substituted with a fluorine atom or an alkyl group.

Preferred among the foregoing are 2-methylsulfolane, 3-methylsulfolane, 2-fluorosulfolane, 3-fluorosulfolane, 2,2-difluorosulfolane, 2,3-difluorosulfolane, 2,4-difluorosulfolane, 2,5-difluorosulfolane, 3,4-difluorosulfolane, 2-fluoro-3-methylsulfolane, 2-fluoro-2-methylsulfolane, 3-fluoro-3-methylsulfolane, 3-fluoro-2-methylsulfolane, 4-fluoro-3-methylsulfolane, 4-fluoro-2-methylsulfolane, 5-fluoro-3-methylsulfolane, 5-fluoro-2-methylsulfolane, 2-fluoromethylsulfolane, 3-fluoromethylsulfolane, 2-difluoromethylsulfolane, 3-difluoromethylsulfolane, 2-trifluoromethylsulfolane, 3-trifluoromethylsulfolane, 2-fluoro-3-(trifluoromethyl)sulfolane, 3-fluoro-3-(trifluoromethyl)sulfolane, 4-fluoro-3-(trifluoromethyl)sulfolane, 5-fluoro-3-(trifluoromethyl)sulfolane and the like, in terms of high ion conductance and high input and output.

Examples of linear sulfones include, for instance, dimethyl sulfone, ethylmethyl sulfone, diethyl sulfone, n-propylmethyl sulfone, n-propylethyl sulfone, di-n-propyl sulfone, isopropylmethyl sulfone, isopropylethyl sulfone, diisopropyl sulfone, n-butylmethyl sulfone, n-butylethyl sulfone, t-butylmethyl sulfone, t-butylethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, perfluoroethylmethyl sulfone, ethyltrifluoroethyl sulfone, ethylpentafluoroethyl sulfone, di(trifluoroethyl)sulfone, perfluorodiethyl sulfone, fluoromethyl-n-propyl sulfone, difluoromethyl-n-propyl sulfone, trifluoromethyl-n-propyl sulfone, fluoromethylisopropyl sulfone, difluoromethylisopropyl sulfone, trifluoromethylisopropyl sulfone, trifluoroethyl-n-propyl sulfone, trifluoroethylisopropyl sulfone, pentafluoroethyl-n-propyl sulfone, pentafluoroethylisopropyl sulfone, trifluoroethyl-n-butyl sulfone, trifluoroethyl-t-butyl sulfone, pentafluoroethyl-n-butyl sulfone, pentafluoroethyl-t-butyl sulfone and the like.

Preferred among the foregoing are dimethyl sulfone, ethylmethyl sulfone, diethyl sulfone, n-propylmethyl sulfone, isopropylmethyl sulfone, n-butylmethyl sulfone, t-butylmethyl sulfone, monofluoromethylmethyl sulfone, difluoromethylmethyl sulfone, trifluoromethylmethyl sulfone, monofluoroethylmethyl sulfone, difluoroethylmethyl sulfone, trifluoroethylmethyl sulfone, pentafluoroethylmethyl sulfone, ethylmonofluoromethyl sulfone, ethyldifluoromethyl sulfone, ethyltrifluoromethyl sulfone, ethyltrifluoroethyl sulfone, ethylpentafluoroethyl sulfone, trifluoromethyl-n-propyl sulfone, trifluoromethylisopropyl sulfone, trifluoroethyl-n-butyl sulfone, trifluoroethyl-t-butyl sulfone, trifluoromethyl-n-butyl sulfone, trifluoromethyl-t-butyl sulfone and the like, in terms of high ion conductance and high input and output.

The sulfone compound may be used singly as one type, or as two or more concurrent types in any combinations and ratios.

Ordinarily, the blending amount of the sulfone compound is preferably 0.3 vol % or more, more preferably 0.5 vol % or more and yet more preferably 1 vol % or more, and preferably 40 vol % or less, more preferably 35 vol % or less and yet more preferably 30 vol % or less, with respect to 100 vol % of nonaqueous solvent. Within these ranges, an enhancing effect on durability in terms of cycle characteristic and storage characteristic and the like is readily achieved, the viscosity of the nonaqueous electrolyte solution can be brought to within an appropriate range, and drops in electrical conductivity can be avoided; also, drops in the charge-discharge capacity retention rate can be readily avoided, in a case where the nonaqueous electrolyte battery is charged and discharged at a high current density.

1-3. Compound Represented by Formula (1)

A characterizing feature of the present invention is that a nonaqueous electrolyte solution contains a compound represented by formula (1) below.

[Chem. 6]

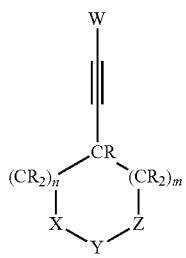

(1)

(In formula (1), X and Z, which may be identical or dissimilar, represent $CR^1_2$, C=O, C=N—$R^1$, C=P—$R^1$, O, S, N—$R^1$ and P—$R^1$; and Y represents $CR^1_2$, C=O, S=O, S(=O)$_2$, P(=O)—$R^2$ and P(=O)—$OR^3$. In formula (1), R and $R^1$, which may be mutually identical or dissimilar, are each hydrogen, a halogen or a C1 to C20 hydrocarbon group optionally having a functional group; $R^2$ is a C1 to C20 hydrocarbon group optionally having a functional group; $R^3$ is Li, $NR^4_4$ or a C1 to C20 hydrocarbon group optionally having a functional group; $R^4$ are mutually identical or dissimilar C1 to C20 hydrocarbon groups optionally having a functional group; and n and m are integers equal to or greater than 0; and W has the same ranges as R, and may be identical to or dissimilar from R.)

In formula (1), X and Z are not particularly limited, provided that they lie within the ranges prescribed in the formula, but are more preferably $CR^1_2$, O, S or N—$R^1$. Also, Y is not particularly limited, provided that it lies within the ranges prescribed in the formula, but is more preferably C=O, S=O, S(=O)$_2$, P(=O)—$R^2$ or P(=O)—$OR^3$.

Similarly, R and $R^1$ are not particularly limited, provided that they lie within the ranges prescribed in the formula, but are each preferably hydrogen, fluorine, a saturated aliphatic hydrocarbon group optionally having a substituent, an unsaturated aliphatic hydrocarbon group optionally having a substituent, or an aromatic hydrocarbon group optionally having a substituent.

Similarly, $R^2$ and $R^4$ are not particularly limited, provided that they lies within the ranges prescribed in the formula, but are each, preferably, a saturated aliphatic hydrocarbon group optionally having a substituent, an unsaturated aliphatic hydrocarbon optionally having a substituent, or an aromatic hydrocarbon/aromatic heterocycle optionally having a substituent.

Similarly, $R^3$ is not particularly limited, provided that it lies within the ranges prescribed in the formula, but is preferably, Li, a saturated aliphatic hydrocarbon optionally having a substituent, an unsaturated aliphatic hydrocarbon optionally having a substituent, or an aromatic hydrocarbon/aromatic heterocycle optionally having a substituent.

The substituents in the saturated aliphatic hydrocarbon optionally having a substituent, unsaturated aliphatic hydrocarbon optionally having a substituent, or aromatic hydrocarbon/aromatic heterocycle optionally having a substituent, are not particularly limited, but are preferably, for instance a halogen, or an ester of a carboxylic acid, carbonic acid, sulfonic acid, phosphoric acid, phosphorous acid or the like with a saturated aliphatic hydrocarbon group optionally having a substituent, an unsaturated aliphatic hydrocarbon group optionally having a substituent or an aromatic hydrocarbon group optionally having a substituent; yet more preferably, a halogen, and most preferably, fluorine.

Preferred saturated aliphatic hydrocarbons include, specifically, methyl groups, ethyl groups, fluoromethyl groups, difluoromethyl groups, trifluoromethyl groups, 1-fluoroethyl groups, 2-fluoroethyl groups, 1,1-difluoroethyl groups, 1,2-difluoroethyl groups, 2,2-difluoroethyl groups, 1,1,2-trifluoroethyl groups, 1,2,2-trifluoroethyl groups, 2,2,2-trifluoroethyl groups, phenyl groups, cyclopentyl groups and cyclohexyl groups.

Preferred unsaturated aliphatic hydrocarbons include, specifically, ethenyl group, 1-fluoroethenyl groups, 2-fluoroethenyl groups, 1-methylethenyl groups, 2-propenyl groups, 2-fluoro-2-propenyl groups, 3-fluoro-2-propenyl groups, ethynyl groups, 2-fluoroethynyl groups, 2-propynyl groups, 3-fluoro-2-propynyl groups.

Preferred aromatic hydrocarbons include, for instance, phenyl groups, 2-fluorophenyl groups, 3-fluorophenyl groups, 2,4-difluorophenyl groups, 2,6-difluorophenyl groups, 3,5-difluorophenyl groups and 2,4,6-trifluorophenyl groups.

Preferred aromatic heterocycles include, for instance, 2-furanyl groups, 3-furanyl groups, 2-thiophenyl groups, 3-thiophenyl groups, 1-methyl-2-pyrrolyl groups and 1-methyl-3-pyrrolyl groups.

More preferred among the foregoing are methyl groups, ethyl groups, fluoromethyl groups, trifluoromethyl groups, 2-fluoroethyl groups, 2,2,2-trifluoroethyl groups, ethenyl groups, ethynyl groups and phenyl groups, and yet more preferably methyl groups, ethyl groups and ethynyl groups.

Similarly, n and m are not particularly limited, provided that they lie within the ranges prescribed in the formula, but, preferably n and m are 0 or 1, and yet more preferably n=m=1 or n=1 and m=0.

The molecular weight is preferably 50 or greater, and preferably 500 or smaller. Within that range, the solubility of the unsaturated cyclic carbonate towards the nonaqueous electrolyte solution is readily secured, and the effect of the present invention is readily brought out. Specific examples of these preferred compounds are set forth below.

[Chem. 7]
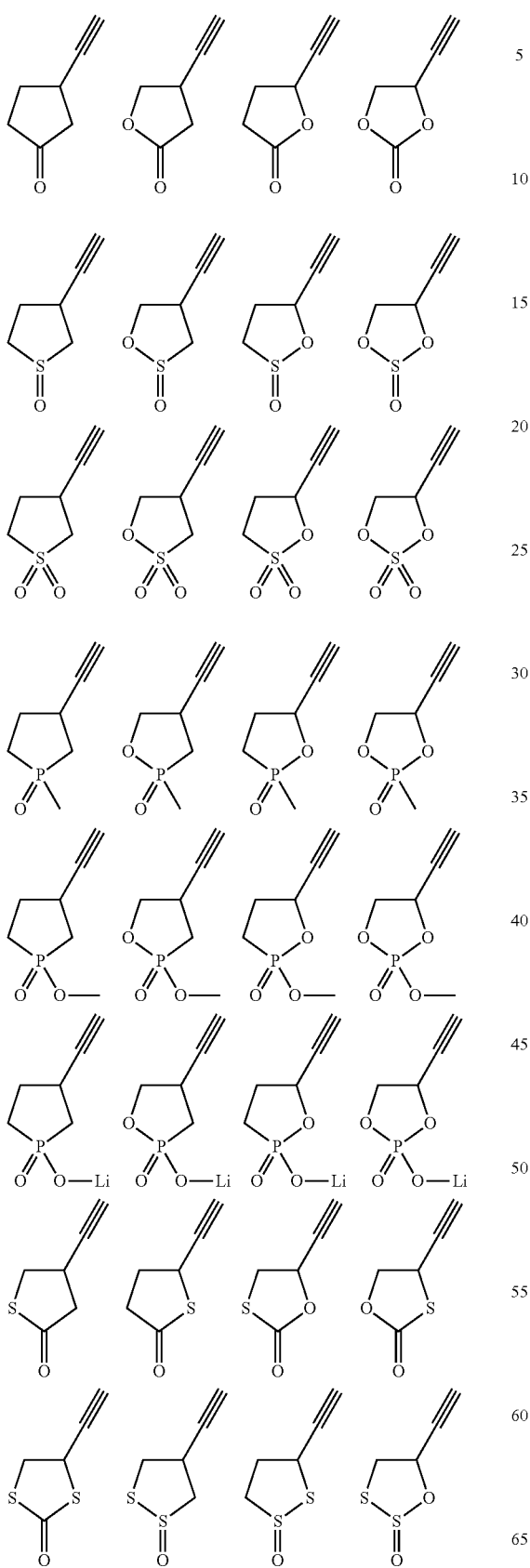
[Chem. 8]
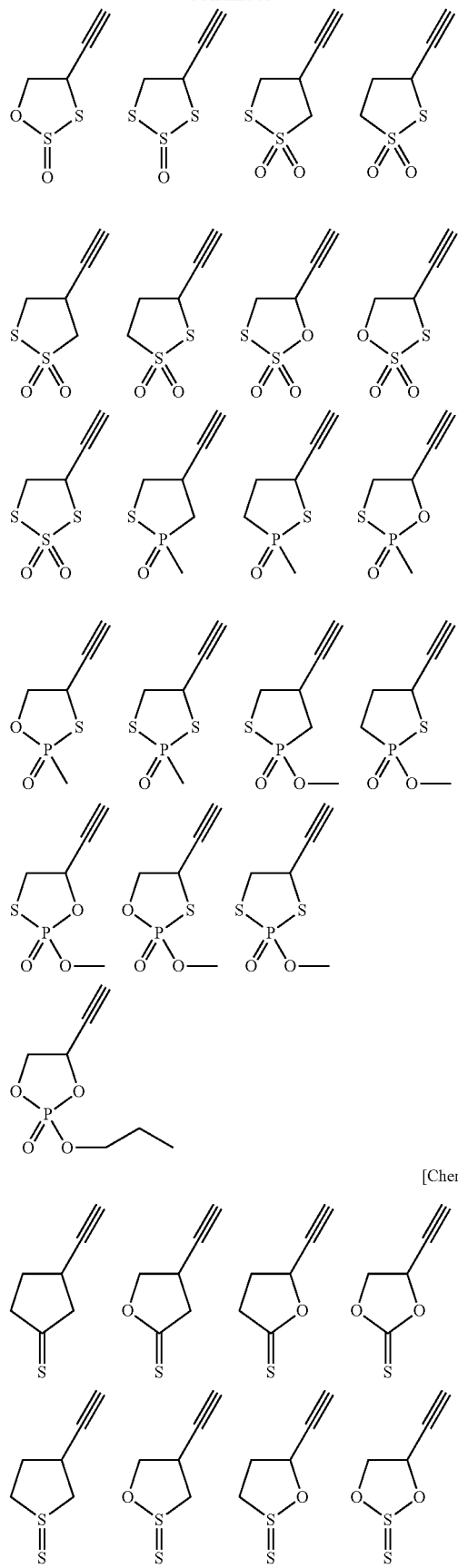

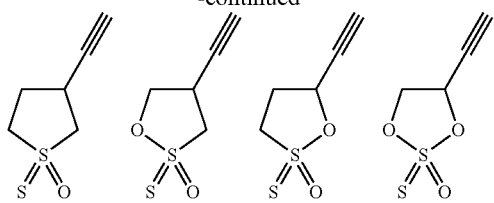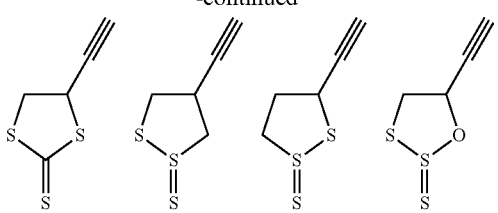
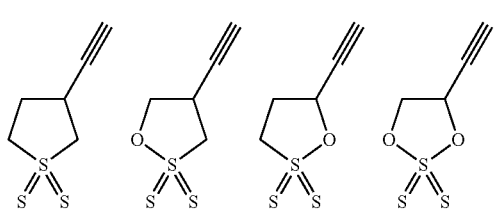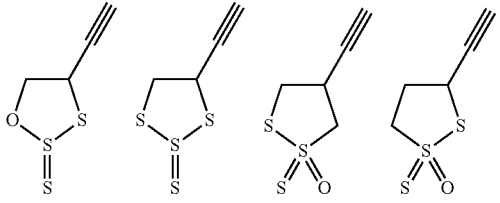
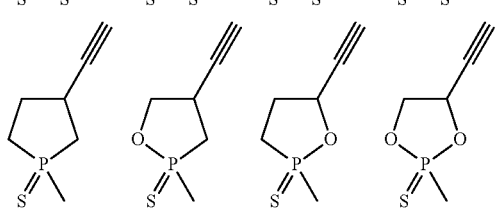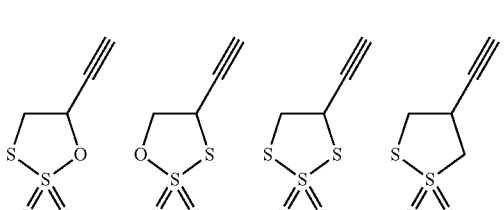
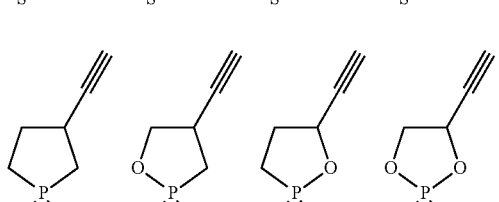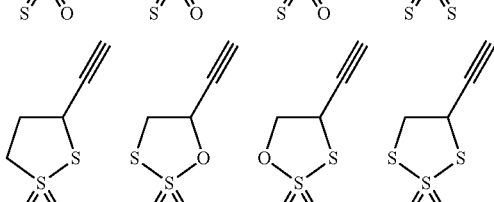
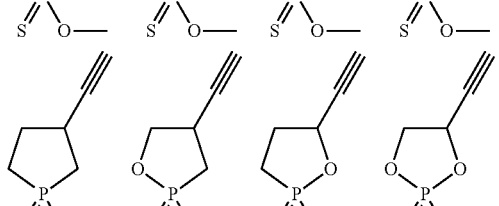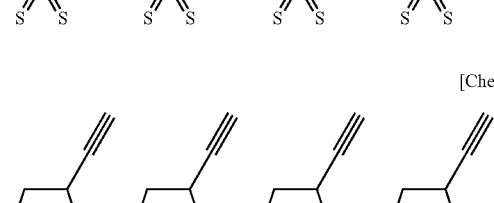
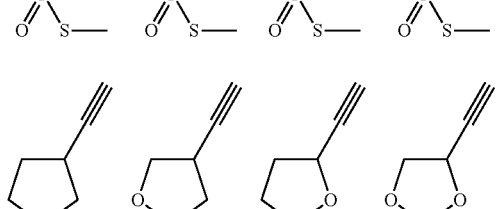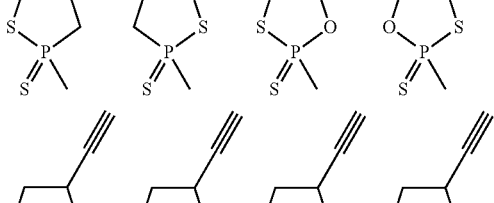
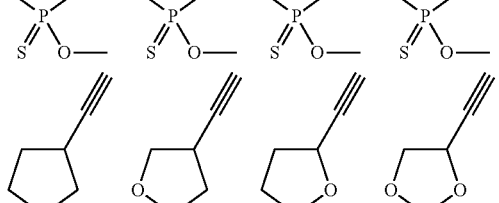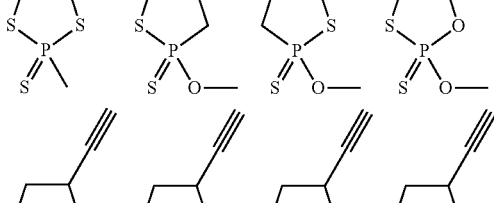
[Chem. 9]
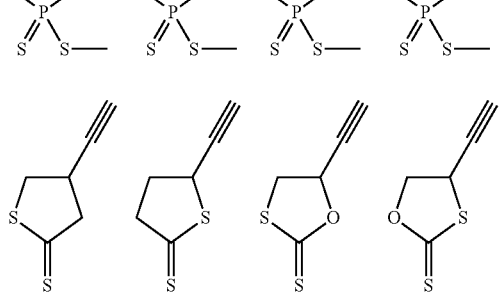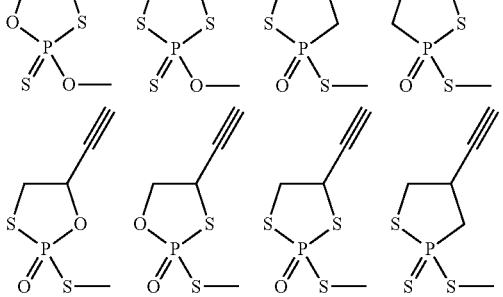

-continued
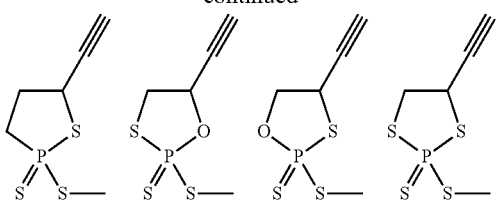
[Chem. 10]
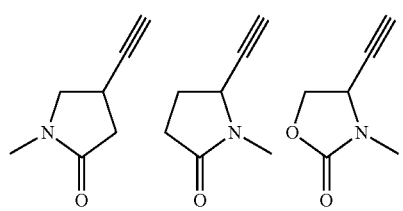
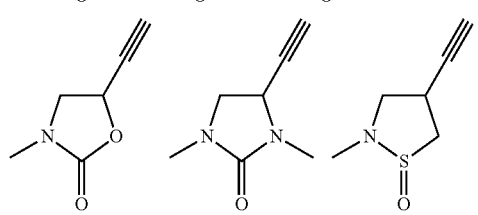
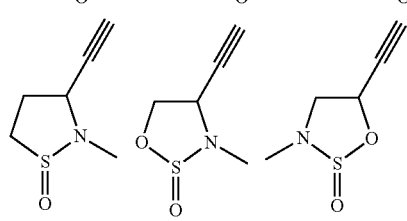
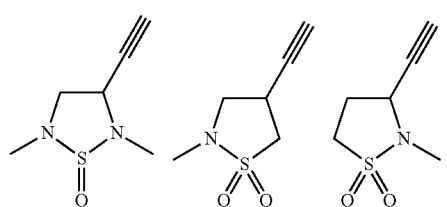
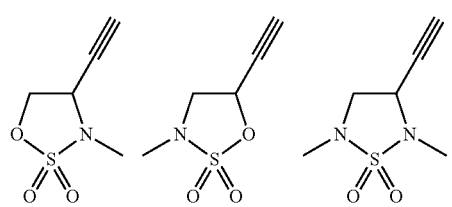
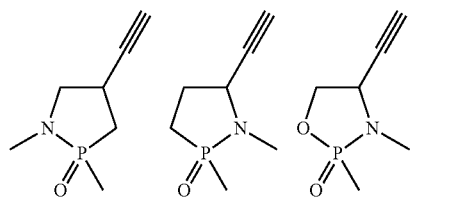
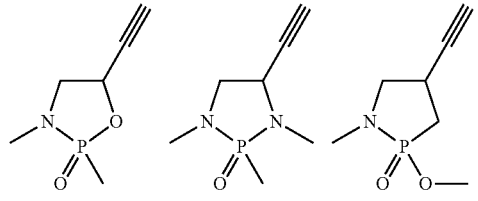
-continued
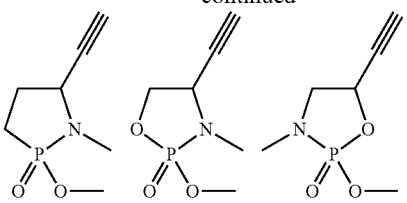
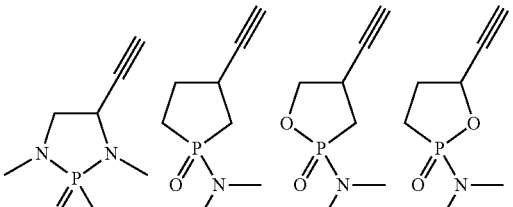
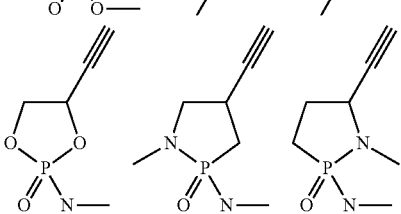
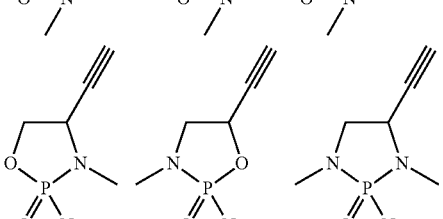
[Chem. 11]
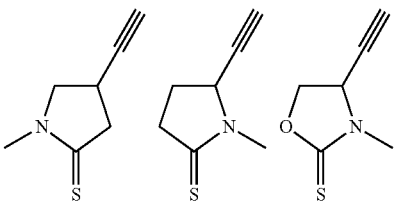
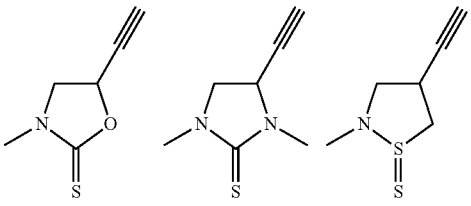
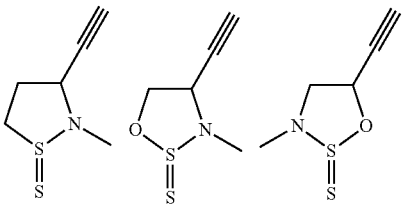
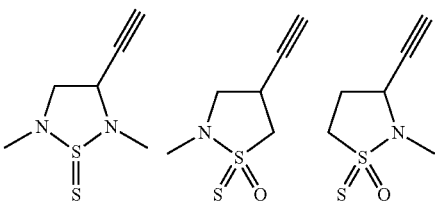

23
-continued
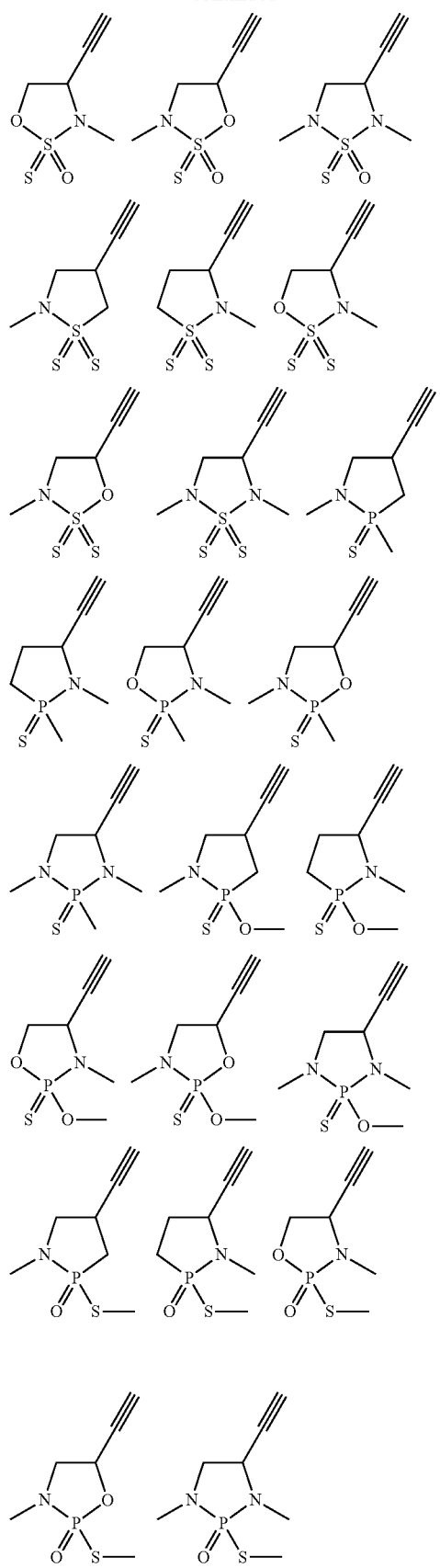
24
-continued
[Chem. 12]
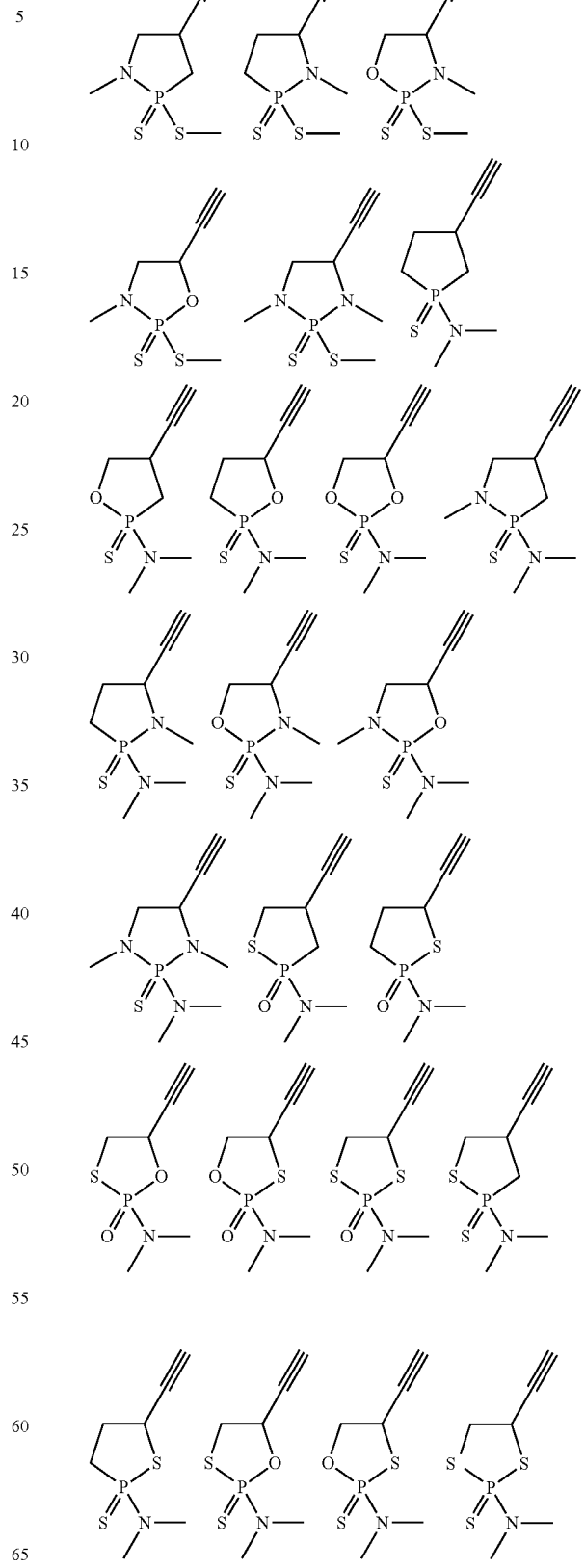

[Chem. 13]

-continued
[Chem. 14]
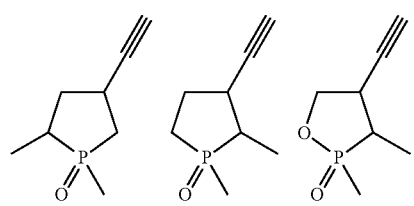
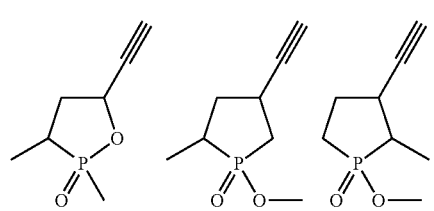
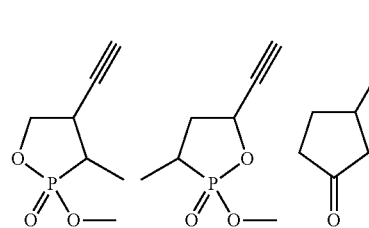
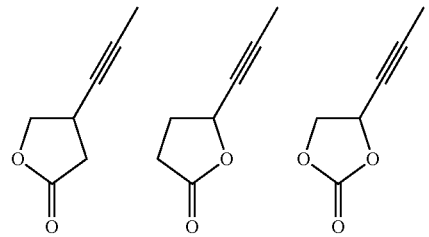
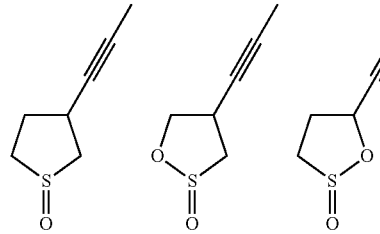
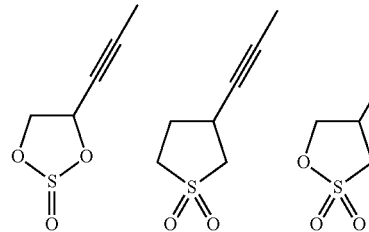
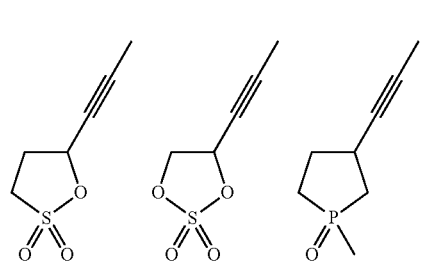
-continued
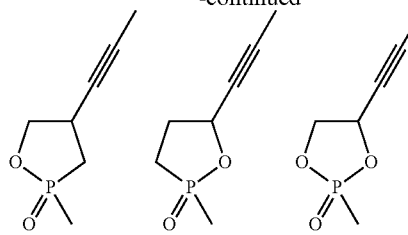
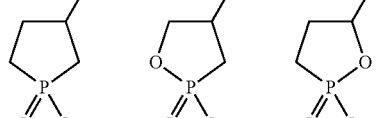
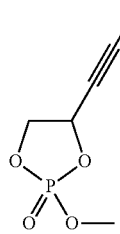
[Chem. 15]
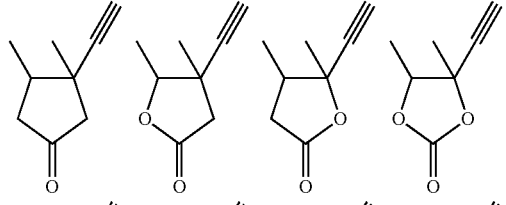
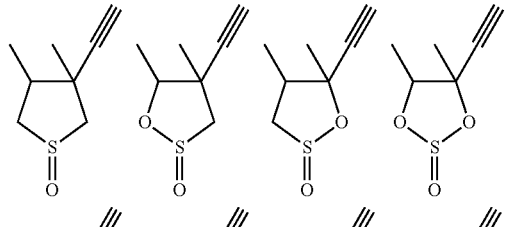
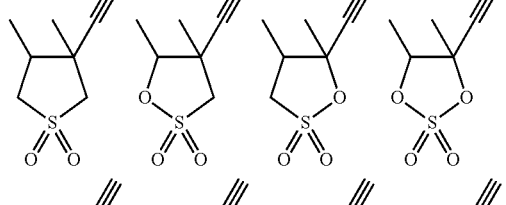
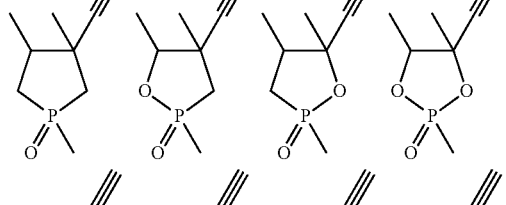
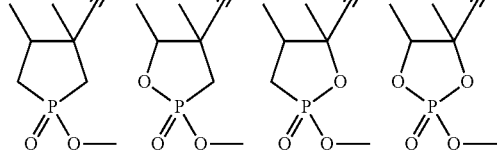

-continued
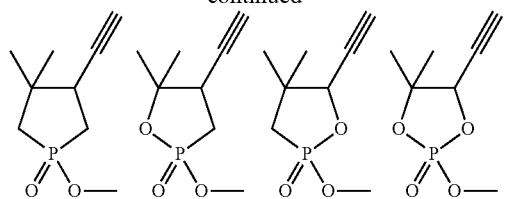
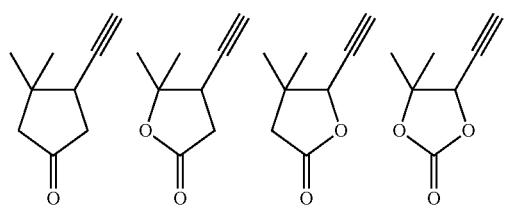
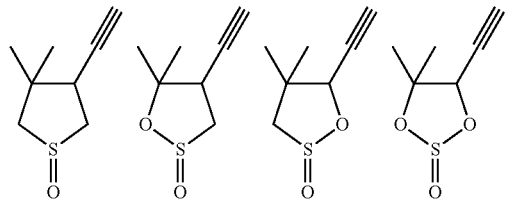
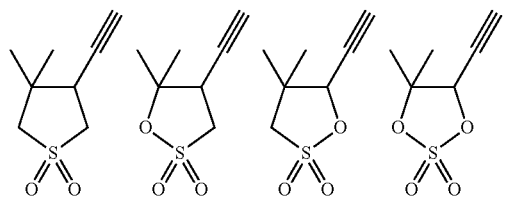
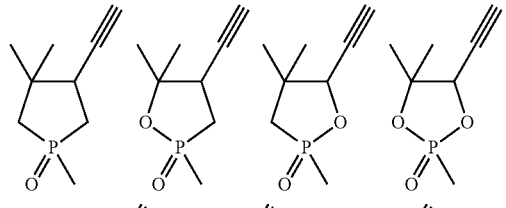
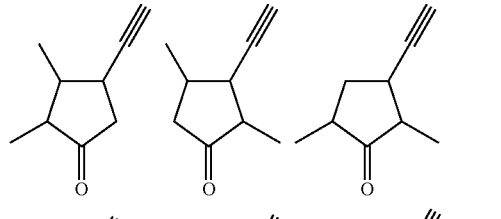
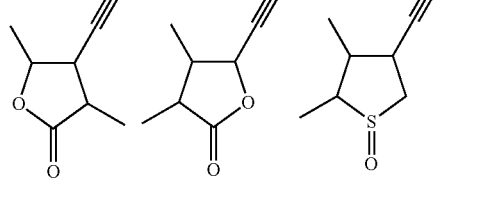
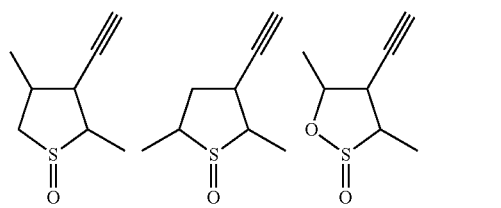
-continued
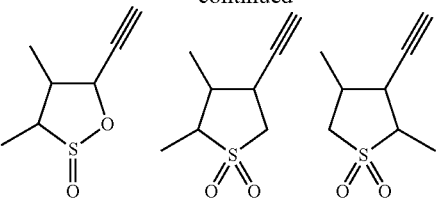
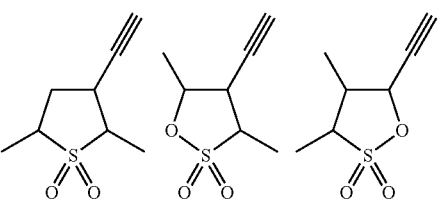
[Chem. 16]
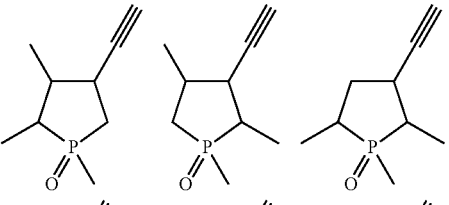
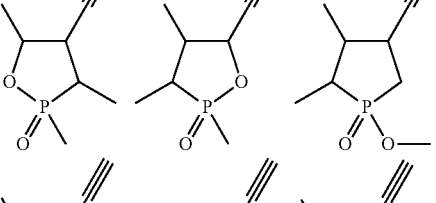
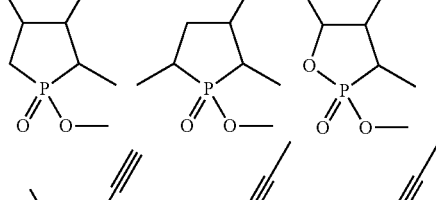
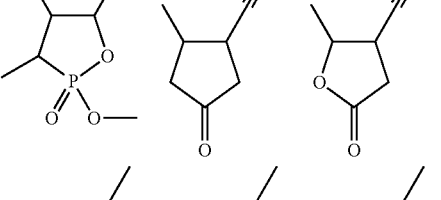
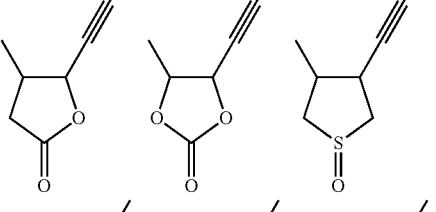
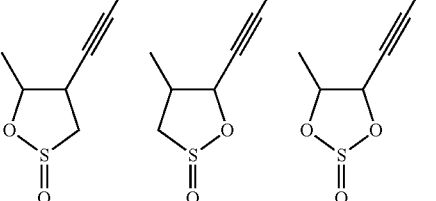

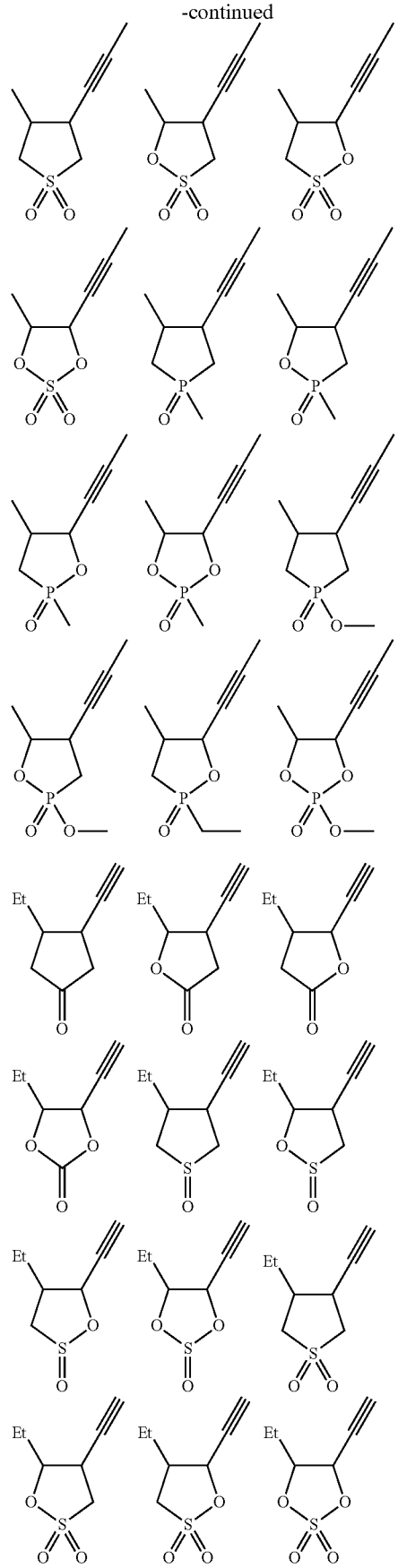
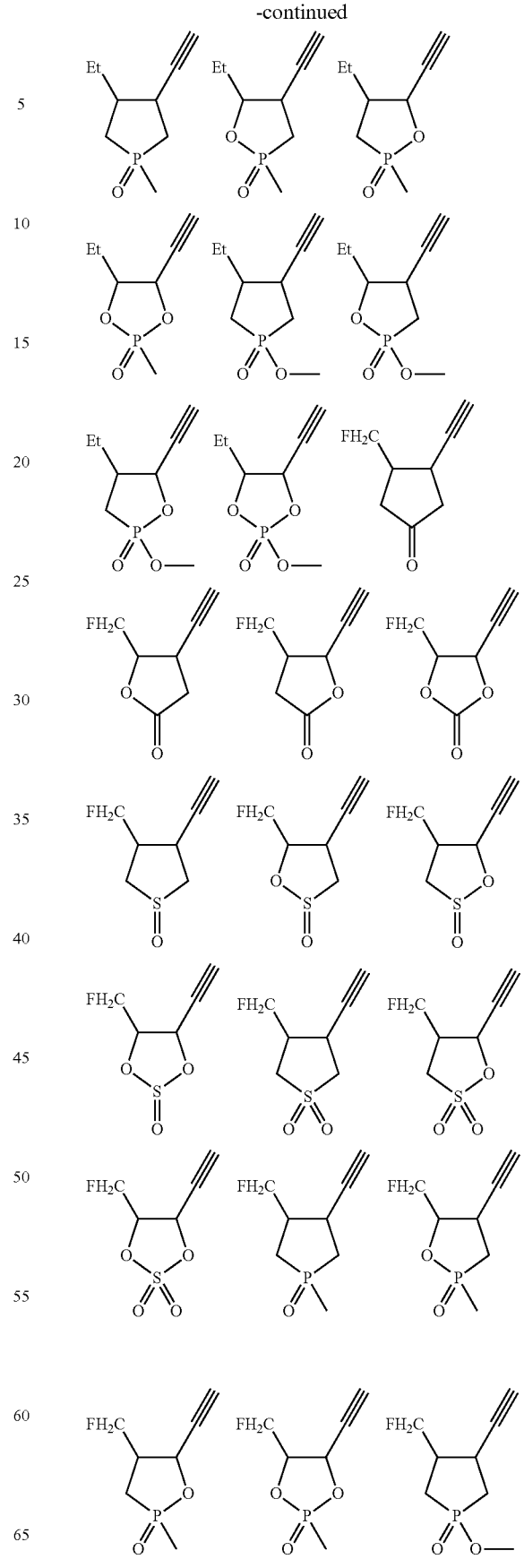

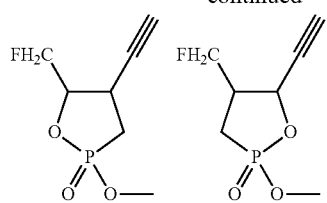
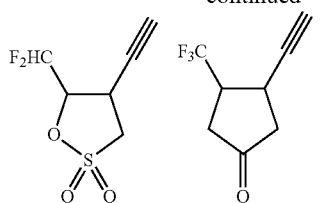
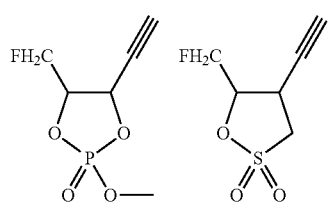
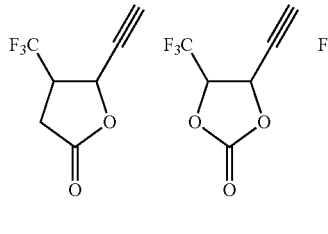
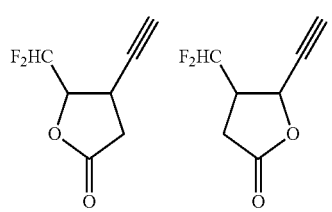
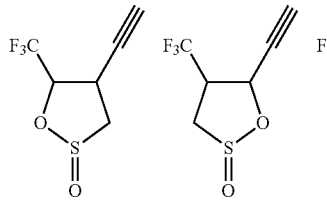
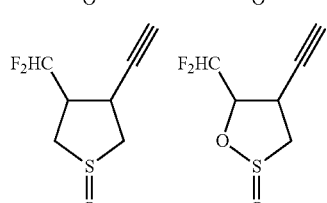
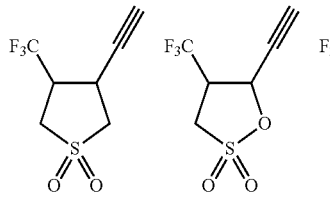
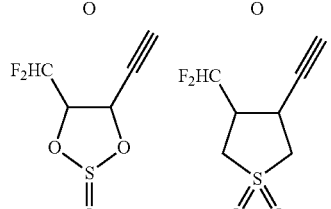
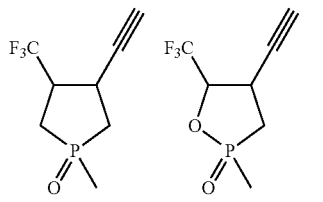
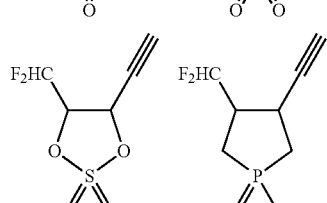
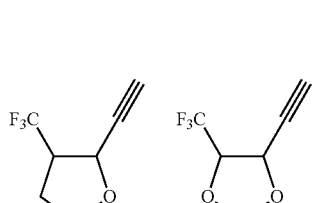
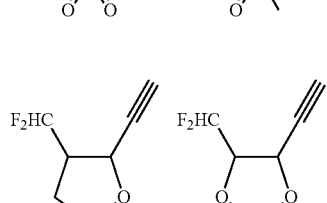
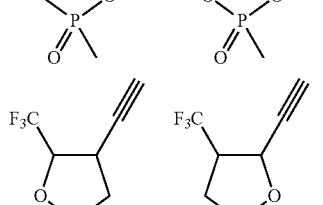
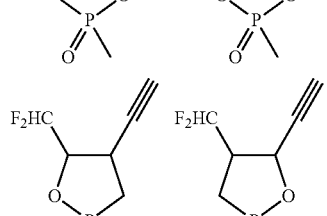
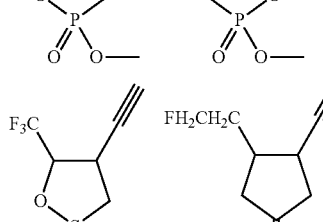

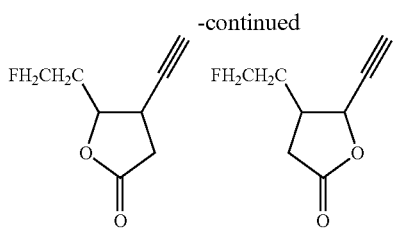
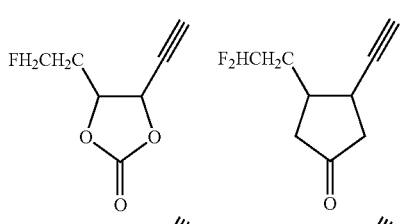
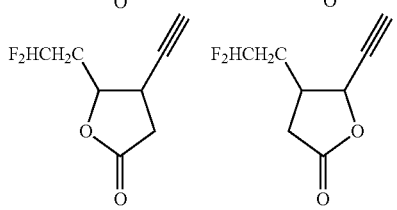
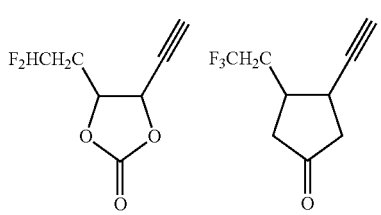
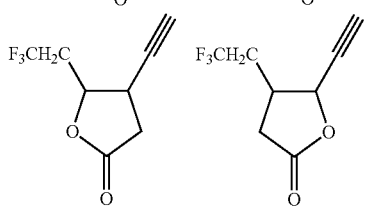
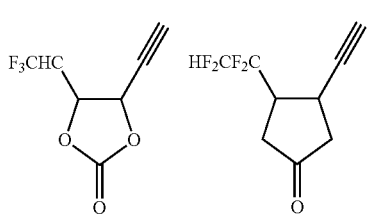
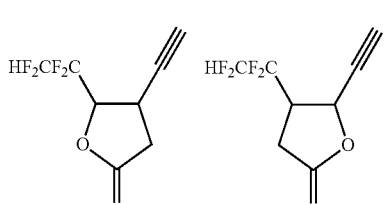
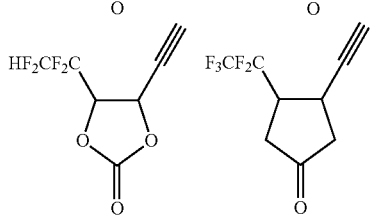
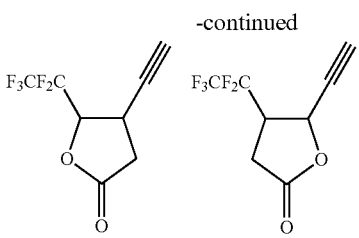
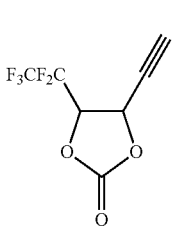
[Chem. 20]
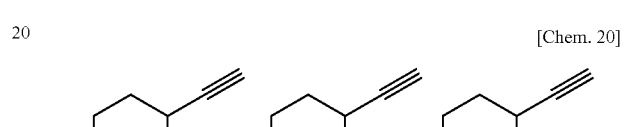
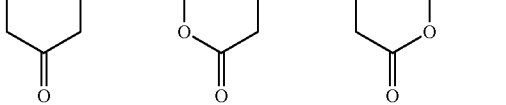
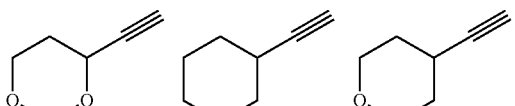
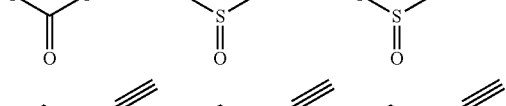
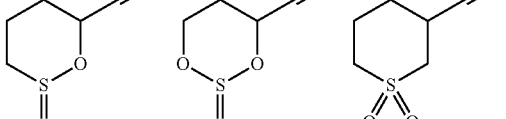
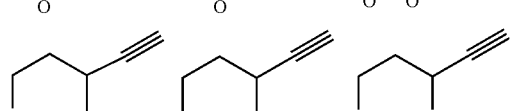
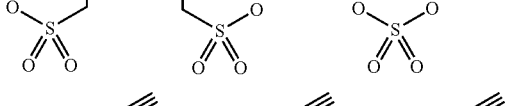
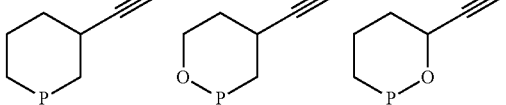
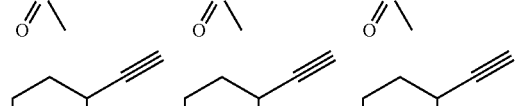
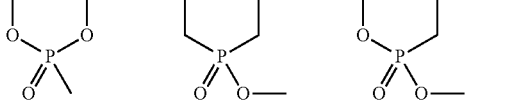
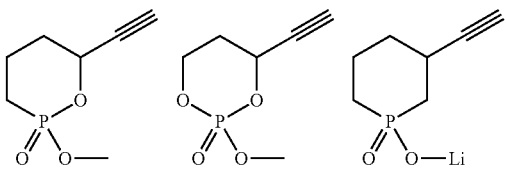

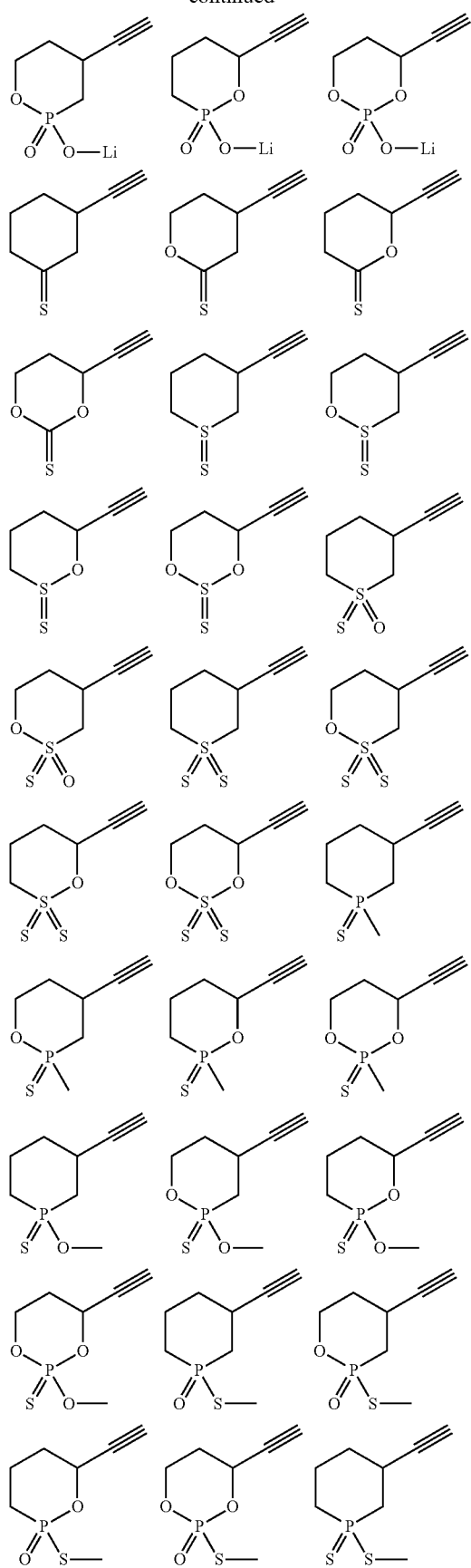
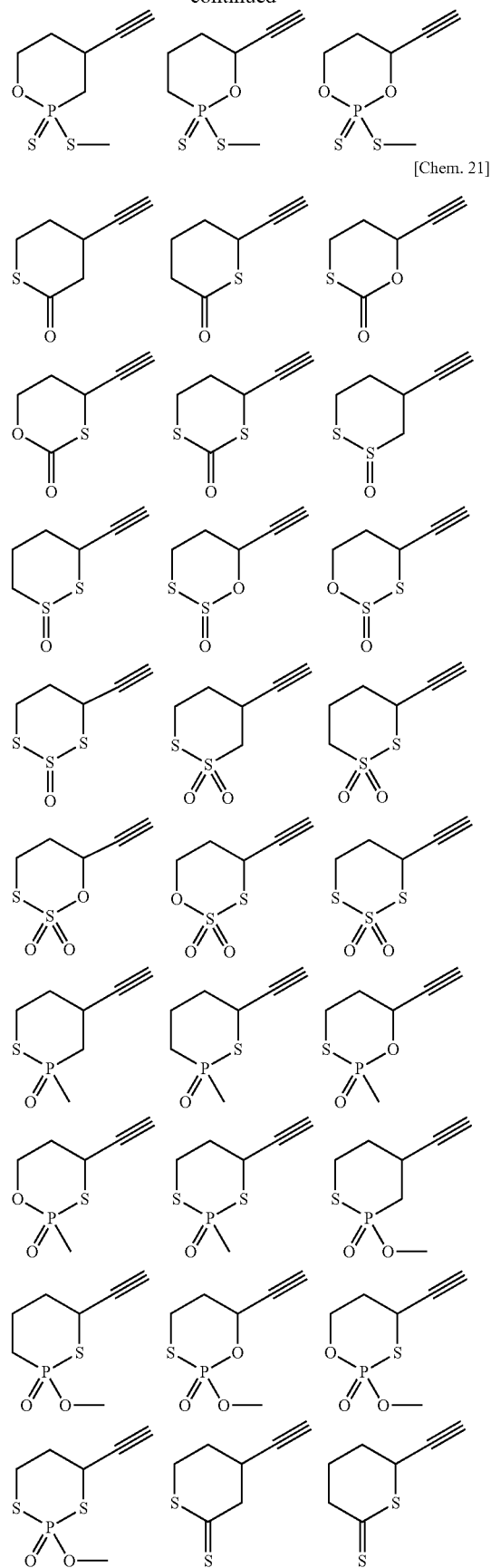

39
-continued
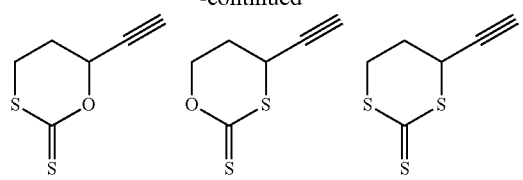
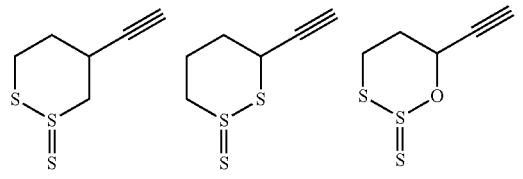
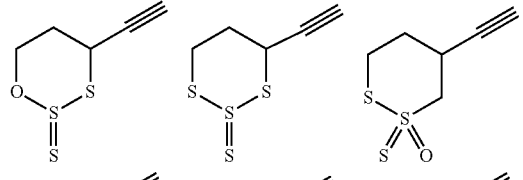
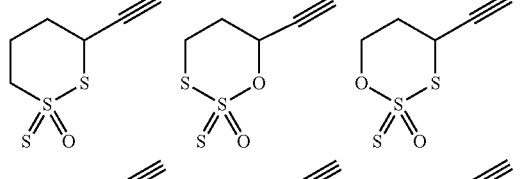
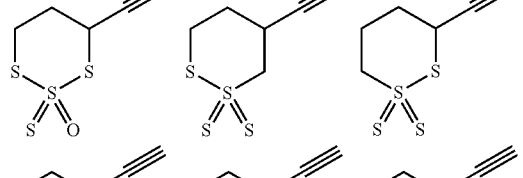
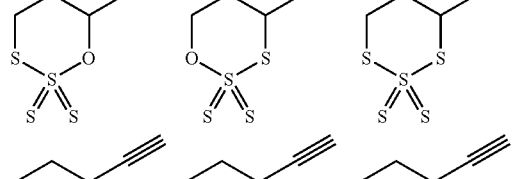
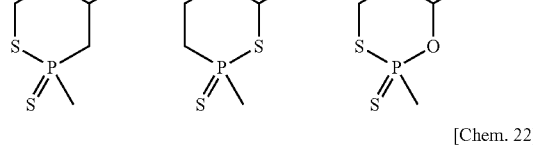
[Chem. 22]
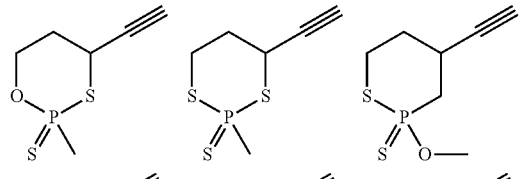
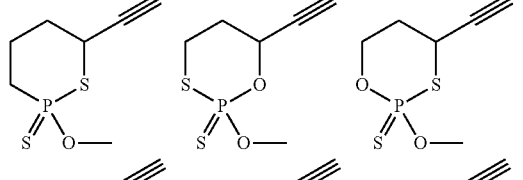
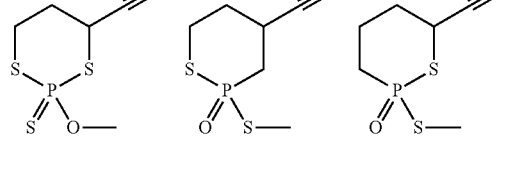
40
-continued
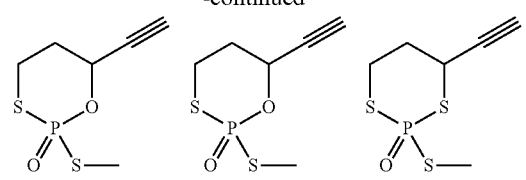
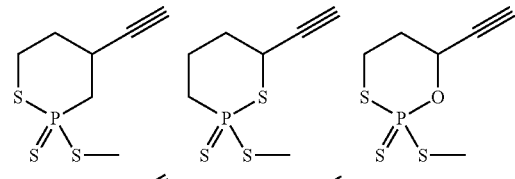
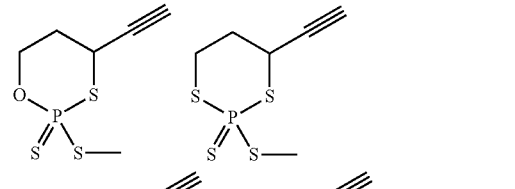
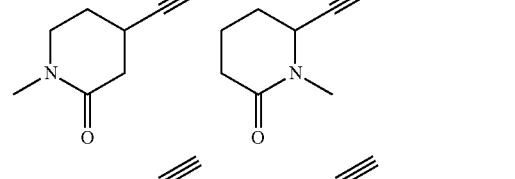
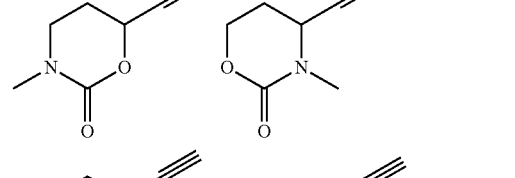
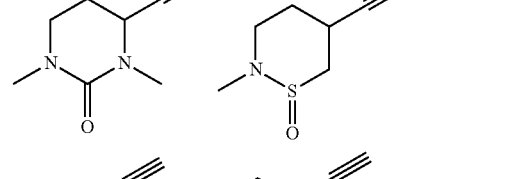
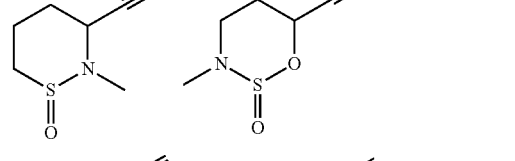
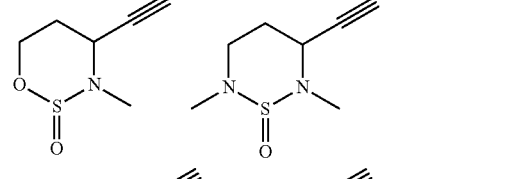
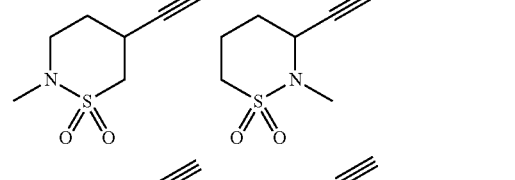
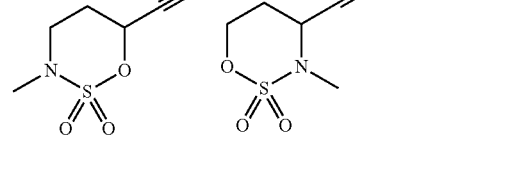

41
-continued
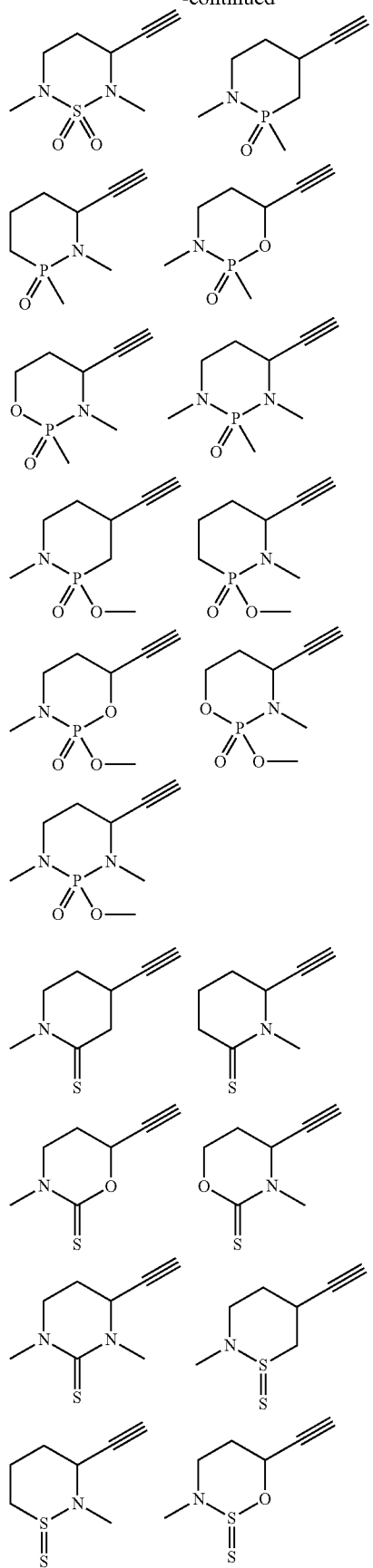
42
-continued
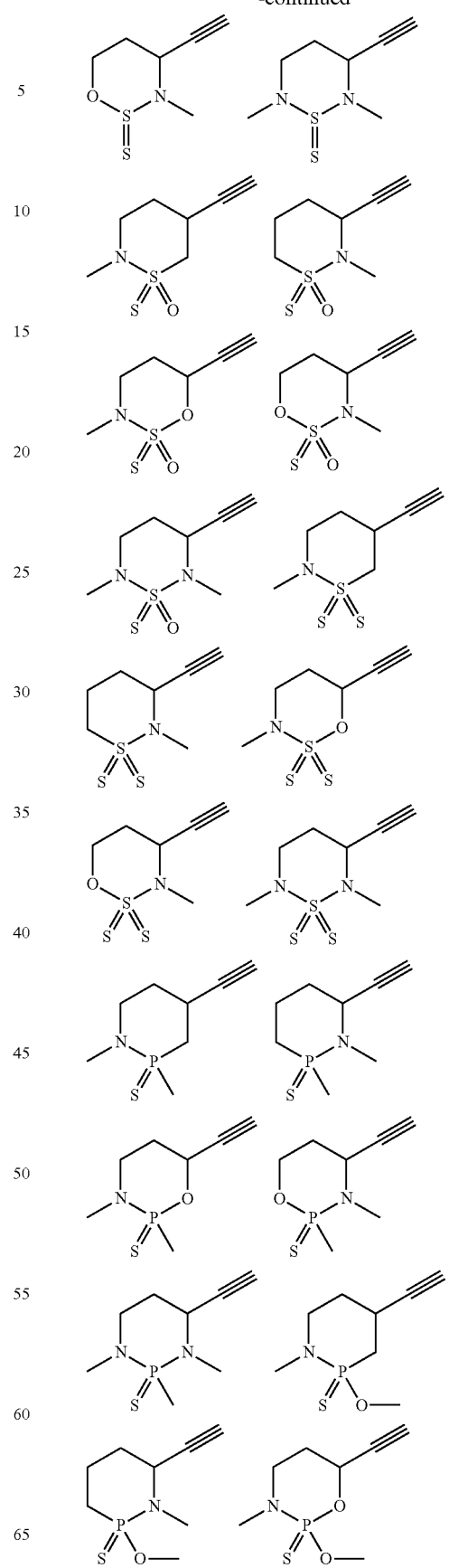
[Chem. 23]

-continued
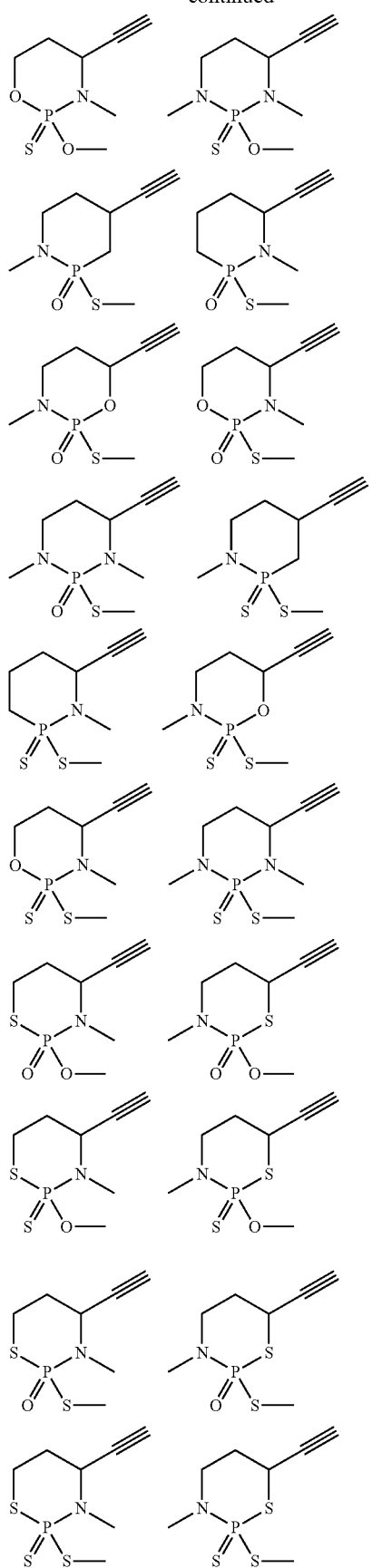
-continued
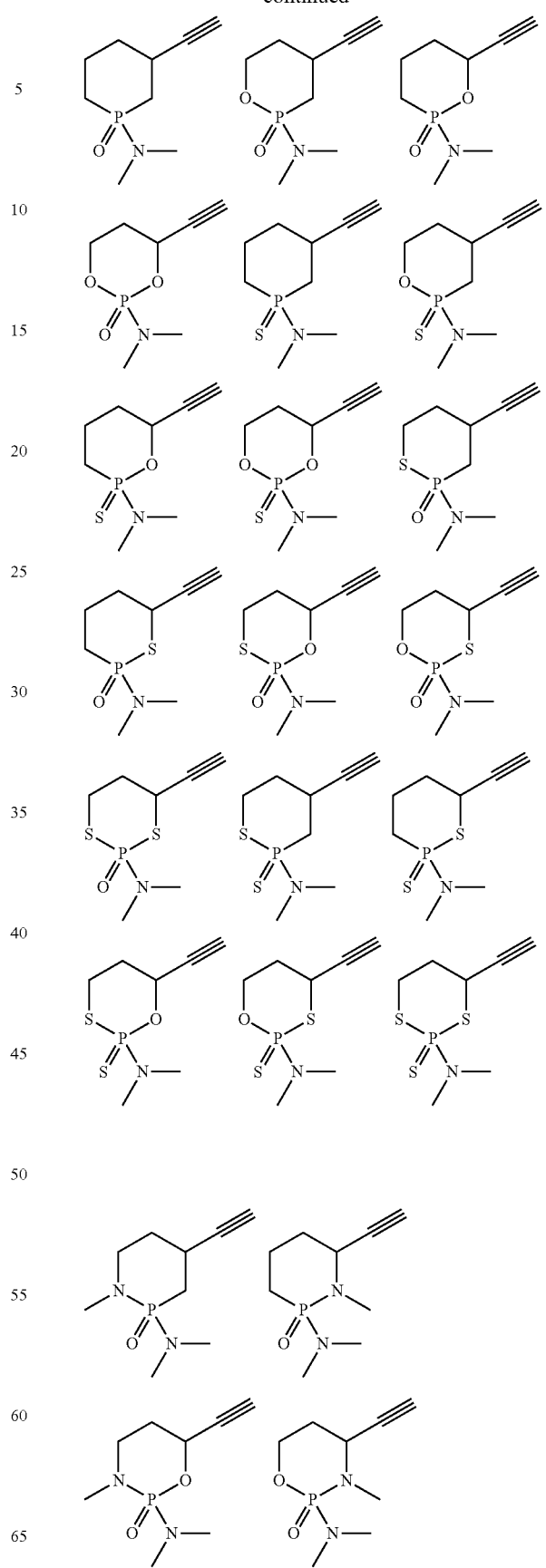
[Chem. 24]

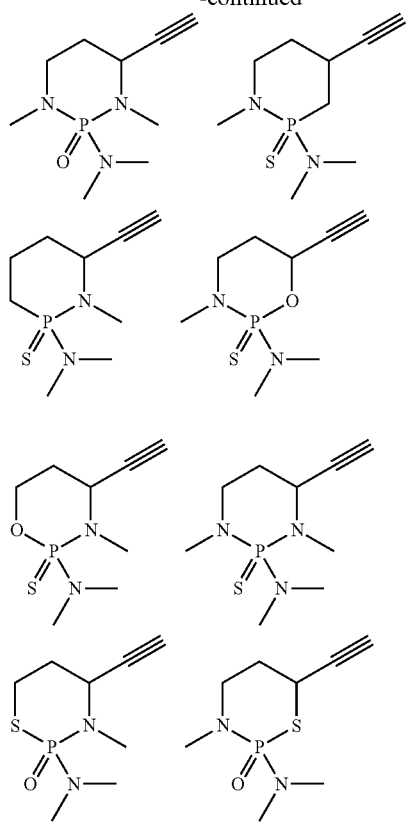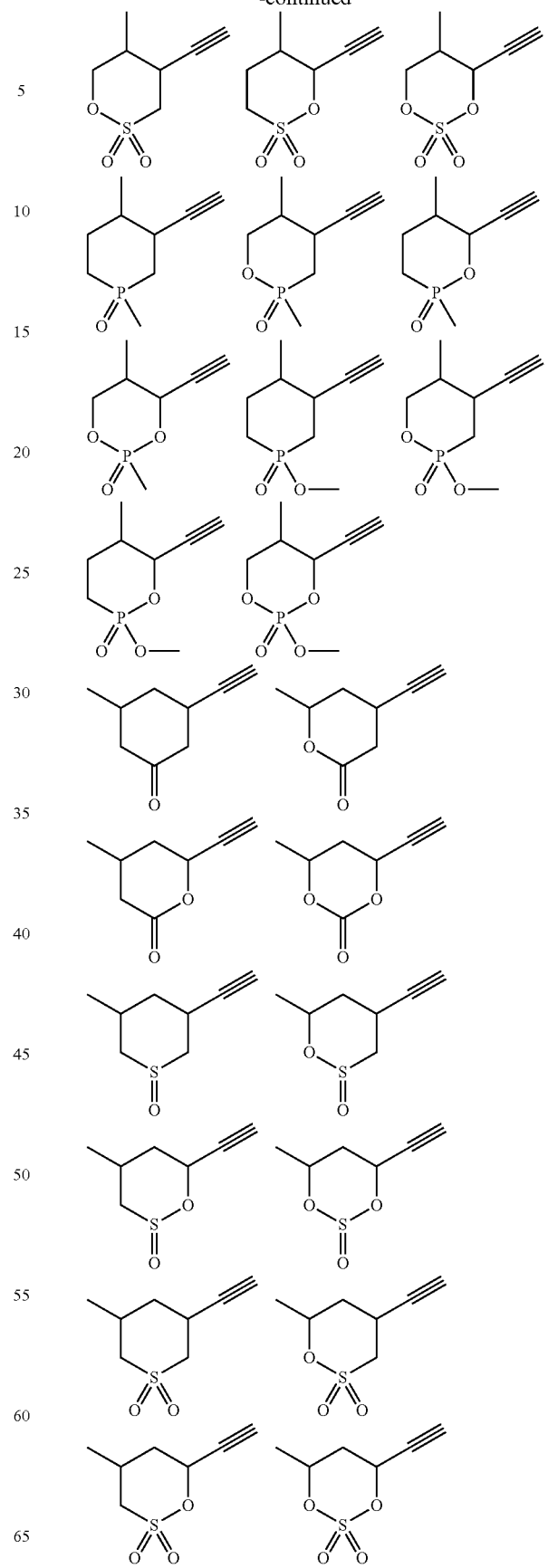

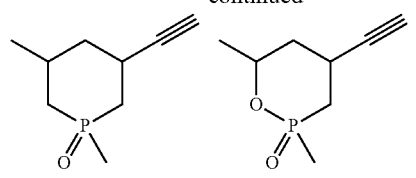
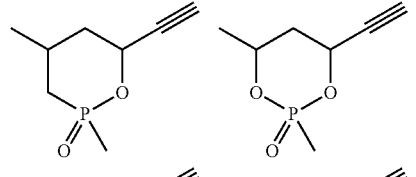
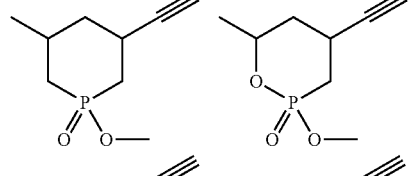
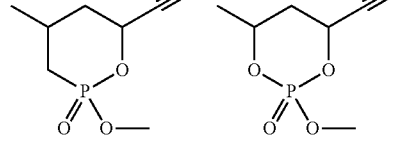
[Chem. 26]
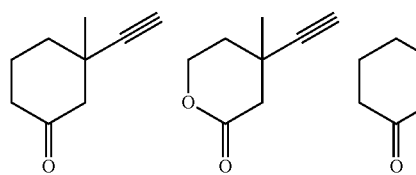
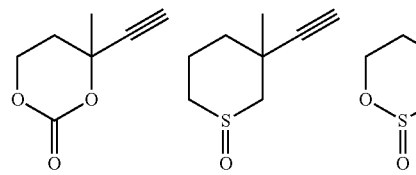
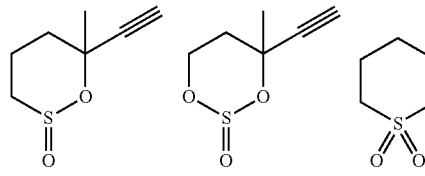
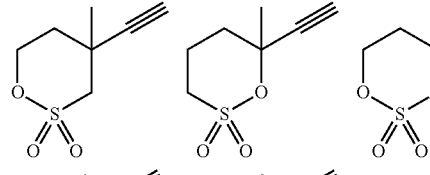
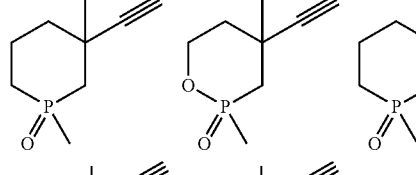
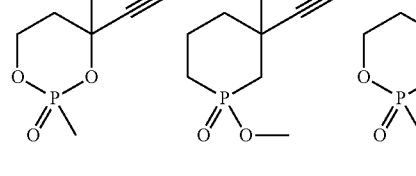
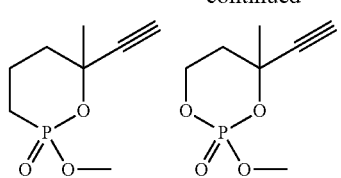
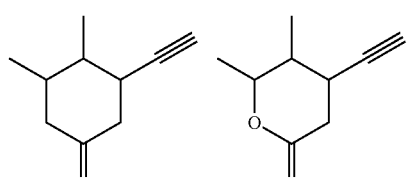
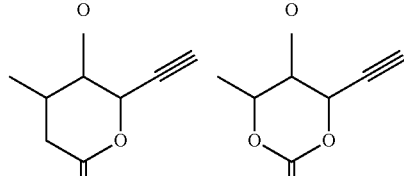
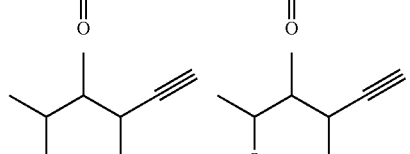
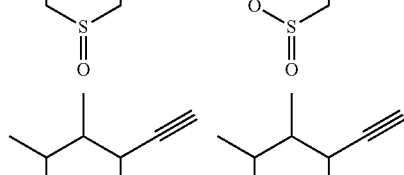
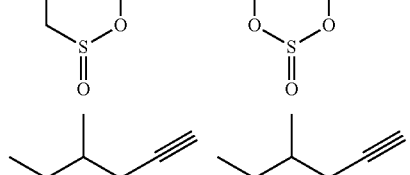
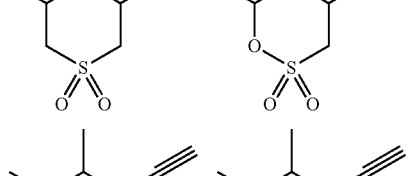
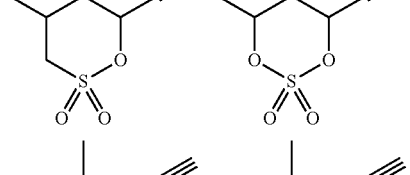
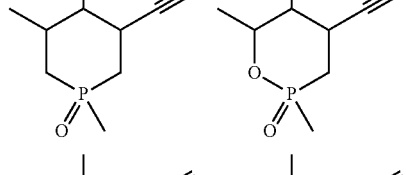
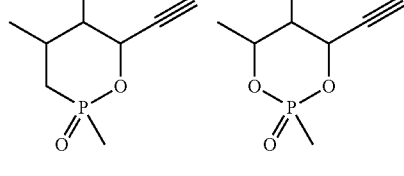

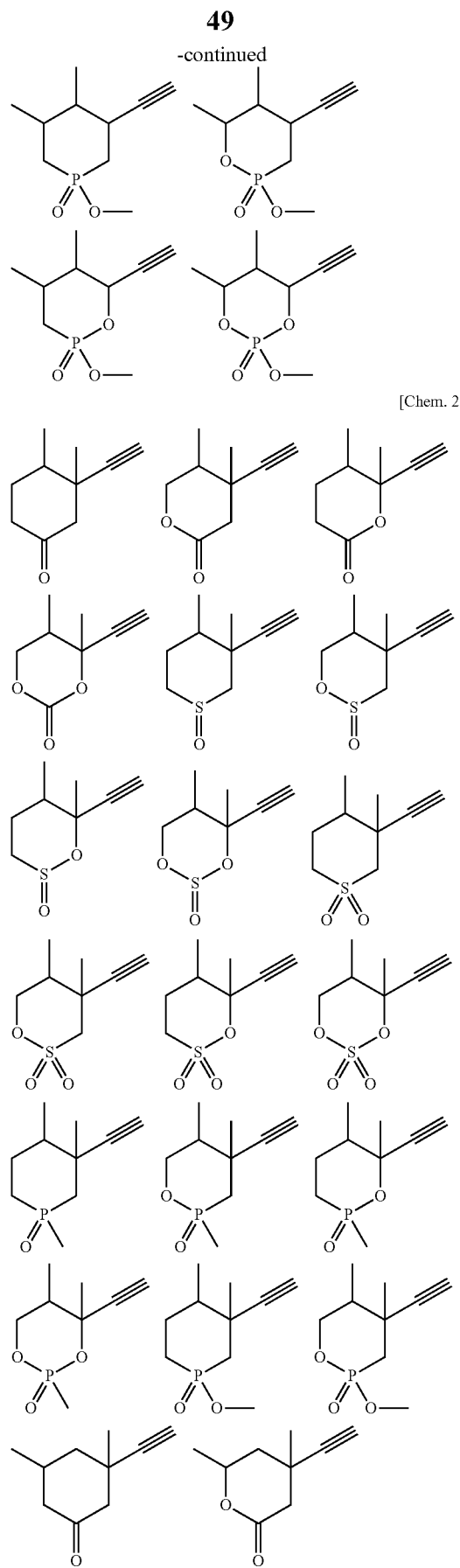
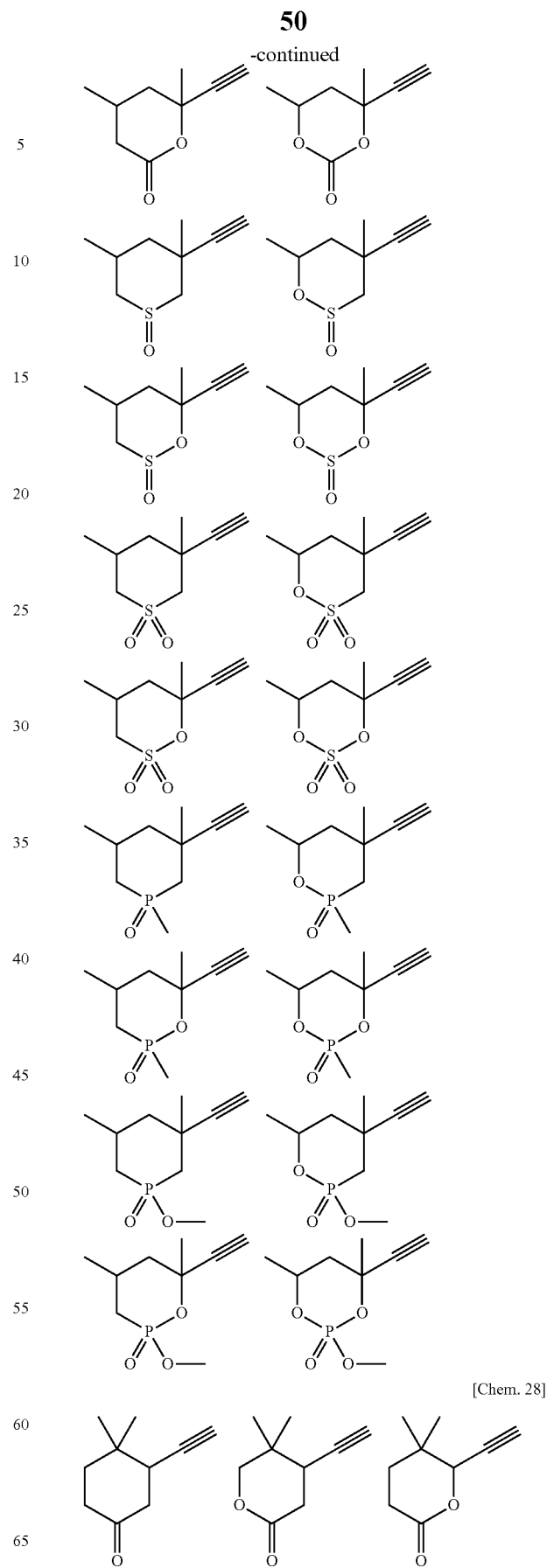

51
-continued

52
-continued

[Chem. 29]

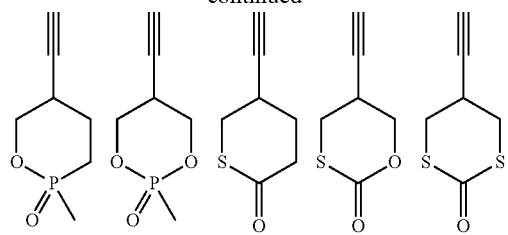
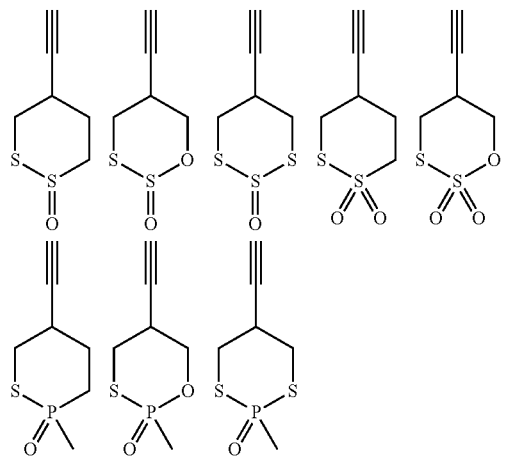
[Chem. 30]
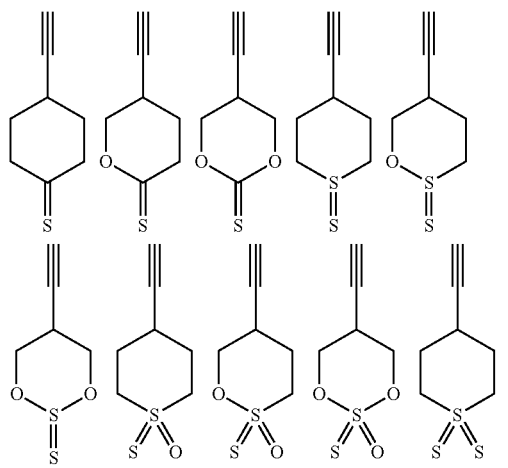
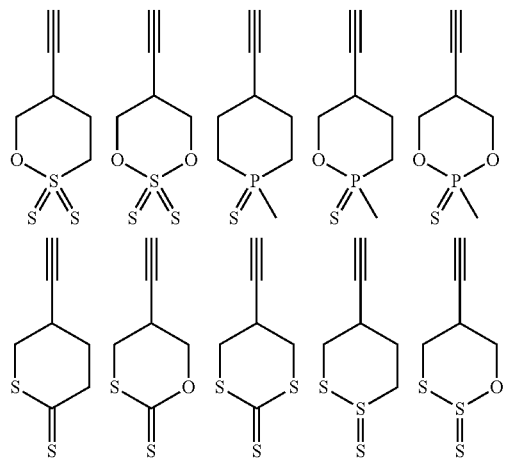
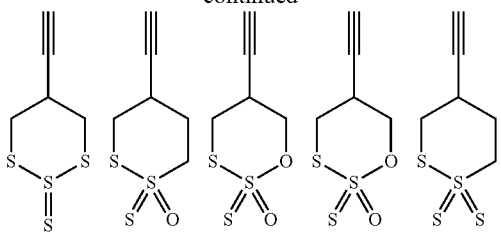
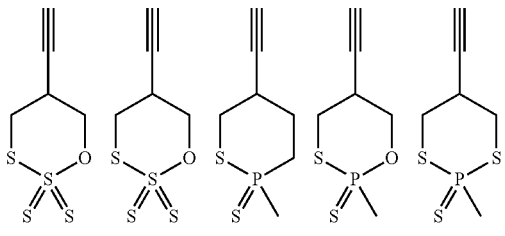
[Chem. 31]
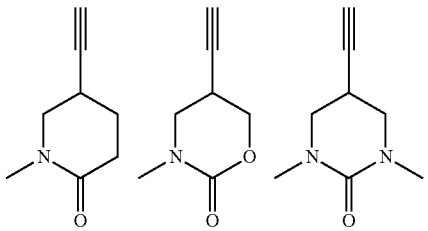
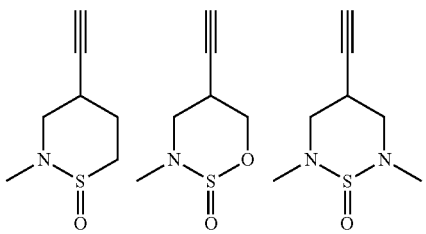
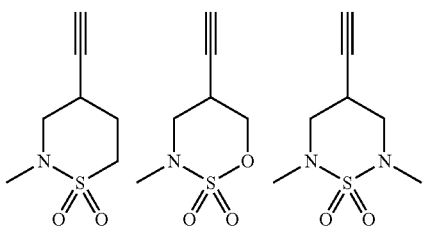
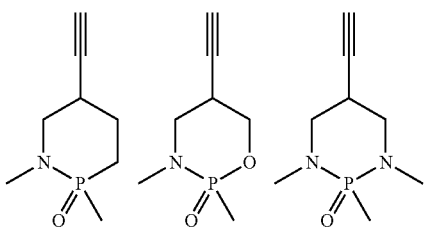
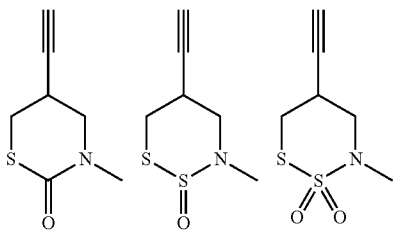

-continued
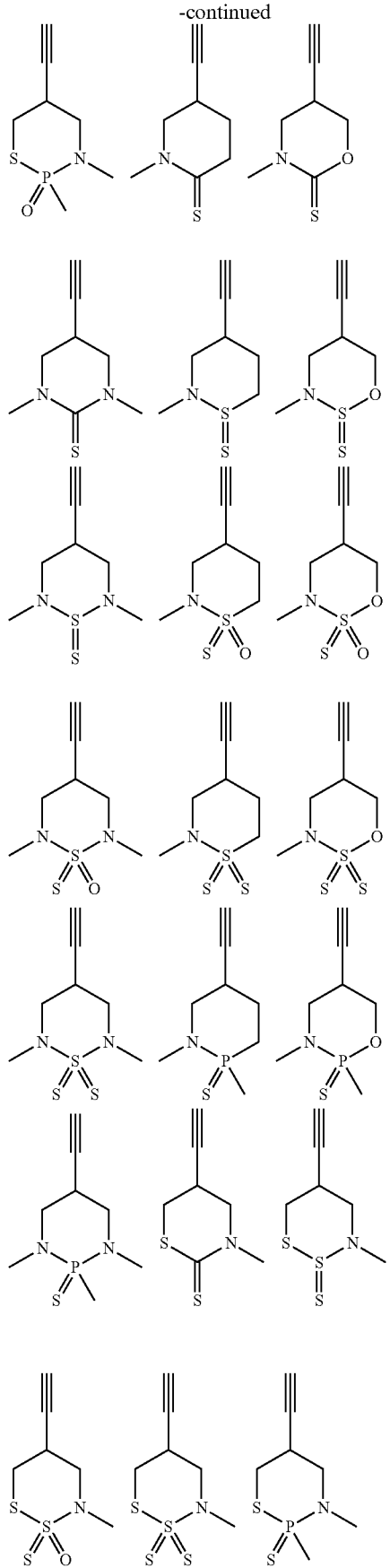
-continued
[Chem. 32]
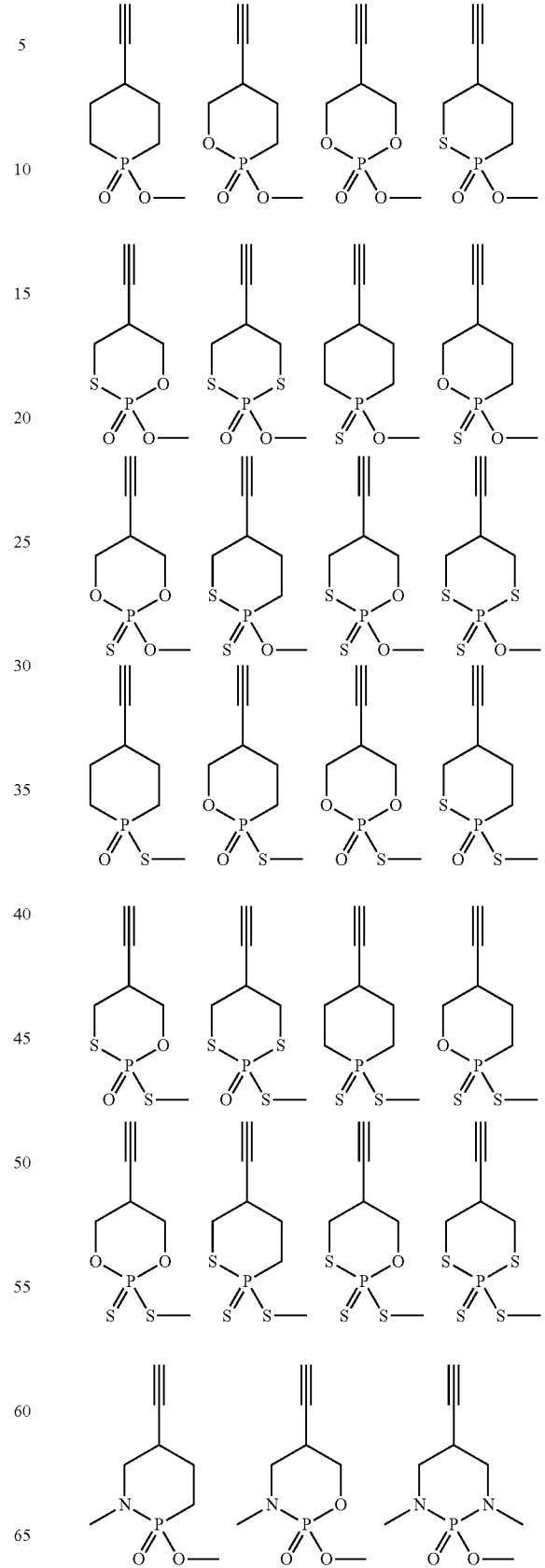

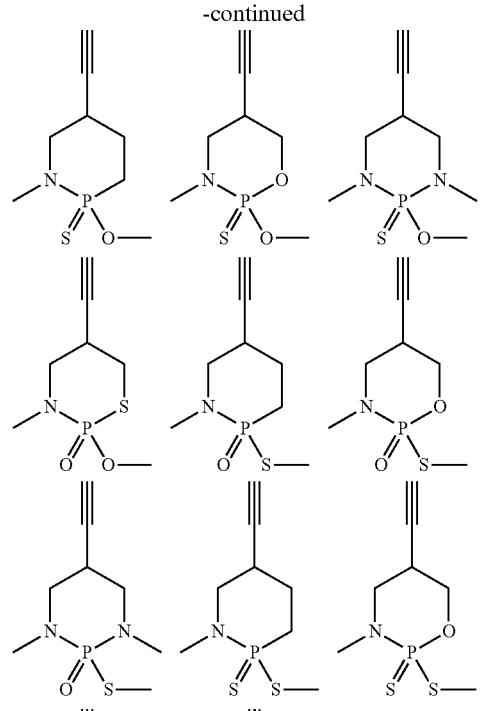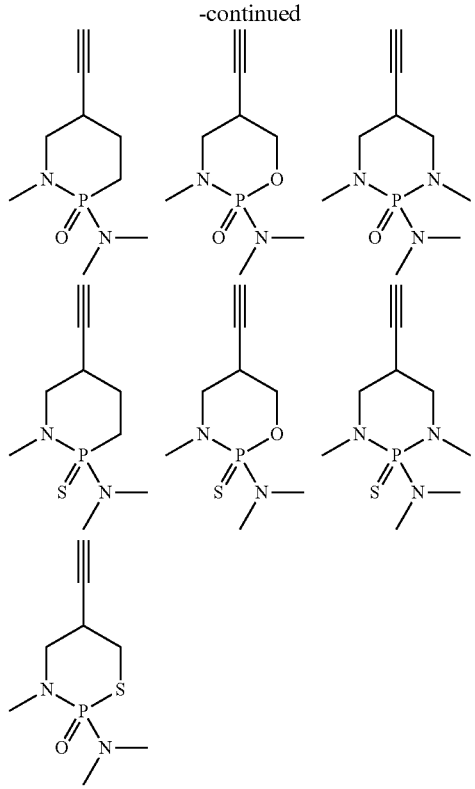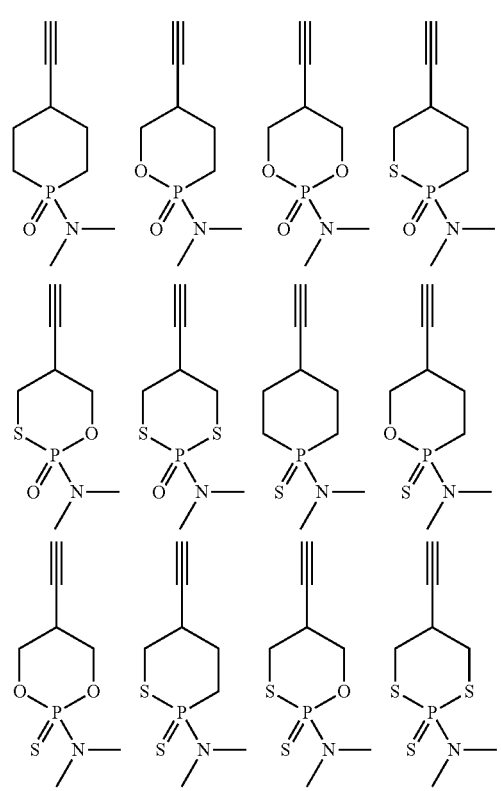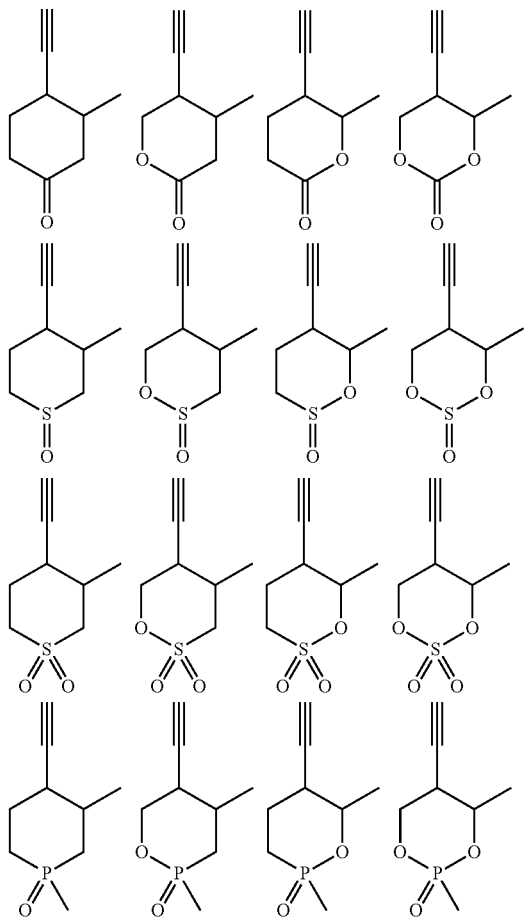

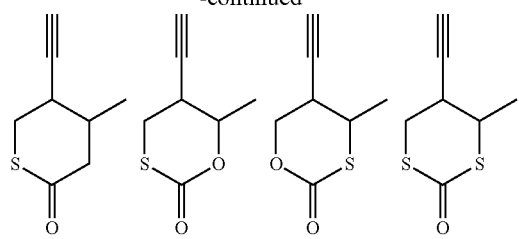
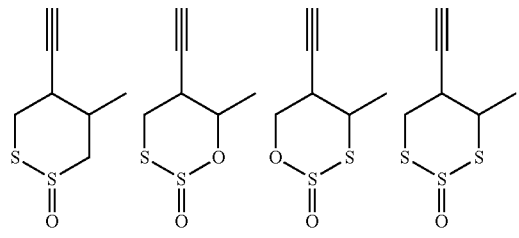
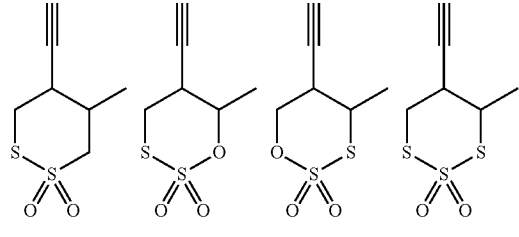
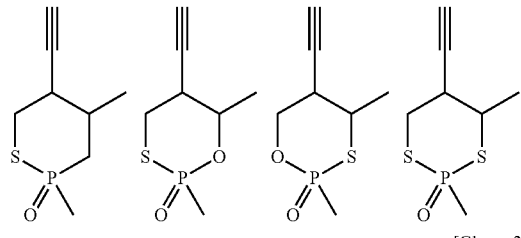
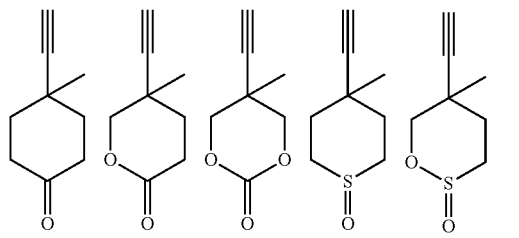
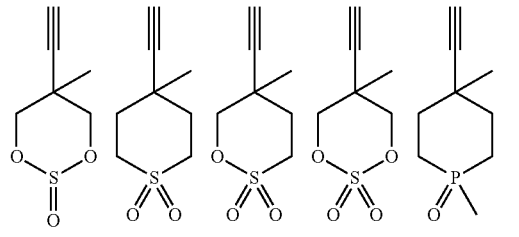
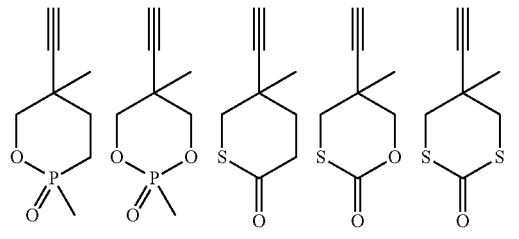
[Chem. 35]
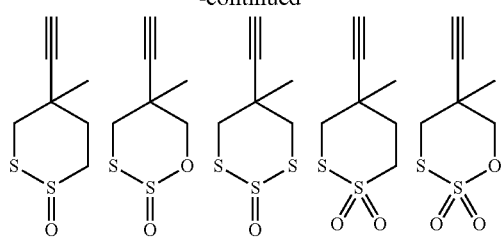
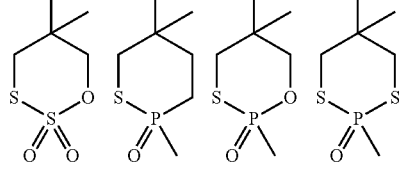
[Chem. 36]
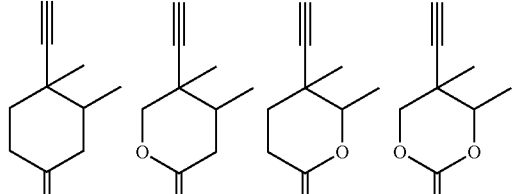
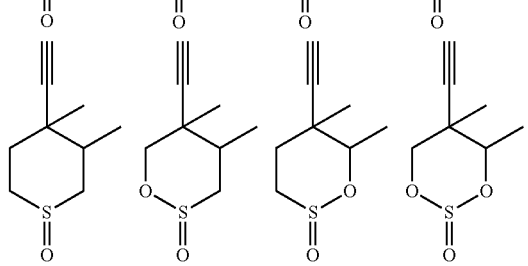
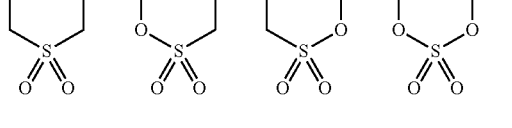
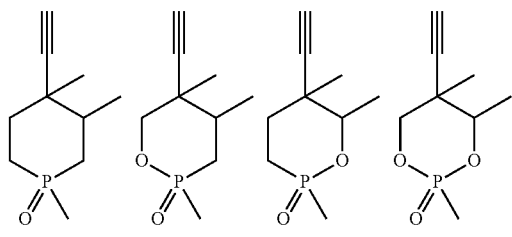
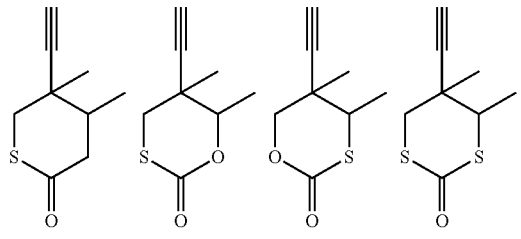

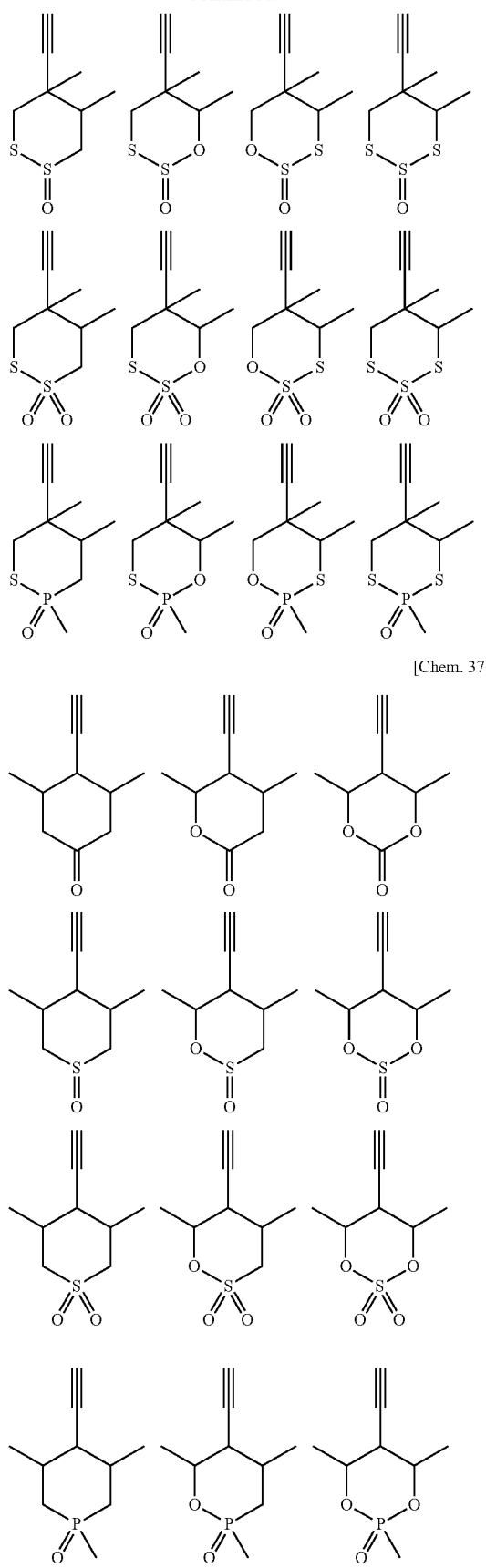
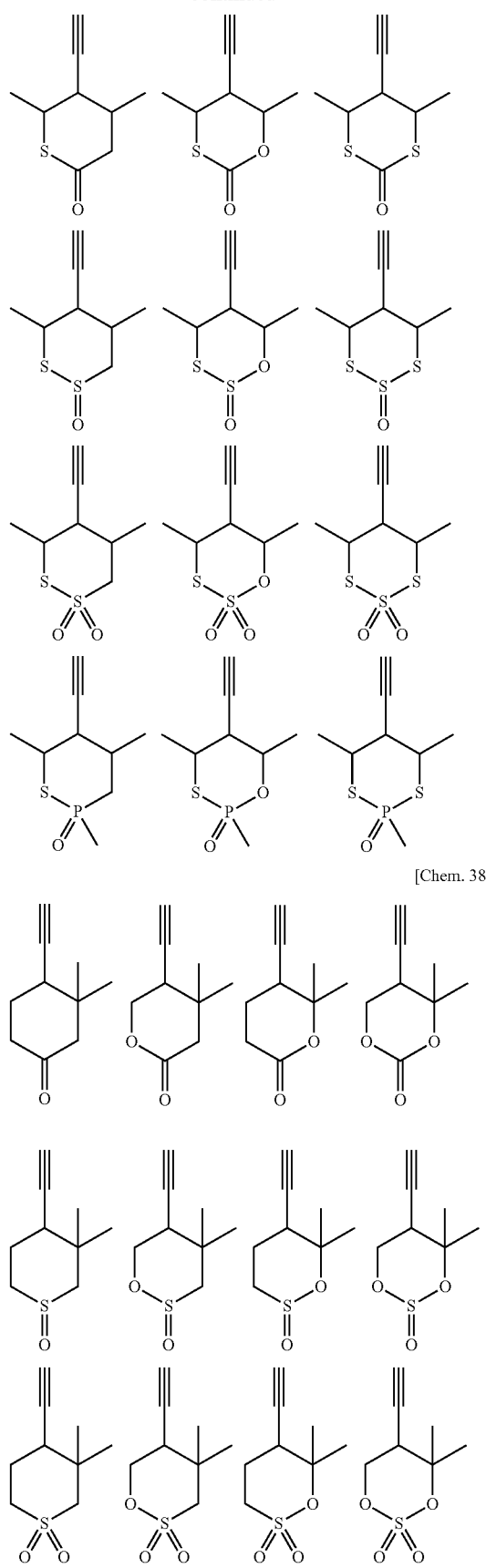

-continued
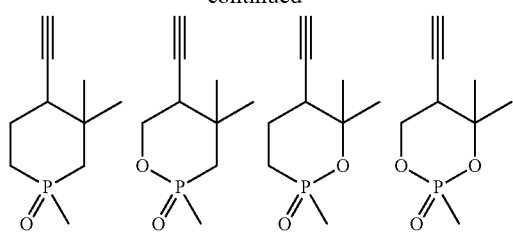
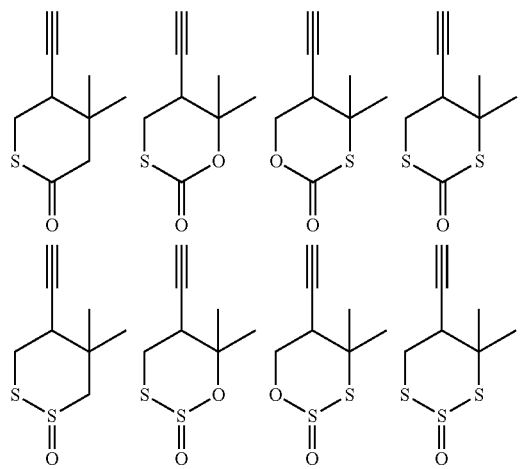
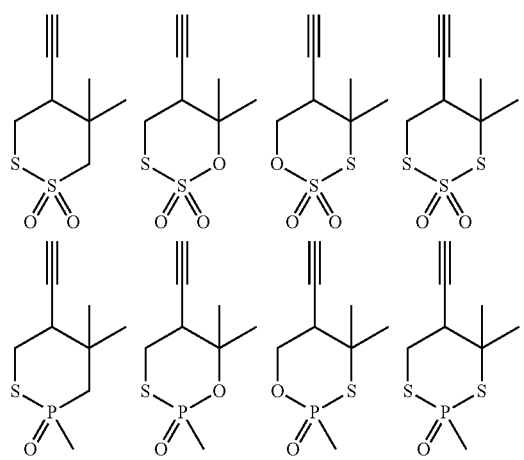
[Chem. 39]
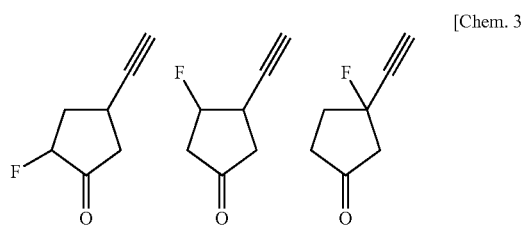
-continued
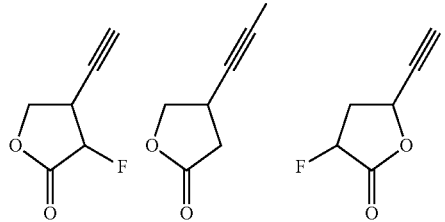
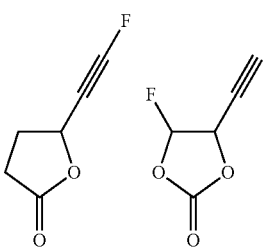
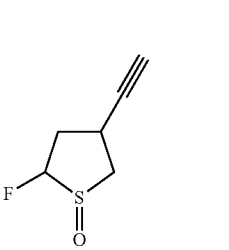
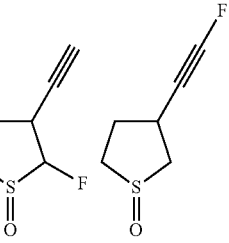
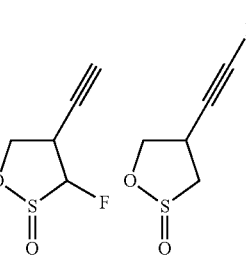
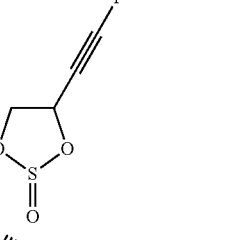

[Chem. 40]
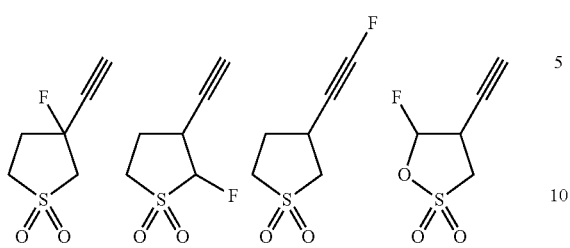
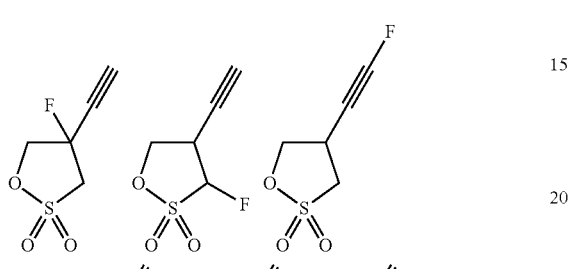
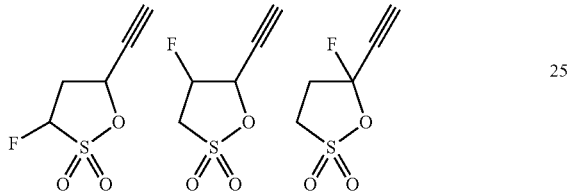
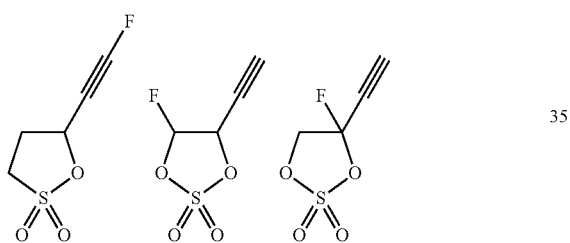
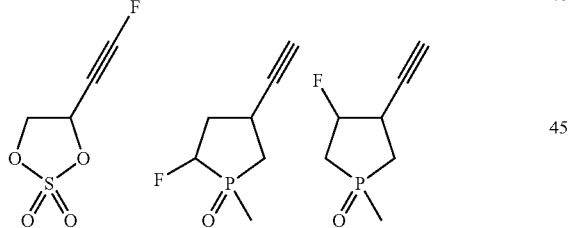
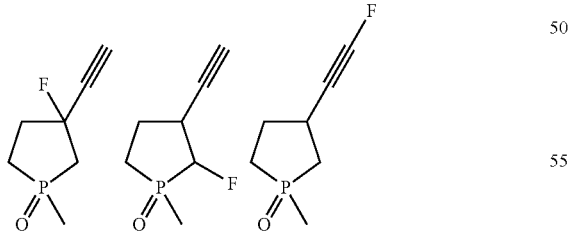
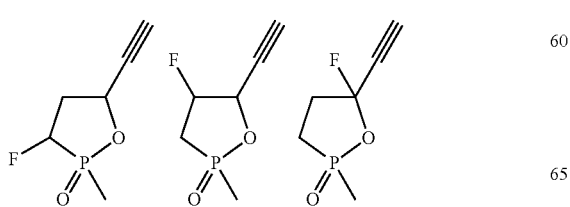
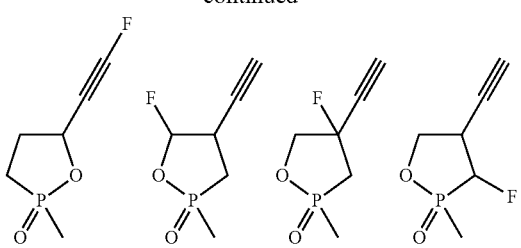
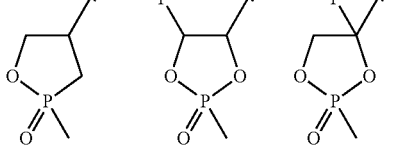
[Chem. 41]
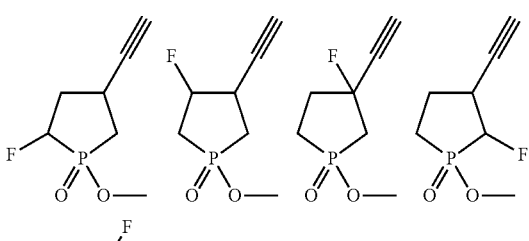
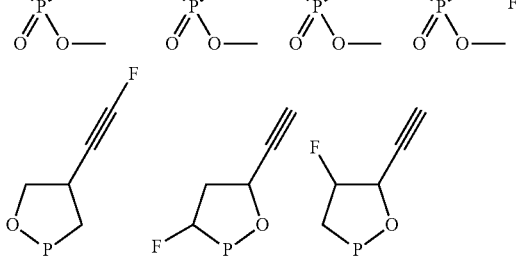
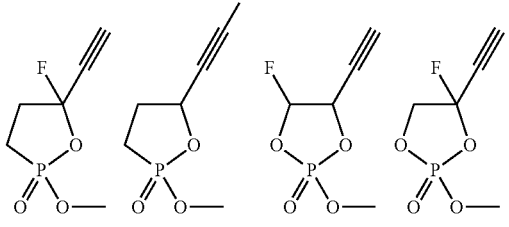

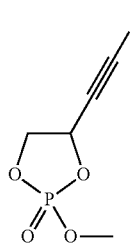
[Chem. 42]
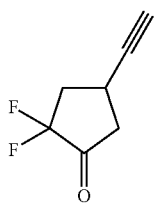
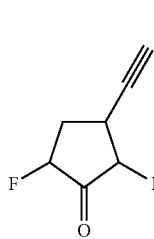
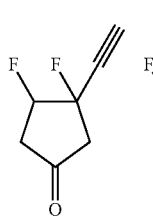
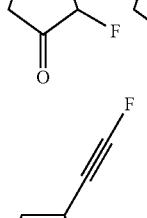
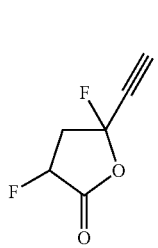
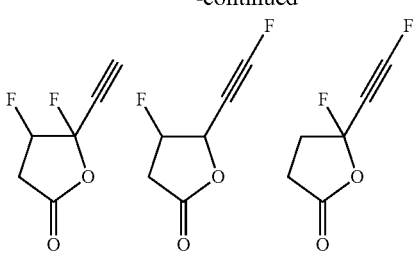
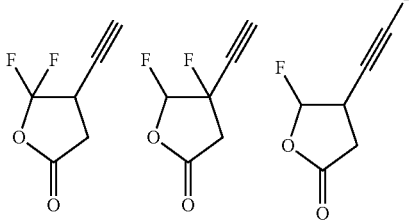
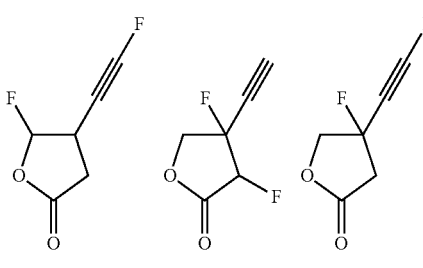
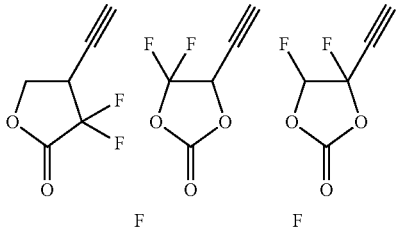
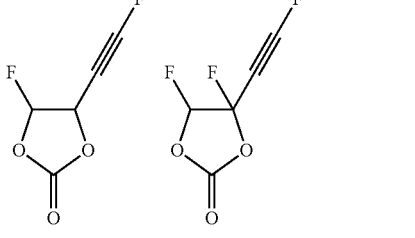
[Chem. 43]
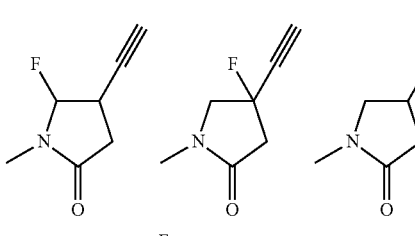
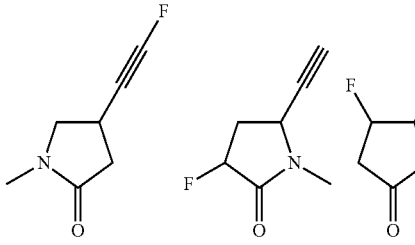

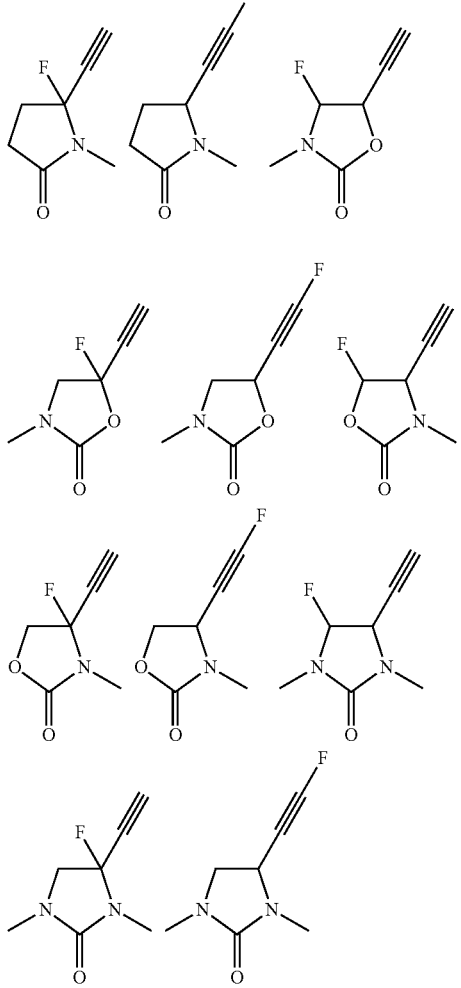
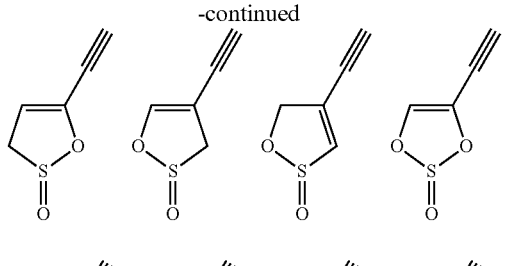
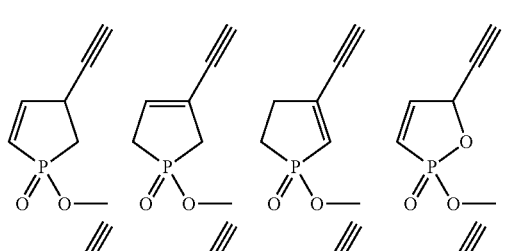
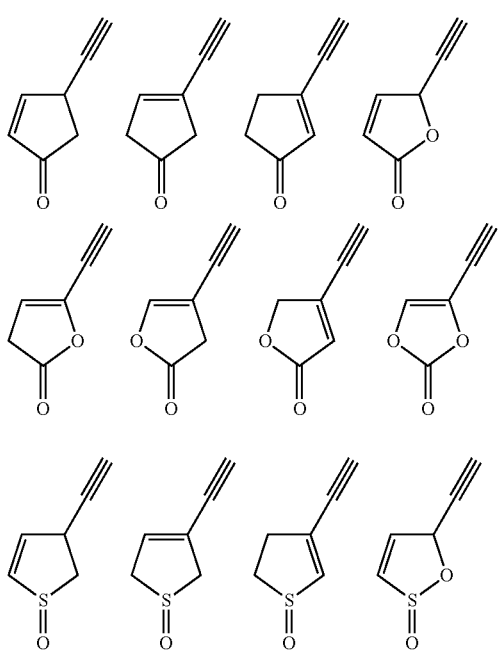
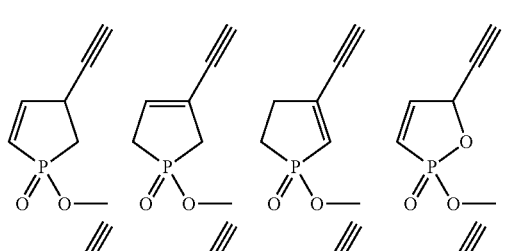
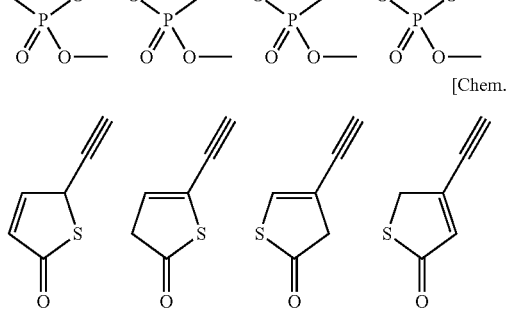
[Chem. 44]
[Chem. 45]

-continued
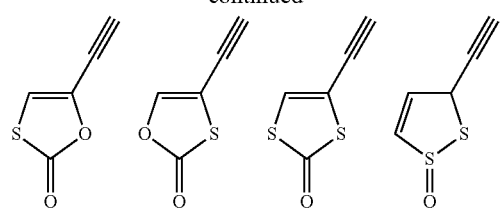
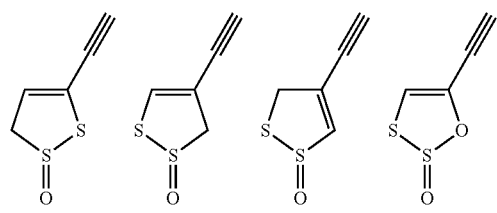
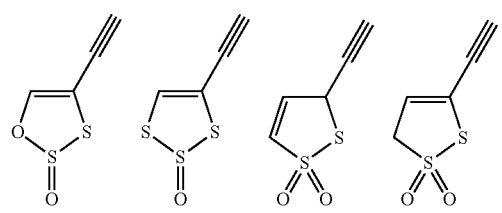
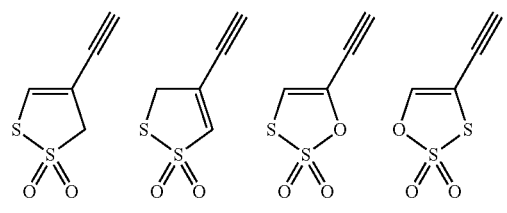
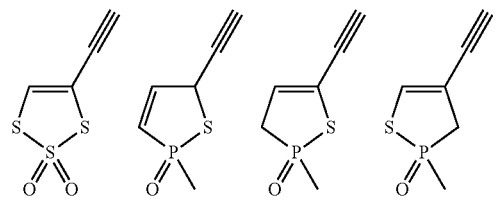
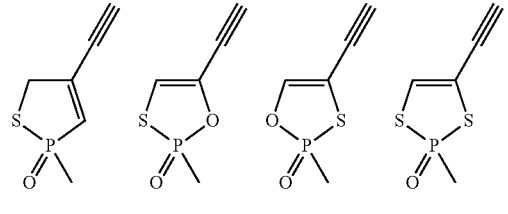
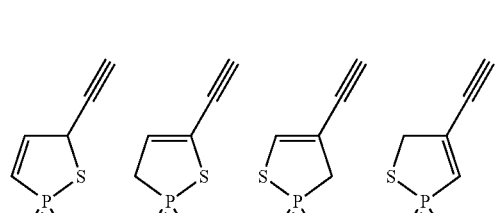
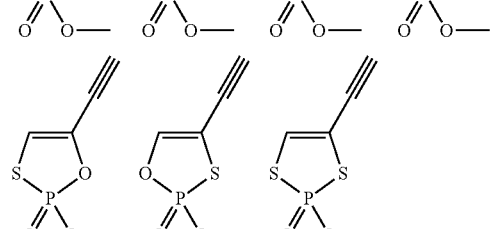
-continued
[Chem. 46]
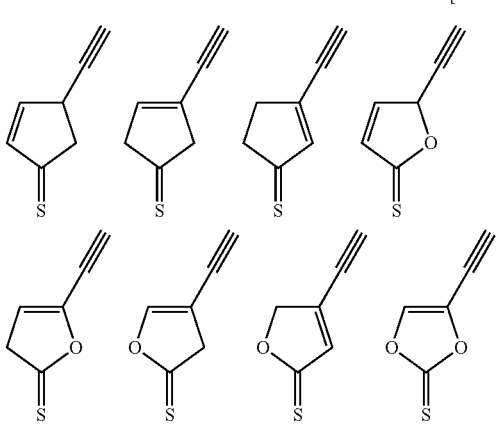
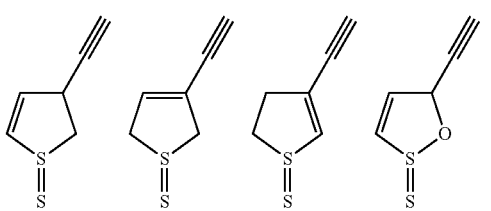
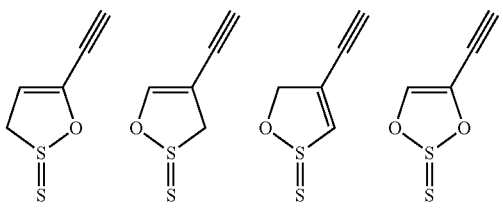
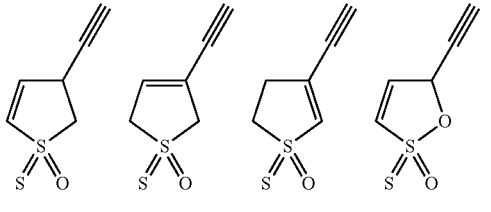
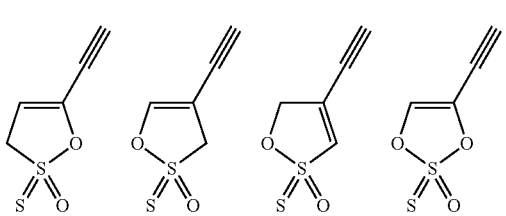
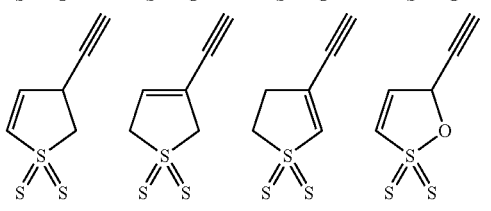
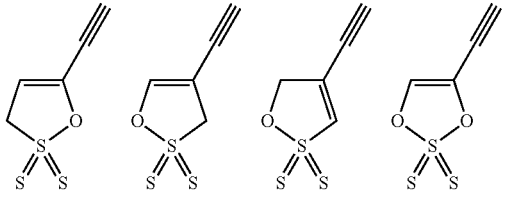

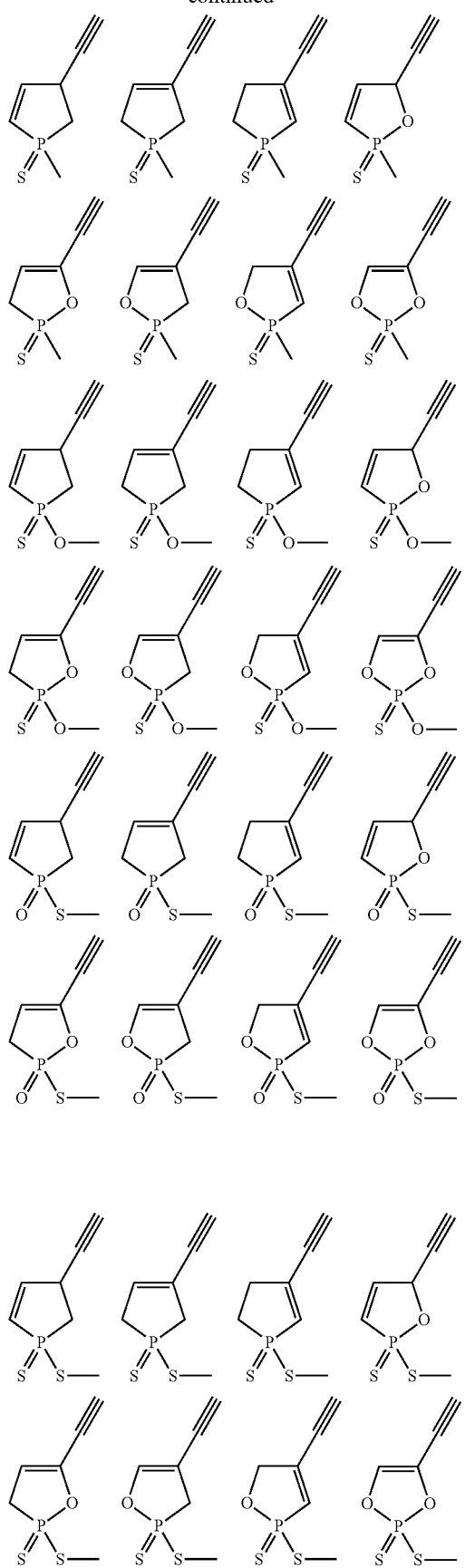
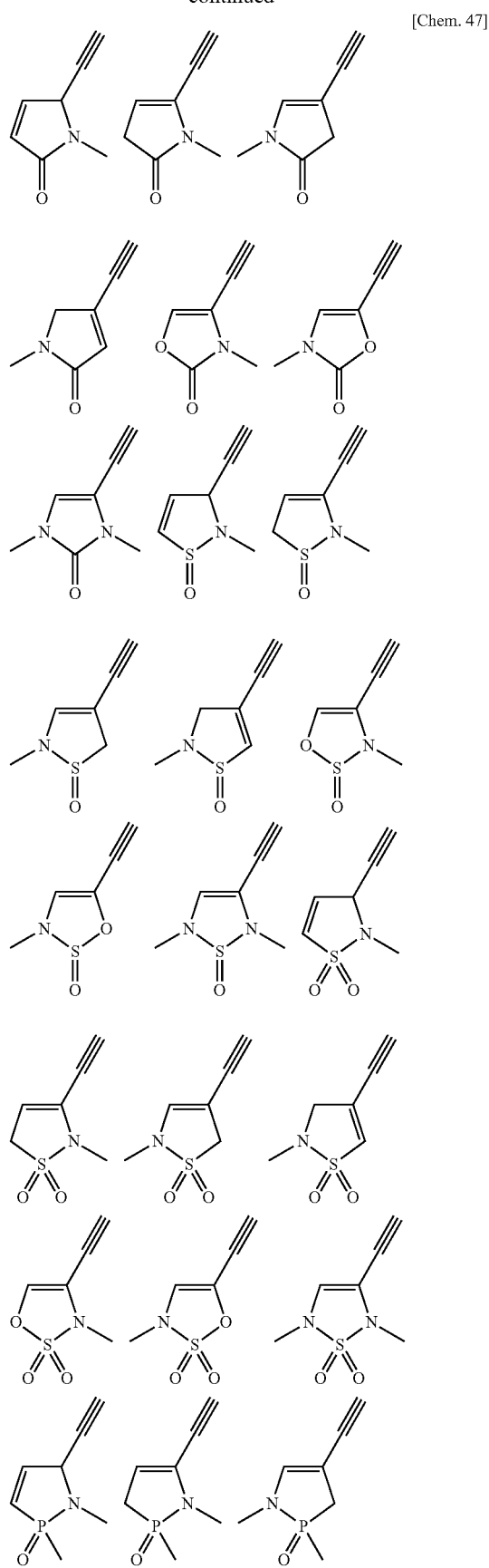

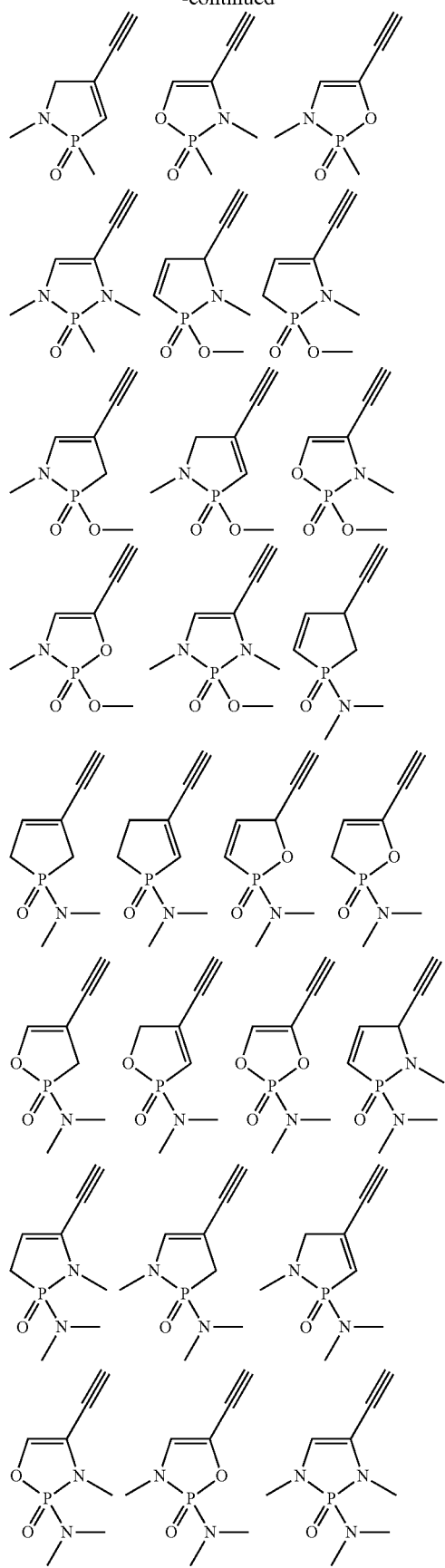
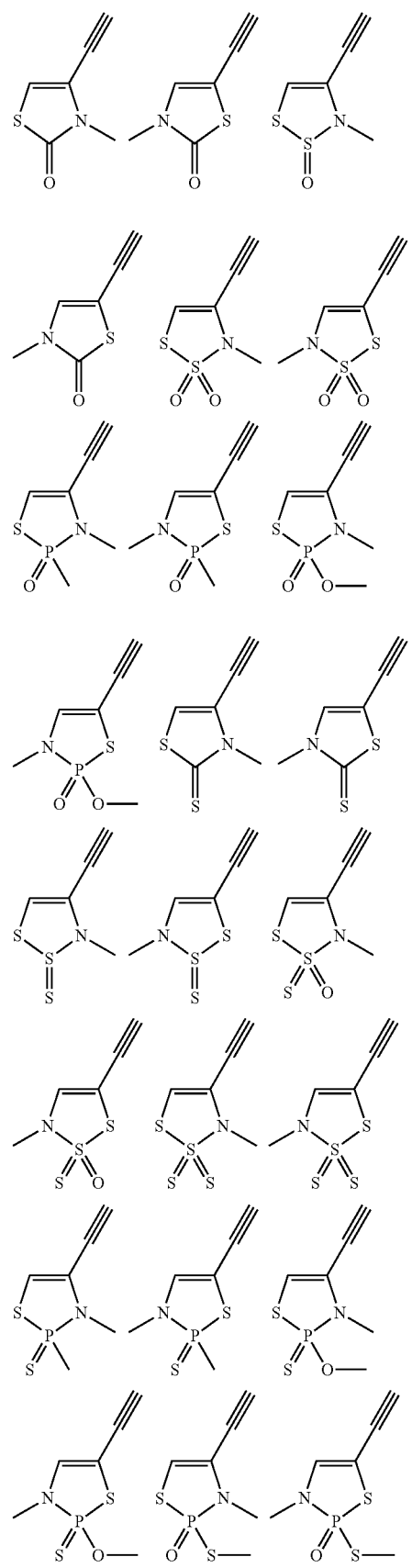
[Chem. 48]

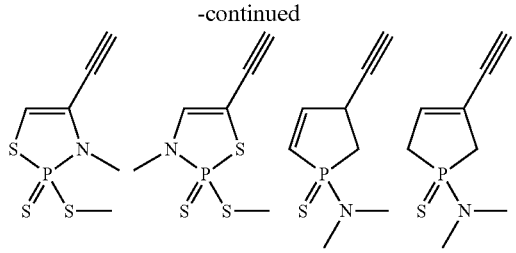
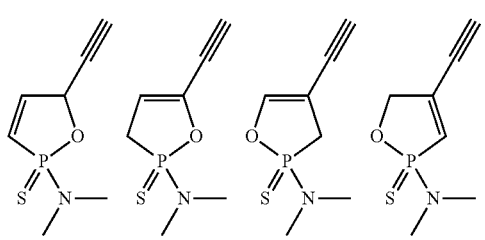
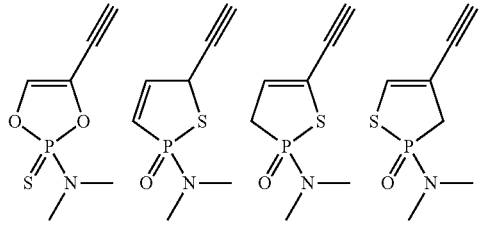
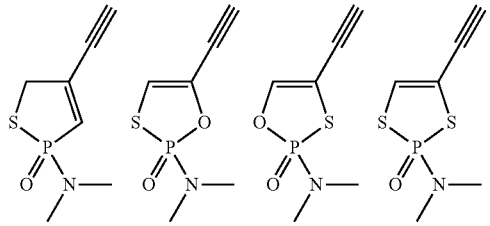
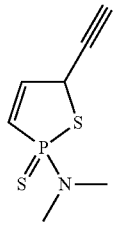
[Chem. 49]
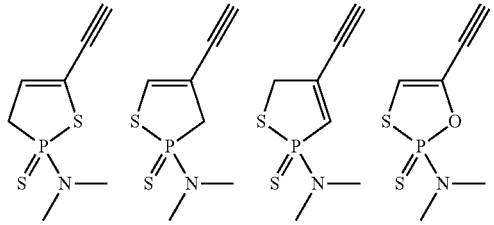
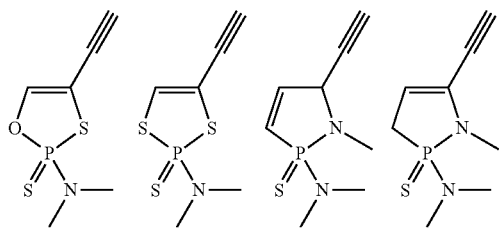
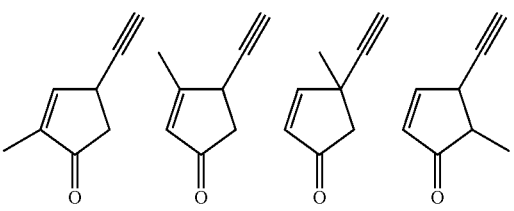
[Chem. 50]
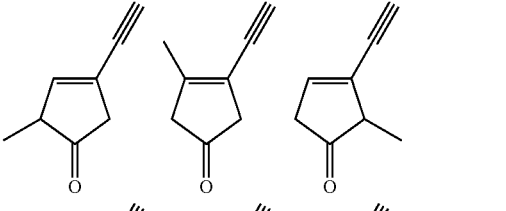
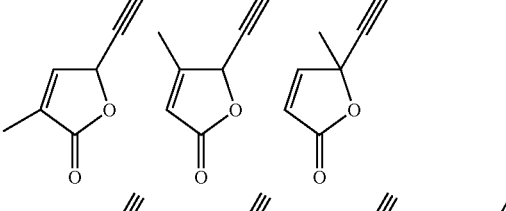
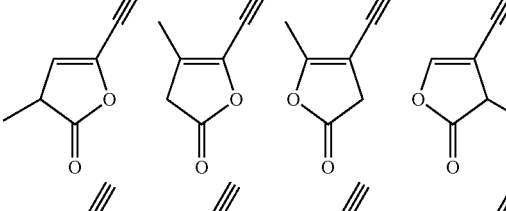
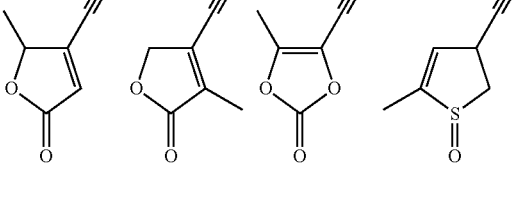

-continued
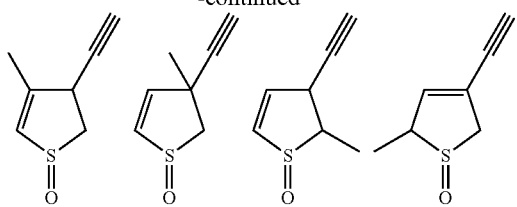
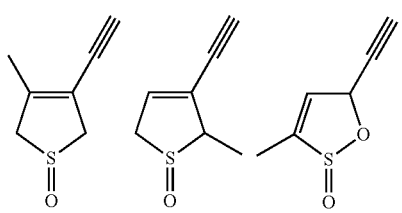
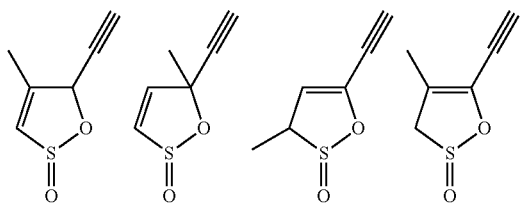
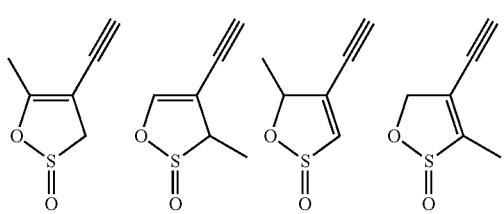
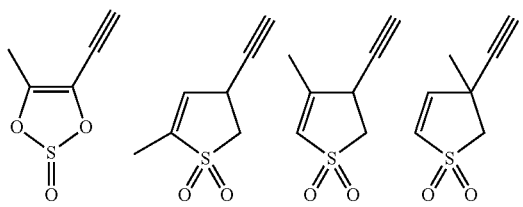
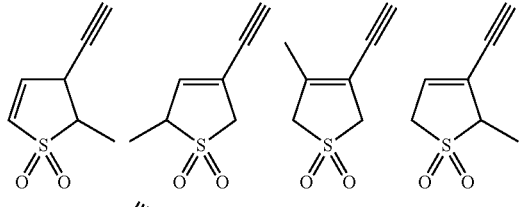
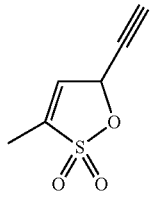
[Chem. 51]
-continued
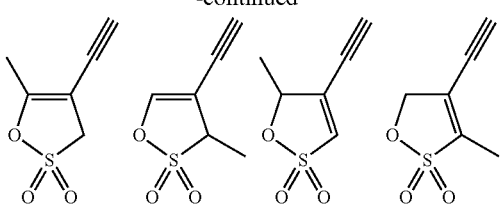
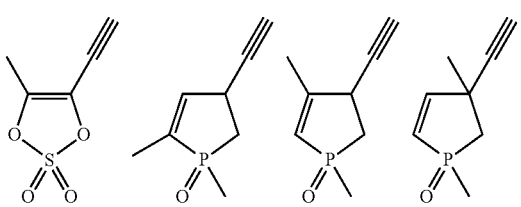
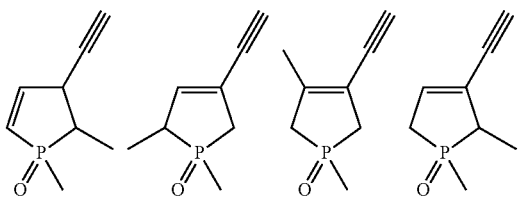
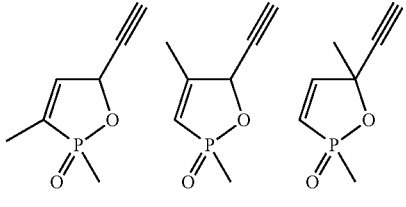
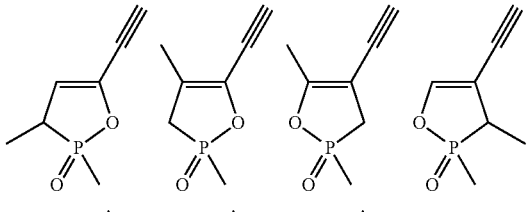
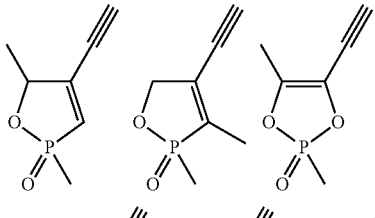
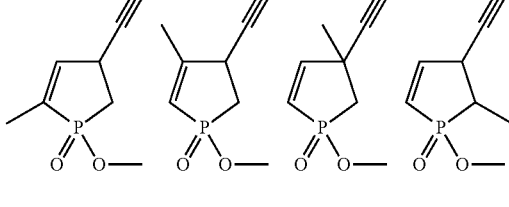
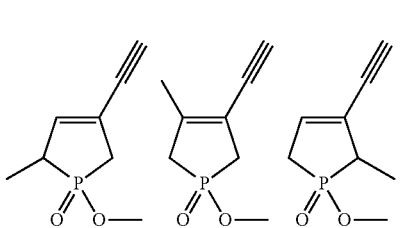

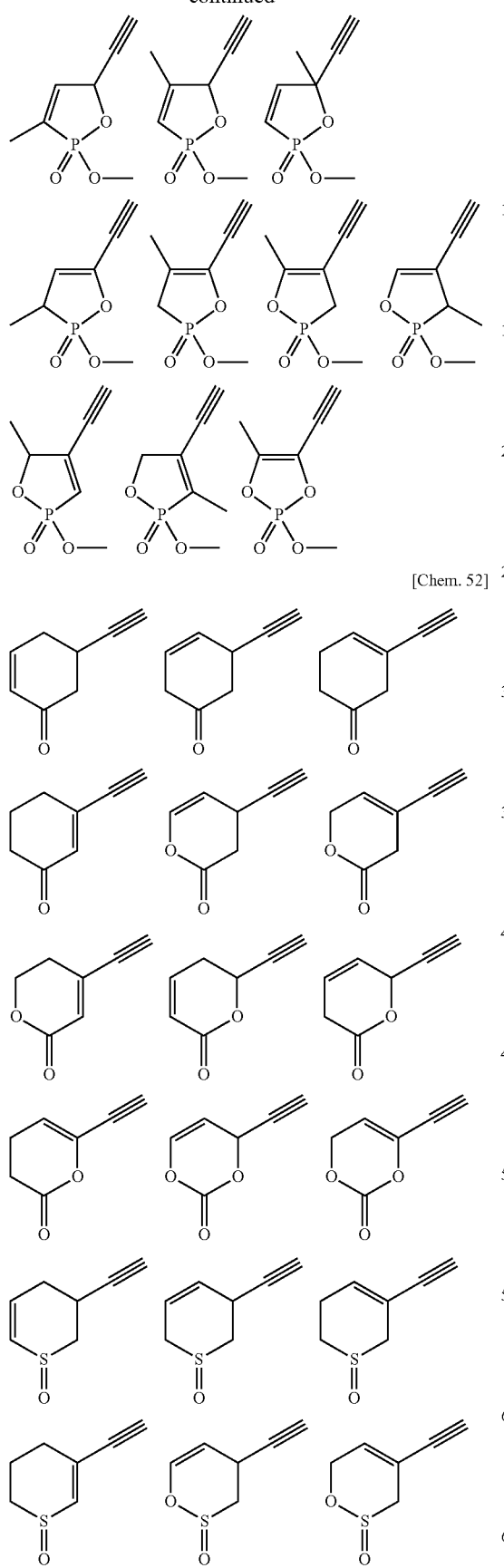
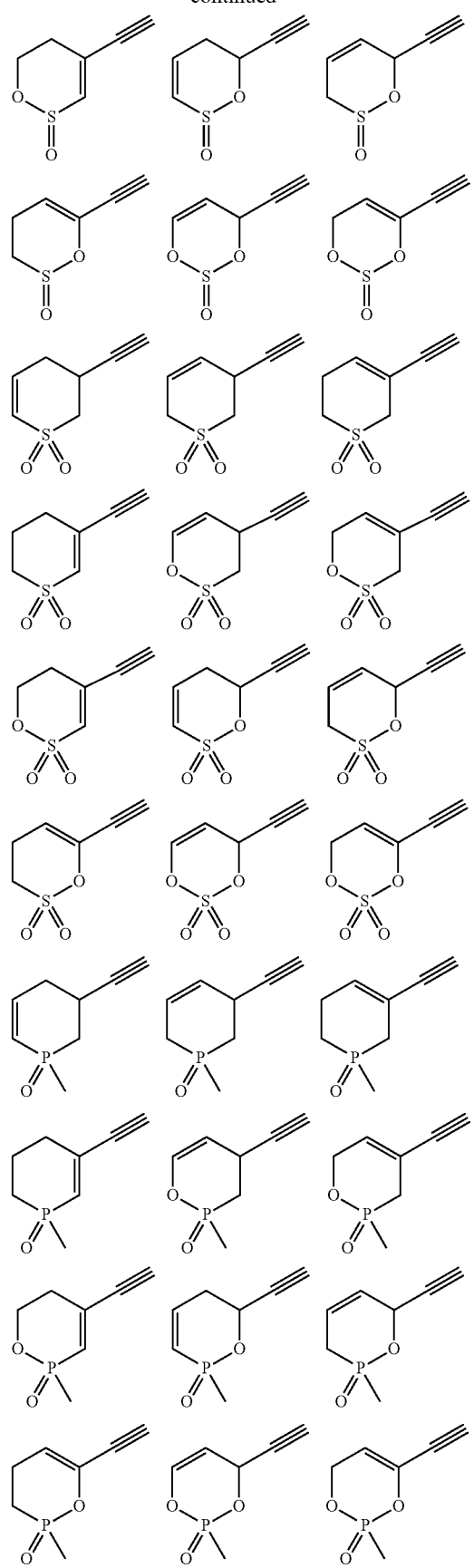

[Chem. 53]
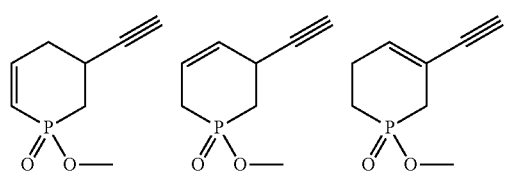
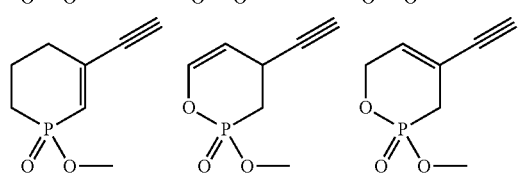
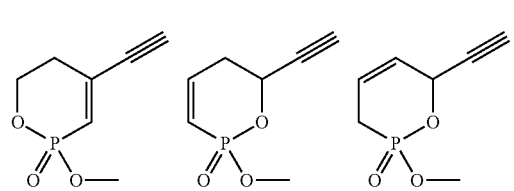
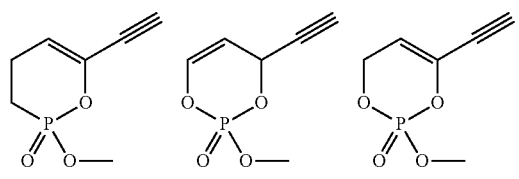
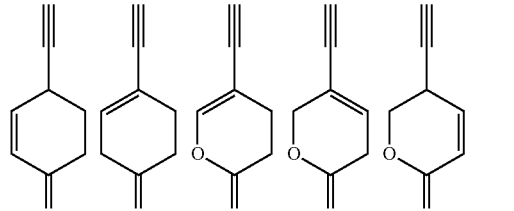
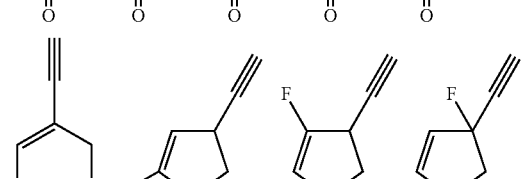
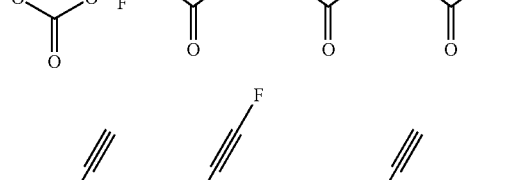
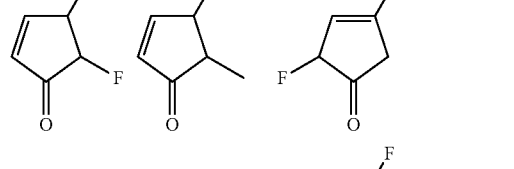
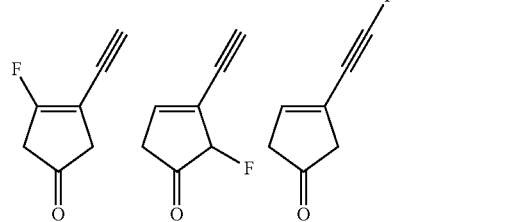
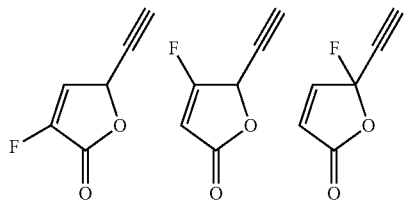
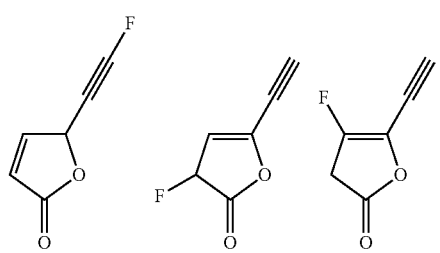
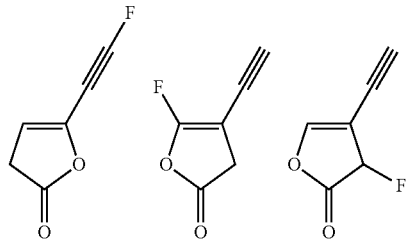
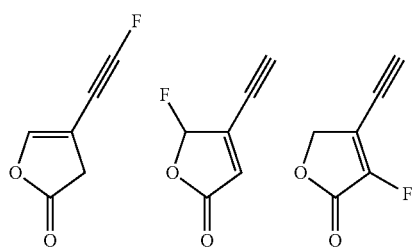
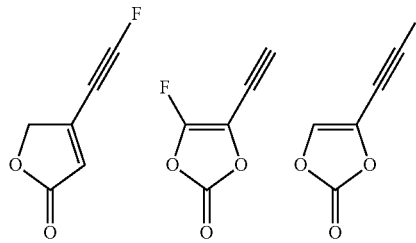
[Chem. 54]
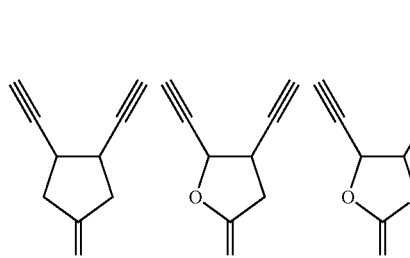
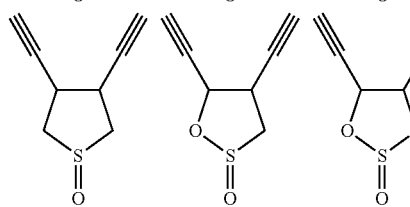

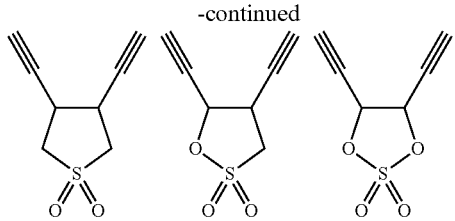
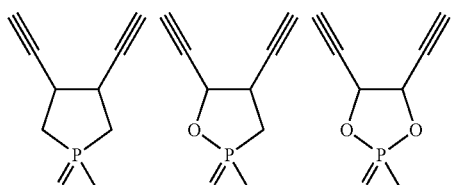
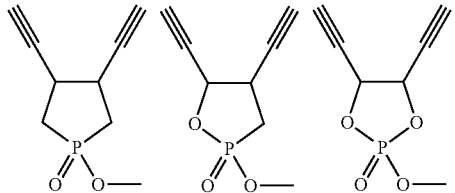
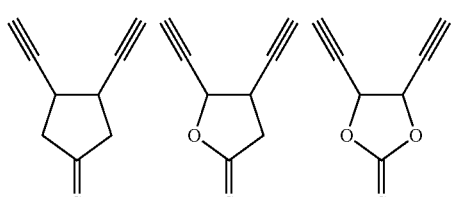
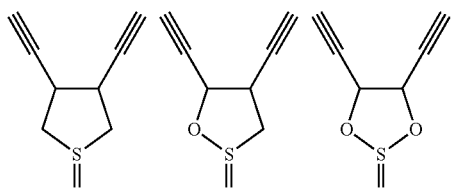
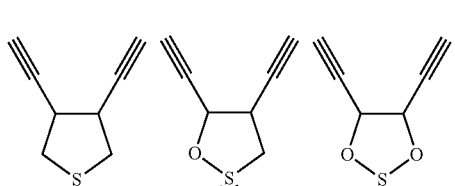
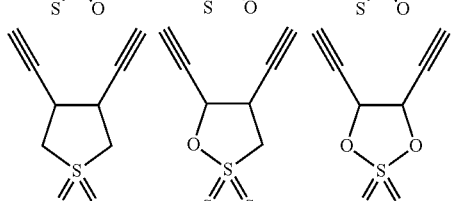
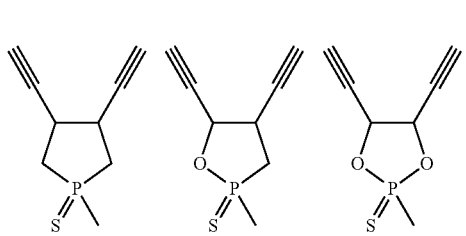
[Chem. 55]
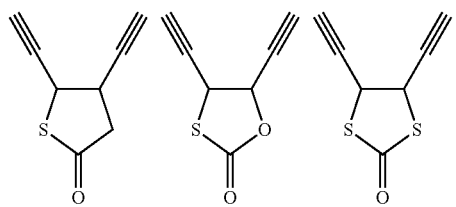
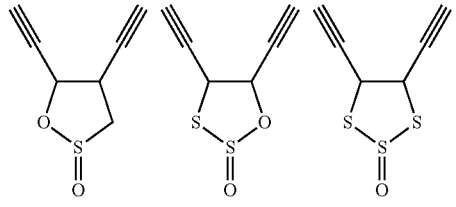
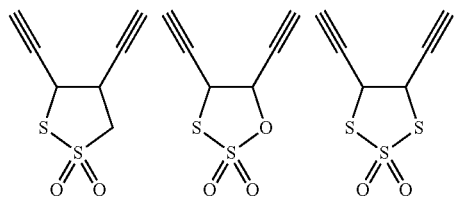
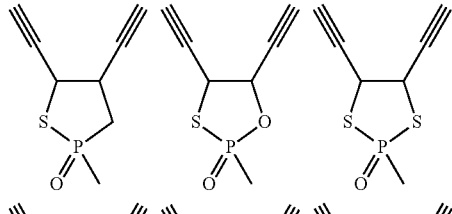
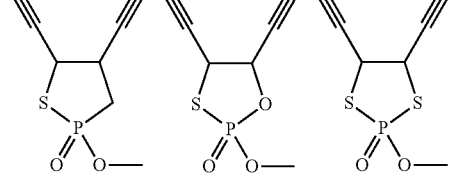
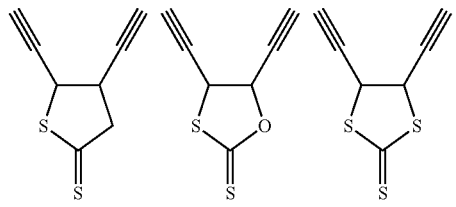
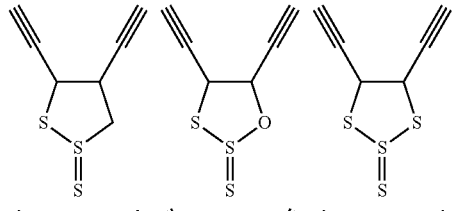
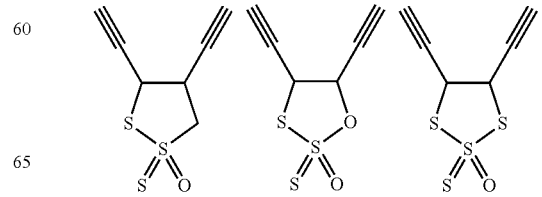

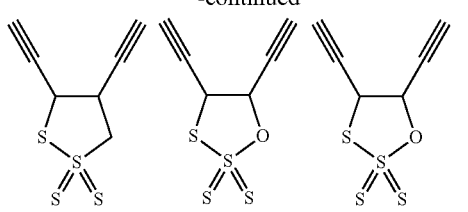
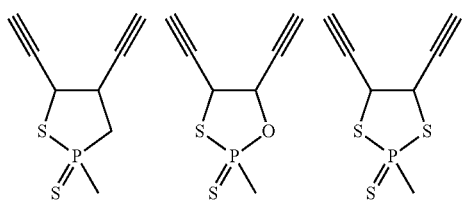
[Chem. 56]
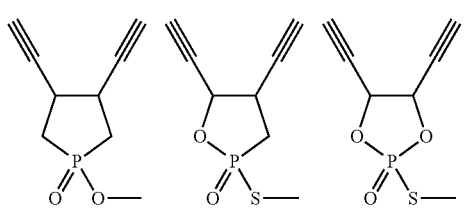
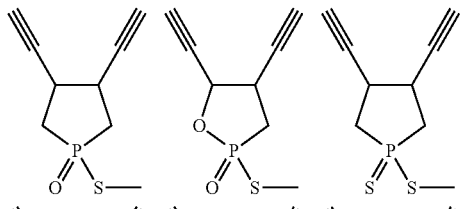
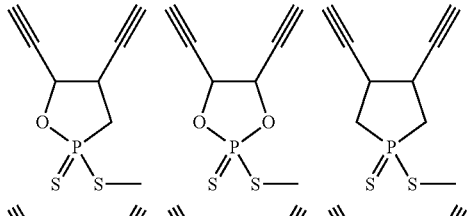
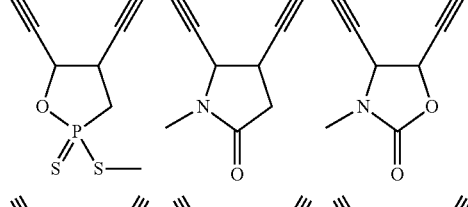
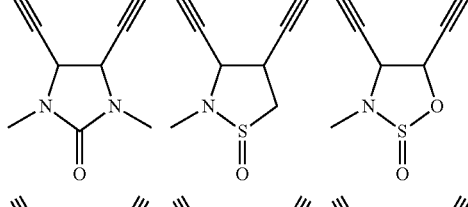
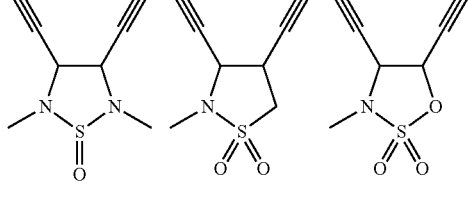
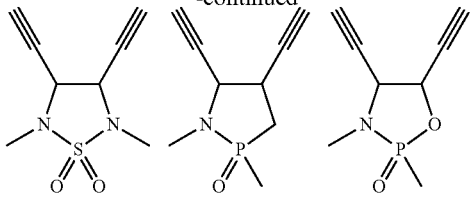
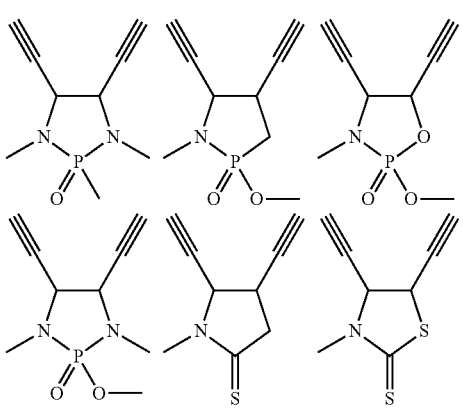
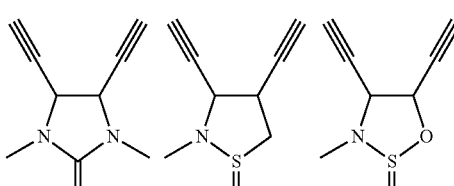
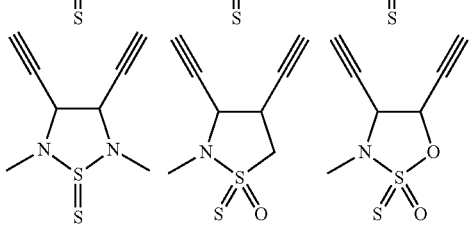
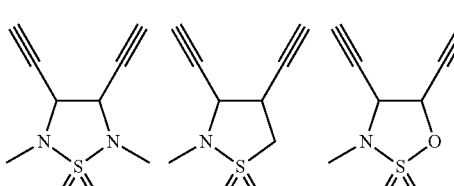
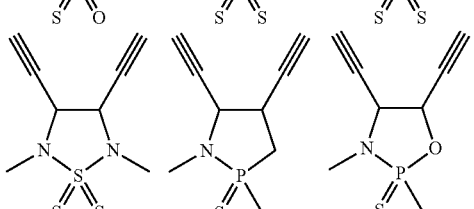
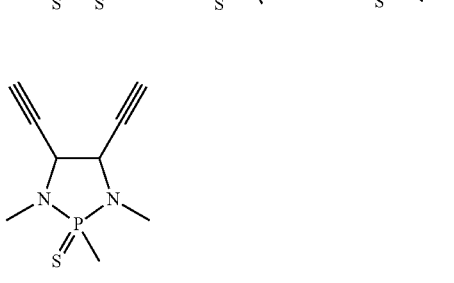

[Chem. 57]
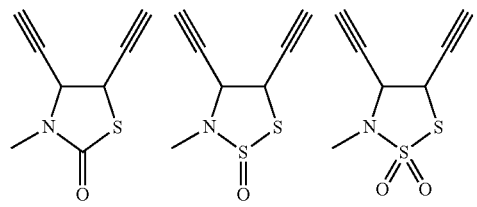
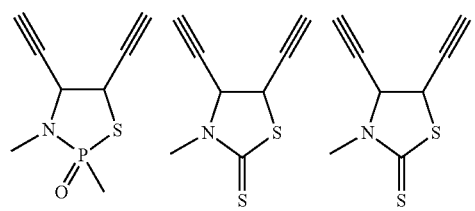
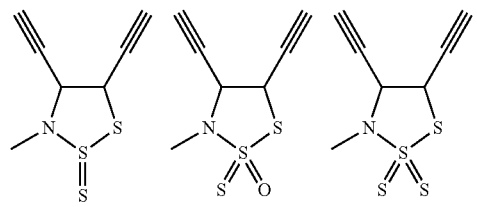
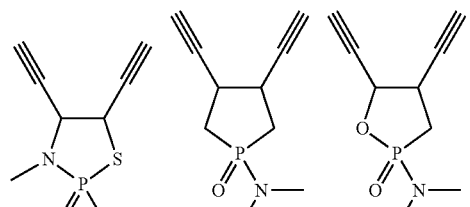
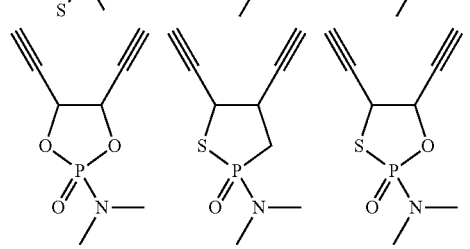
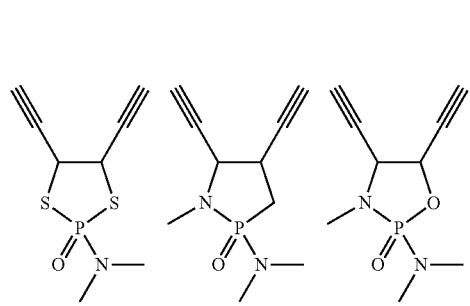
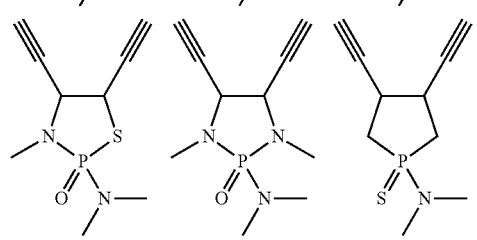
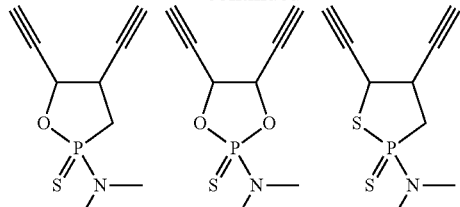
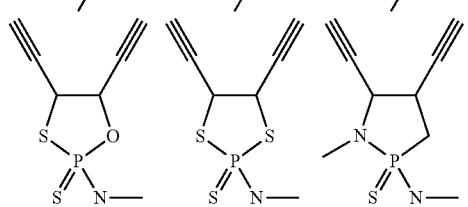
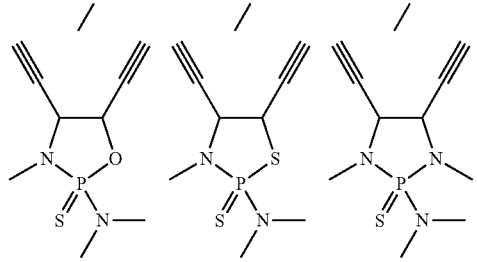
[Chem. 58]
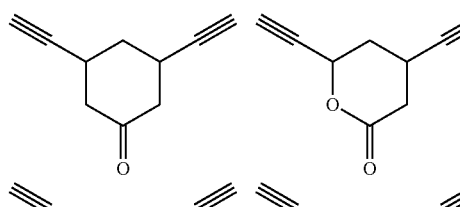
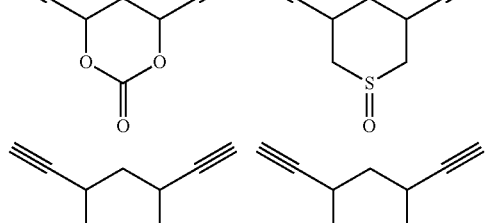
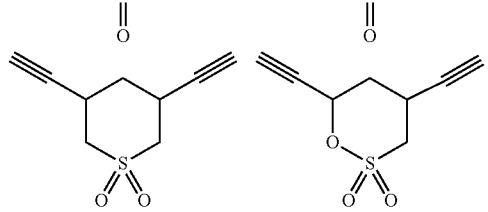
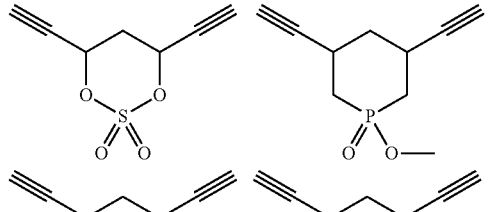

91
-continued
92
-continued
[Chem. 59]
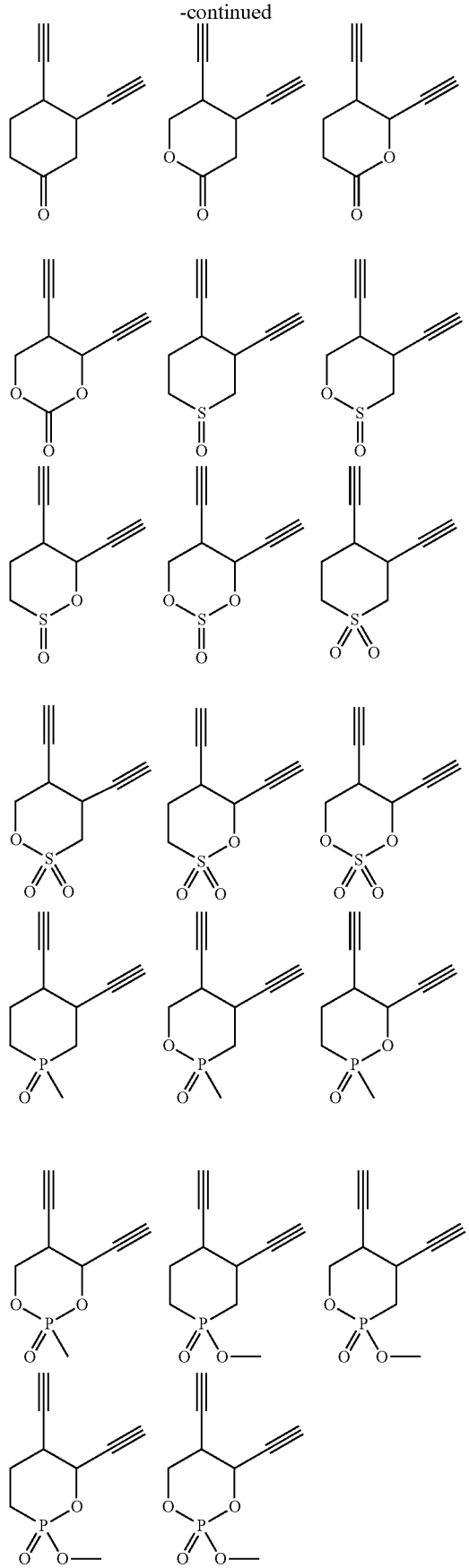

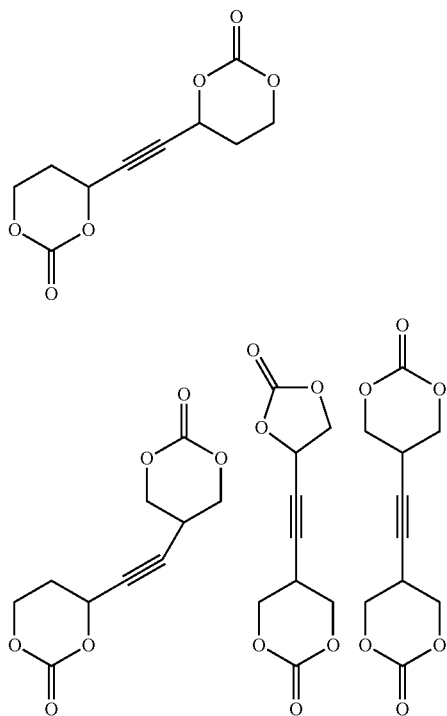

Among the foregoing, R is preferably hydrogen, fluorine or an ethynyl group, in terms of both reactivity and stability. Other substituents may result in decreased reactivity and impairment of the looked-for characteristics. In case of halogens other than fluorine, moreover, side reactions may become more extensive on account of excessively high reactivity.

Preferably, the combined number of fluorine and/or ethynyl groups in R is no greater than two. If these numbers are excessive, compatibility with the electrolyte solution may become poorer, and side reactions may become more extensive on account of excessively high reactivity.

Among the foregoing, preferably, n=1 and m=0. If both are 0, stability is impaired on account of ring strain, and side reactions may become more extensive on account of excessively high reactivity. In a case where n=2 or more, or m=1 or more even if n=1, the linear configuration may be more stable than the cyclic one, and initial characteristics may fail to be brought out.

In the formula, X and Z are more preferably $CR^1_2$ or O. Otherwise, side reactions may become more extensive on account of excessively high reactivity.

The molecular weight is more preferably 100 or greater, and more preferably 200 or less.

Within the abovementioned range, the solubility of the compound represented by formula (1) in the nonaqueous electrolyte solution is secured yet more readily, and the effect of the present invention is yet likelier to be fully brought out.

Specific examples of yet more preferred compounds among the foregoing include, for instance:

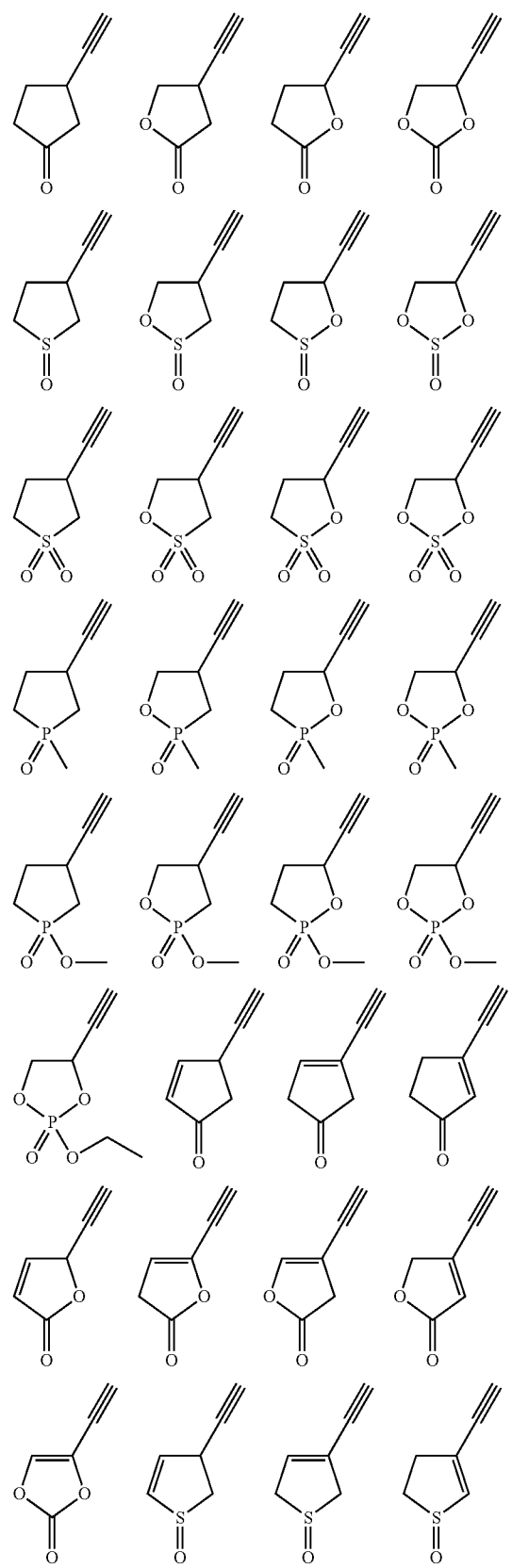

[Chem. 60]

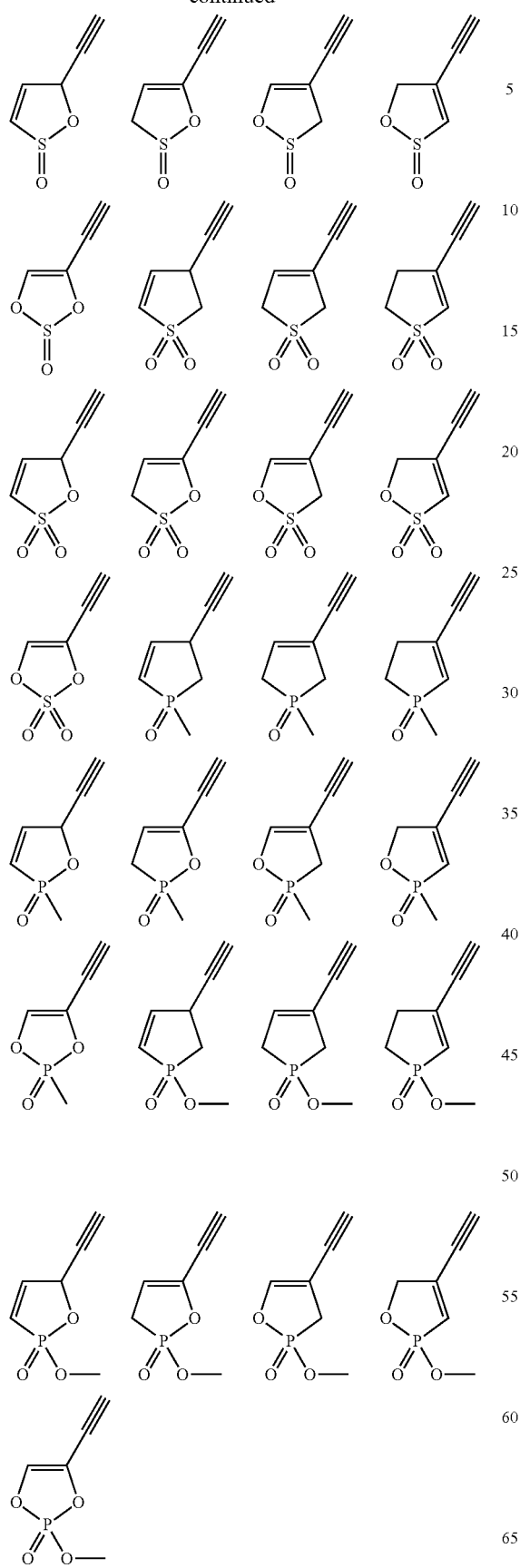
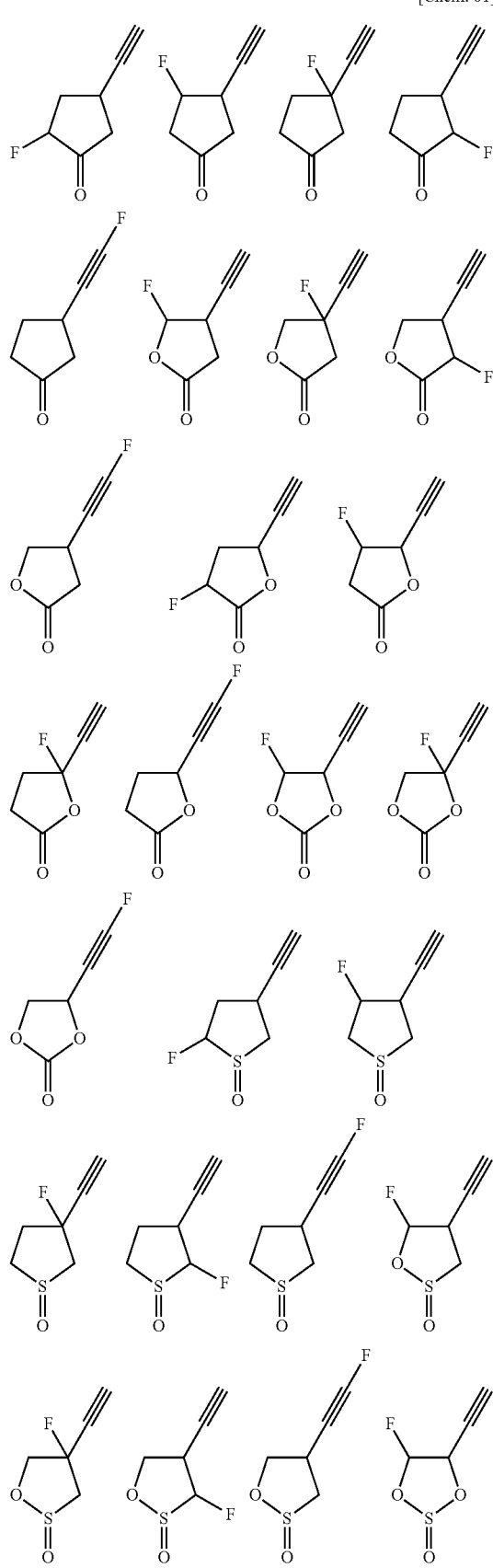
[Chem. 61]

-continued
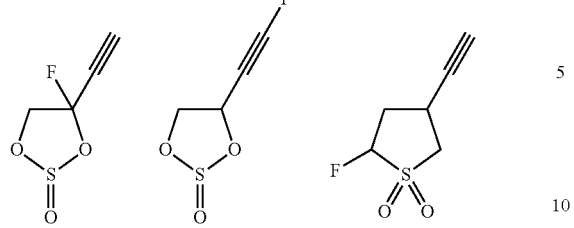
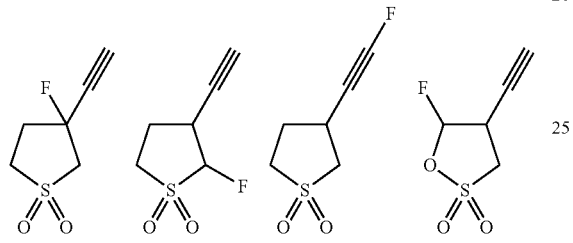
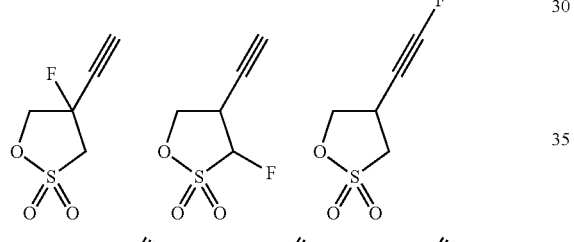
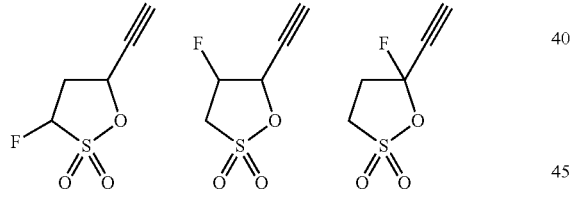
[Chem. 62]
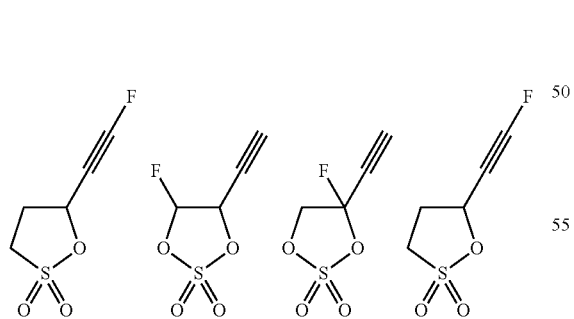
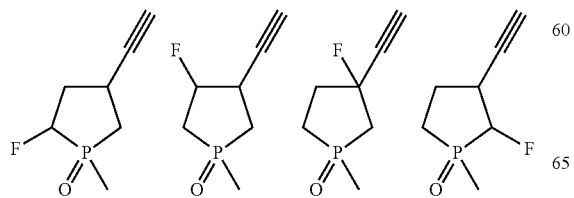
-continued
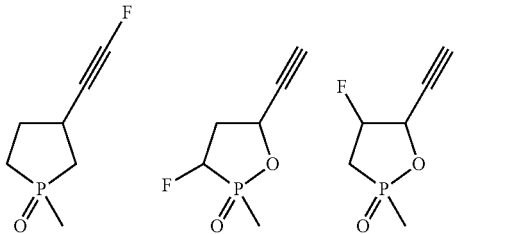
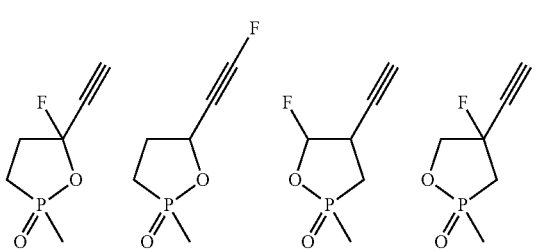
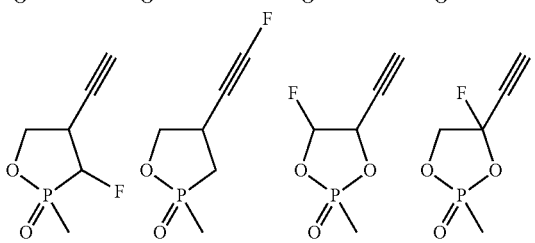
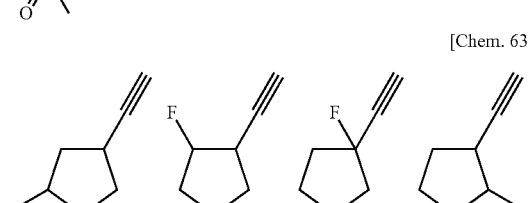
[Chem. 63]
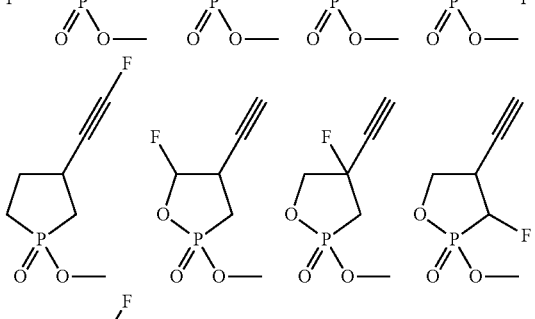
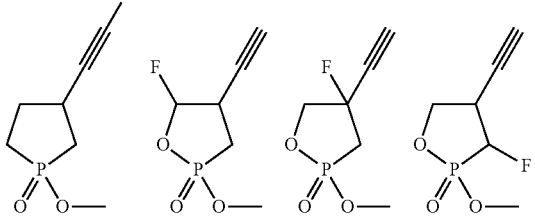

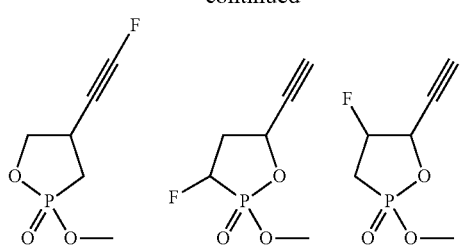
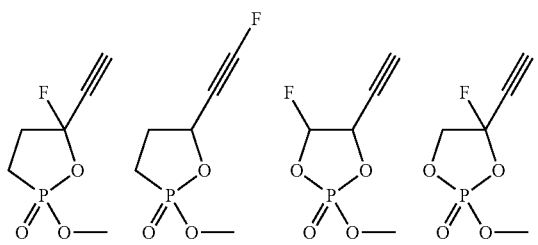

[Chem. 64]

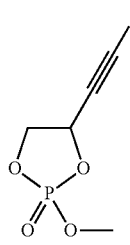
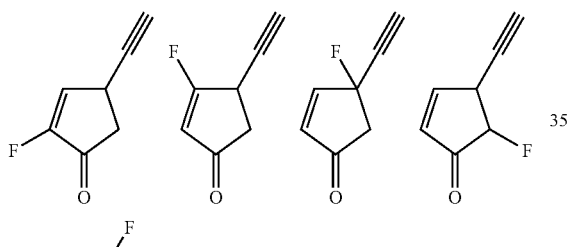
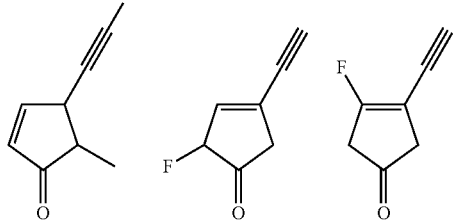
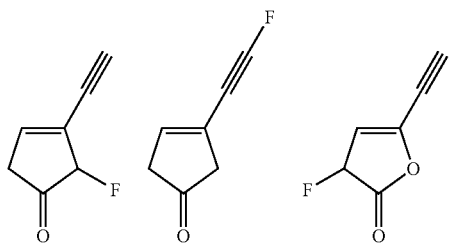
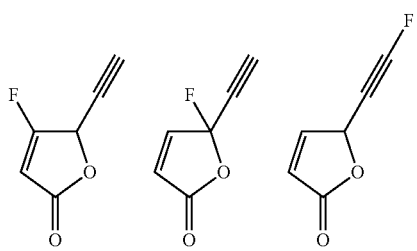

Yet more preferably, all of R is hydrogen. In this case, side reactions are most likely to be suppressed while the looked-for characteristics are preserved. Preferably, either one of X and Z is O in a case where Y is C=O or S=O; and X and Z are both O or $CH_2$, or either one of X and Z is O, and the other is $CH_2$, in a case where Y is $S(=O)_2$, $P(=O)-R^2$ or $P(=O)-OR^3$. If X and Z are both $CH_2$ when Y is C=O or S=O, then side reactions may become more extensive on account of excessively high reactivity.

Specific examples of these compounds are set forth below.

[Chem. 65]

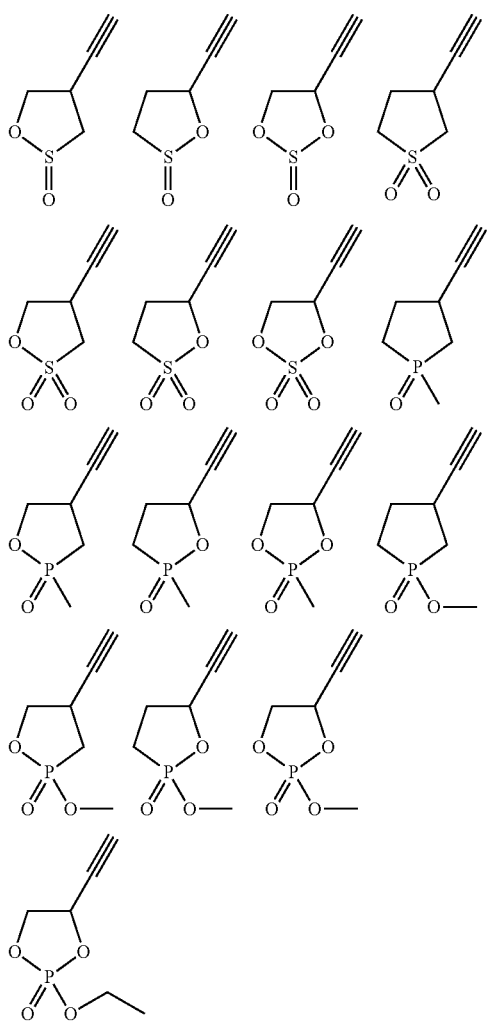

Compounds represented by formula (2) below are preferred in terms of ease of industrial production, from among compound represented by formula (1).

[Chem. 66]

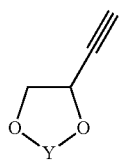
(2)

In formula (2), Y represents C=O, S=O, S(=O)$_2$, P(=O)—R$^2$ and P(=O)—OR$^3$; R$^2$ is a C1 to C20 hydrocarbon group optionally having a functional group; R$^3$ is Li, NR$^4_4$ or a C1 to C20 hydrocarbon group optionally having a functional group; and R$^4$ are mutually identical or different C1 to C20 hydrocarbon groups optionally having a functional group.

Compounds that satisfy these preferred conditions are set forth below.

[Chem. 67]

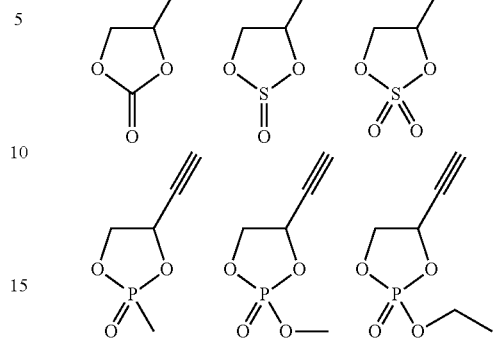

The compound represented by formula (1) may be used singly as one type, or as two or more concurrent types in any combinations and ratios. The blending amount of the compound represented by formula (1) is not particularly limited, and may be any blending amount, so long as the effect of the present invention is not significantly impaired thereby. The blending amount of the compound represented by formula (1) is preferably 0.001 wt % or more, more preferably 0.01 wt % or more, and yet more preferably 0.1 wt % or more, and preferably 30 wt % or less, more preferably 10 wt % or less, yet more preferably 5 wt % or less, and particularly preferably 3 wt % or less, with respect to 100 wt % of the nonaqueous electrolyte solution. Within these ranges, a sufficient enhancing effect on cycle characteristic is readily brought out in the nonaqueous electrolyte secondary battery, and drops in high-temperature storage characteristic such as drops in discharge capacity retention rate, caused by excessive gas generation amount, are readily avoided. If the blending amount is too small, the effect of the present invention may be difficult to bring out sufficiently, while if the blending amount is too large, the output and load characteristic may drop, on account of increased resistance. As the compound represented by formula (1) there can be used a compound synthesized according to known methods, or a commercially available compound.

1-4. Compound Having a Cyano Group, Cyclic Ester Compound Comprising a Sulfur Atom and Compound Having an Isocyanate Group The nonaqueous electrolyte solution of the present invention is characterized by containing the compound represented by formula (1) and at least one type from among a compound having a cyano group a cyclic ester compound comprising a sulfur atom and a compound having an isocyanate group. Side reactions can be suppressed and the storage characteristic of the secondary battery improved, by using concomitantly these compounds.

1-4-1. Compound Having a Cyano Group

The type of compound having a cyano group is not particularly limited, so long as it is a compound that has a cyano group in the molecule, but is more preferably a compound represented by formula (3).

[Chem. 68]

$$(N\equiv C)_r\text{-}U \qquad (3)$$

In formula (3), U is a C1 to C10 V-valent organic group comprising atoms selected from the group consisting of carbon atoms, hydrogen atoms, nitrogen atoms, oxygen atoms, sulfur atoms, phosphorus atoms and halogen atoms; and V is an integer equal to or greater than 1.

Herein, the C1 to C10 V-valent organic group comprising atoms selected from the group consisting of carbon atoms, hydrogen atoms, nitrogen atoms, oxygen atoms, sulfur atoms, phosphorus atoms and halogen atoms, denotes an organic group comprising carbon atoms and hydrogen atoms, and, in addition, also organic groups that may comprise nitrogen atoms, oxygen atoms, sulfur atoms, phosphorus atoms or halogen atoms. Organic groups that may comprise nitrogen atoms, oxygen atoms, sulfur atoms, phosphorus atoms or halogen atoms include organic groups in which some of the carbon atoms in the skeleton are substituted with any of the foregoing atoms, or organic groups having a substituent that is made up of the foregoing atoms.

The molecular weight of the compound having a cyano group is not particularly limited, and may be any molecular weight, so long as the effect of the present invention is not significantly impaired thereby. The molecular weight is preferably 50 or greater, more preferably 80 or greater, and yet more preferably 100 or greater and 200 or smaller. Within the above ranges, the solubility of the compound having a cyano group towards the nonaqueous electrolyte solution is readily secured, and the effect of the present invention is readily brought out. The method for producing the compound having a cyano group is not particularly limited, and the compound may be produced in accordance with an arbitrarily selected known method.

Specific examples compounds represented by formula (3) include, for instance, compounds having one cyano group, such as acetonitrile, propionitrile, butyronitrile, isobutyronitrile, valeronitrile, isovaleronitrile, lauronitrile, 2-methylbutyronitrile, trimethylacetonitrile, hexanenitrile, cyclopentanecarbonitrile, cyclohexanecarbonitrile, acrylonitrile, methacrylonitrile, crotononitrile, 3-methylcrotononitrile, 2-methyl-2-butenenitrile, 2-pentenenitrile, 2-methyl-2-pentenenitrile, 3-methyl-2-pentenenitrile, 2-hexenenitrile, fluoroacetonitrile, difluoroacetonitrile, trifluoroacetonitrile, 2-fluoropropionitrile, 3-fluoropropionitrile, 2,2-difluoropropionitrile, 2,3-difluoropropionitrile, 3,3-difluoropropionitrile, 2,2,3-trifluoropropionitrile, 3,3,3-trifluoropropionitrile, 3,3'-oxydipropionitrile, 3,3'-thiodipropionitrile, 1,2,3-propanetricarbonitrile, 1,3,5-pentanetricarbonitrile, pentafluoropropionitrile or the like;

compounds having two cyano groups, such as malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, trimethylsuccinonitrile, tetramethylsuccinonitrile, 3,3'-(ethylenedioxy)dipropionitrile, 3,3'-(ethylenedithio)dipropionitrile or the like; compounds having three cyano groups, such as 1,2,3-tris(2-cyanoethoxy)propane, tris(2-cyanoethyl)amine or the like; cyanate compounds such as methylcyanate, ethylcyanate, propylcyanate, butylcyanate, pentylcyanate, hexylcyanate, heptyl cyanate or the like;

sulfur-containing compounds such as methylthiocyanate, ethylthiocyanate, propylthiocyanate, butylthiocyanate, pentylthiocyanate, hexylthiocyanate, heptylthiocyanate, methanesulfonylcyanide, ethanesulfonylcyanide, propanesulfonylcyanide, butanesulfonylcyanide, pentanesulfonylcyanide, hexanesulfonylcyanide, heptanesulfonylcyanide, methylsulfurocyanidate, ethylsulfurocyanidate, propylsulfurocyanidate, butylsulfurocyanidate, pentylsulfurocyanidate, hexylsulfurocyanidate, heptylsulfurocyanidate or the like;

and phosphorus-containing compounds such as cyanodimethylphosphine, cyanodimethylphosphine oxide, cyanomethyl phosphinate methyl, cyanomethyl phosphinite methyl, dimethyl phosphinate cyanide, dimethyl phosphinite cyanide, cyano phosphonate dimethyl, cyano phosphonite dimethyl, methyl phosphonate cyanomethyl, methyl phosphonite cyanomethyl, cyanodimethyl phosphate, cyanodimethyl phosphite or the like.

Preferred among the foregoing, in terms of enhancing storage characteristic, are acetonitrile, propionitrile, butyronitrile, isobutyronitrile, valeronitrile, isovaleronitrile, lauronitrile, crotononitrile, 3-methylcrotononitrile, malononitrile, succinonitrile, glutaronitrile, adiponitrile, pimelonitrile, suberonitrile, azelanitrile, sebaconitrile, undecanedinitrile and dodecanedinitrile, more preferably, a compound having two cyano groups, represented by $NC-(CH_2)_n-CN$ (n=2 to 6), for instance succinonitrile, glutaronitrile, adiponitrile, pimelonitrile or suberonitrile.

The compound having a cyano group may be used singly as one type, or as two or more concurrent types in any combinations and ratios. The blending amount of the compound having a cyano group with respect to the total nonaqueous electrolyte solution in the present invention is not particularly limited, and may be any blending amount, so long as the effect of the present invention is not significantly impaired thereby. However, the compound having a cyano group is present in a concentration, with respect to the nonaqueous electrolyte solution of the present invention, that is ordinarily 0.001 wt % or greater, preferably 0.1 wt % or greater and more preferably 0.3 wt % or greater, and ordinarily 10 wt % or smaller, preferably 5 wt % or smaller and more preferably 3 wt % or smaller. If the abovementioned ranges are satisfied, the effects on output characteristic, load characteristic, low-temperature characteristic, cycle characteristic, high-temperature storage characteristic and so forth become more pronounced.

1-4-2. Cyclic Ester Compound Comprising a Sulfur Atom

The type of cyclic ester compound comprising a sulfur atom is not particularly limited, but is preferably a compound represented by formula (4) below.

[Chem. 69]

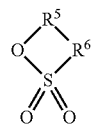

(4)

In formula (4), $R^5$ and $R^6$ represent, each independently, a C1 to C10 organic group comprising atoms selected from the group consisting of carbon atoms, hydrogen atoms, nitrogen atoms, oxygen atoms, sulfur atoms, phosphorus atoms and halogen atoms; $R^5$ and $R^6$ may mutually include —O—SO$_2$— and an unsaturated bond.

The C1 to C10 organic group comprising atoms selected from the group consisting of carbon atoms, hydrogen atoms, nitrogen atoms, an oxygen atoms, sulfur atoms, phosphorus atoms and halogen atoms denotes, in addition to organic groups comprising carbon atoms and hydrogen atoms, also organic groups that may comprise nitrogen atoms, oxygen atoms, sulfur atoms, phosphorus atoms or halogen atoms. Organic groups that may comprise nitrogen atoms, oxygen atoms, sulfur atoms, phosphorus atoms or halogen atoms include organic groups in which some of the carbon atoms in the skeleton are substituted with any of the foregoing atoms, or organic groups having a substituent that is made up of the foregoing atoms.

The molecular weight of the cyclic ester compound comprising a sulfur atom is not particularly limited, and may be any molecular weight so long as the effect of the present invention is not significantly impaired thereby. Preferably, the molecular weight is 100 or greater, and 250 or smaller. Within that range, the solubility of the cyclic ester compound comprising a sulfur atom towards the nonaqueous electrolyte solution is readily secured, and the effect of the present invention is readily brought out. The method for producing the cyclic ester compound comprising a sulfur atom is not particularly limited, and the cyclic ester compound comprising a sulfur atom may be produced in accordance with an arbitrarily selected known method.

Specific examples of the compound represented by formula (4) include, for instance, sultone compounds such as 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butanesultone, 1-fluoro-1,4-butanesultone, 2-fluoro-1,4-butanesultone, 3-fluoro-1,4-butanesultone, 4-fluoro-1,4-butanesultone, 1-methyl-1,4-butanesultone, 2-methyl-1,4-butanesultone, 3-methyl-1,4-butanesultone, 4-methyl-1,4-butanesultone, 1-butene-1,4-sultone, 2-butene-1,4-sultone, 3-butene-1,4-sultone, 1-fluoro-1-butene-1,4-sultone, 2-fluoro-1-butene-1,4-sultone, 3-fluoro-1-butene-1,4-sultone, 4-fluoro-1-butene-1,4-sultone, 1-fluoro-2-butene-1,4-sultone, 2-fluoro-2-butene-1,4-sultone, 3-fluoro-2-butene-1,4-sultone, 4-fluoro-2-butene-1,4-sultone, 1-fluoro-3-butene-1,4-sultone, 2-fluoro-3-butene-1,4-sultone, 3-fluoro-3-butene-1,4-sultone, 4-fluoro-3-butene-1,4-sultone, 1-methyl-1-butene-1,4-sultone, 2-methyl-1-butene-1,4-sultone, 3-methyl-1-butene-1,4-sultone, 4-methyl-1-butene-1,4-sultone, 1-methyl-2-butene-1,4-sultone, 2-methyl-2-butene-1,4-sultone, 3-methyl-2-butene-1,4-sultone, 4-methyl-2-butene-1,4-sultone, 1-methyl-3-butene-1,4-sultone, 2-methyl-3-butene-1,4-sultone, 3-methyl-3-butene-1,4-sultone, 4-methyl-3-butene-1,4-sultone, 1,5-pentanesultone, 1-fluoro-1,5-pentanesultone, 2-fluoro-1,5-pentanesultone, 3-fluoro-1,5-pentanesultone, 4-fluoro-1,5-pentanesultone, 5-fluoro-1,5-pentanesultone, 1-methyl-1,5-pentanesultone, 2-methyl-1,5-pentanesultone, 3-methyl-1,5-pentanesultone, 4-methyl-1,5-pentanesultone, 5-methyl-1,5-pentanesultone, 1-pentene-1,5-sultone, 2-pentene-1,5-sultone, 3-pentene-1,5-sultone, 4-pentene-1,5-sultone, 1-fluoro-1-pentene-1,5-sultone, 2-fluoro-1-pentene-1,5-sultone, 3-fluoro-1-pentene-1,5-sultone, 4-fluoro-1-pentene-1,5-sultone, 5-fluoro-1-pentene-1,5-sultone, 1-fluoro-2-pentene-1,5-sultone, 2-fluoro-2-pentene-1,5-sultone, 3-fluoro-2-pentene-1,5-sultone, 4-fluoro-2-pentene-1,5-sultone, 5-fluoro-2-pentene-1,5-sultone, 1-fluoro-3-pentene-1,5-sultone, 2-fluoro-3-pentene-1,5-sultone, 3-fluoro-3-pentene-1,5-sultone, 4-fluoro-3-pentene-1,5-sultone, 5-fluoro-3-pentene-1,5-sultone, 1-fluoro-4-pentene-1,5-sultone, 2-fluoro-4-pentene-1,5-sultone, 3-fluoro-4-pentene-1,5-sultone, 4-fluoro-4-pentene-1,5-sultone, 5-fluoro-4-pentene-1,5-sultone, 1-methyl-1-pentene-1,5-sultone, 2-methyl-1-pentene-1,5-sultone, 3-methyl-1-pentene-1,5-sultone, 4-methyl-1-pentene-1,5-sultone, 5-methyl-1-pentene-1,5-sultone, 1-methyl-2-pentene-1,5-sultone, 2-methyl-2-pentene-1,5-sultone, 3-methyl-2-pentene-1,5-sultone, 4-methyl-2-pentene-1,5-sultone, 5-methyl-2-pentene-1,5-sultone, 1-methyl-3-pentene-1,5-sultone, 2-methyl-3-pentene-1,5-sultone, 3-methyl-3-pentene-1,5-sultone, 4-methyl-3-pentene-1,5-sultone, 5-methyl-3-pentene-1,5-sultone, 1-methyl-4-pentene-1,5-sultone, 2-methyl-4-pentene-1,5-sultone, 3-methyl-4-pentene-1,5-sultone, 4-methyl-4-pentene-1,5-sultone, 5-methyl-4-pentene-1,5-sultone or the like; sulfate compounds such as ethylene glycol sulfate, 1,2-propanediol sulfate, 1,3-propanediol sulfate, 1,2-butanediol sulfate, 1,3-butanediol sulfate, 2,3-butanediol sulfate, 1,4-butanediol sulfate, phenylethylene glycol sulfate or the like; disulfonate compounds such as methylenemethanedisulfonate, ethylenemethanedisulfonate or the like; nitrogen-containing compounds such as 1,2,3-oxathiazolidine-2,2-dioxide, 3-methyl-1,2,3-oxathiazolidine-2,2-dioxide, 3H-1,2,3-oxathiazole-2,2-dioxide, 5H-1,2,3-oxathiazole-2,2-dioxide, 1,2,4-oxathiazolidine-2,2-dioxide, 4-methyl-1,2,4-oxathiazolidine-2,2-dioxide, 3H-1,2,4-oxathiazole-2,2-dioxide, 5H-1,2,4-oxathiazole-2,2-dioxide, 1,2,5-oxathiazolidine-2,2-dioxide, 5-methyl-1,2,5-oxathiazolidine-2,2-dioxide, 3H-1,2,5-oxathiazole-2,2-dioxide, 5H-1,2,5-oxathiazole-2,2-dioxide, 1,2,3-oxathiazinane-2,2-dioxide, 3-methyl-1,2,3-oxathiazinane-2,2-dioxide, 5,6-dihydro-1,2,3-oxathiazine-2,2-dioxide, 1,2,4-oxathiazinane-2,2-dioxide, 4-methyl-1,2,4-oxathiazinane-2,2-dioxide, 5,6-dihydro-1,2,4-oxathiazine-2,2-dioxide, 3,6-dihydro-1,2,4-oxathiazine-2,2-dioxide, 3,4-dihydro-1,2,4-oxathiazine-2,2-dioxide, 1,2,5-oxathiazinane-2,2-dioxide, 5-methyl-1,2,5-oxathiazinane-2,2-dioxide, 5,6-dihydro-1,2,5-oxathiazine-2,2-dioxide, 3,6-dihydro-1,2,5-oxathiazine-2,2-dioxide, 3,4-dihydro-1,2,5-oxathiazine-2,2-dioxide, 1,2,6-oxathiazinane-2,2-dioxide, 6-methyl-1,2,6-oxathiazinane-2,2-dioxide, 5,6-dihydro-1,2,6-oxathiazine-2,2-dioxide, 3,4-dihydro-1,2,6-oxathiazine-2,2-dioxide, 5,6-dihydro-1,2,6-oxathiazine-2,2-dioxide or the like; and phosphorus-containing compound such as 1,2,3-oxathiaphospholane-2,2-dioxide, 3-methyl-1,2,3-oxathiaphospholane-2,2-dioxide, 3-methyl-1,2,3-oxathiaphospholane-2,2,3-trioxide, 3-methoxy-1,2,3-oxathiaphospholane-2,2,3-trioxide, 1,2,4-oxathiaphospholane-2,2-dioxide, 4-methyl-1,2,4-oxathiaphospholane-2,2-dioxide, 4-methyl-1,2,4-oxathiaphospholane-2,2,4-trioxide, 4-methoxy-1,2,4-oxathiaphospholane-2,2,4-trioxide, 1,2,5-oxathiaphospholane-2,2-dioxide, 5-methyl-1,2,5-oxathiaphospholane-2,2-dioxide, 5-methyl-1,2,5-oxathiaphospholane-2,2,5-trioxide, 5-methoxy-1,2,5-oxathiaphospholane-2,2,5-trioxide, 1,2,3-oxathiaphosphinane-2,2-dioxide, 3-methyl-1,2,3-oxathiaphosphinane-2,2-dioxide, 3-methyl-1,2,3-oxathiaphosphinane-2,2,3-trioxide, 3-methoxy-1,2,3-oxathiaphosphinane-2,2,3-trioxide, 1,2,4-oxathiaphosphinane-2,2-dioxide, 4-methyl-1,2,4-oxathiaphosphinane-2,2-dioxide, 4-methyl-1,2,4-oxathiaphosphinane-2,2,3-trioxide, 4-methyl-1,5,2,4-dioxathiaphosphinane-2,4-dioxide, 4-methoxy-1,5,2,4-dioxathiaphosphinane-2,4-dioxide, 3-methoxy-1,2,4-oxathiaphosphinane-2,2,3-trioxide, 1,2,5-oxathiaphosphinane-2,2-dioxide, 5-methyl-1,2,5-oxathiaphosphinane-2,2-dioxide, 5-methyl-1,2,5-oxathiaphosphinane-2,2,3-trioxide, 5-methoxy-1,2,5-oxathiaphosphinane-2,2,3-trioxide, 1,2,6-oxathiaphosphinane-2,2-dioxide, 6-methyl-1,2,6-oxathiaphosphinane-2,2-dioxide, 6-methyl-1,2,6- oxathiaphosphinane-2,2,3-trioxide, 6-methoxy-1,2,6-oxathiaphosphinane-2,2,3-trioxide or the like.

Preferred among the foregoing, in terms of enhancing the storage characteristic, are 1,3-propanesultone, 1-fluoro-1,3-propanesultone, 2-fluoro-1,3-propanesultone, 3-fluoro-1,3-propanesultone, 1-propene-1,3-sultone, 1-fluoro-1-propene-1,3-sultone, 2-fluoro-1-propene-1,3-sultone, 3-fluoro-1-propene-1,3-sultone, 1,4-butanesultone, ethylene glycol sulfate, 1,3-propanediol sulfate, methylenemethanedisulfonate and ethylenemethanedisulfonate, and more preferably 1,3-propanesultone, 1-fluoro-1,3-propanesultone, 2-fluoro-1,3-propanesultone, 3-fluoro-1,3-propanesultone, 1-propene-1,3-sultone, ethylene glycol sulfate, 1,3-propanediol sulfate and methylenemethanedisulfonate.

The cyclic ester compound comprising a sulfur atom may be used singly as one type, or as two or more concurrent types in any combinations and ratios. The blending amount of the cyclic ester compound comprising a sulfur atom with respect to the total nonaqueous electrolyte solution of the present invention is not limited, and may be any blending amount so long as the effect of the present invention is not significantly impaired thereby. However, the cyclic ester compound comprising a sulfur atom is present in a concentration, with respect to the nonaqueous electrolyte solution of the present invention is ordinarily 0.001 wt % or greater, preferably 0.1 wt % or greater and more preferably 0.3 wt % or greater, and ordinarily 10 wt % or smaller, preferably 5 wt % or smaller and more preferably 3 wt % or smaller. If the abovementioned ranges are satisfied, the effects on output characteristic, load characteristic, low-temperature characteristic, cycle characteristic, high-temperature storage characteristic and so forth become more pronounced.

1-4-3. Compound Having an Isocyanate Group

The type of compound having an isocyanate group is not particularly limited, so long as the compound has an isocyanate group in the molecule. Specific examples thereof include, for instance, isocyanatomethane, 1-isocyanatoethane, 1-isocyanato-2-methoxyethane, 3-isocyanato-1-propene, isocyanatocyclopropane, 2-isocyanatopropane, 1-isocyanatopropane, 1-isocyanato-3-methoxypropane, 1-isocyanato-3-ethoxypropane, 2-isocyanato-2-methylpropane, 1-isocyanatobutane, 2-isocyanatobutane, 1-isocyanato-4-methoxybutane, 1-isocyanato-4-ethoxybutane, methylisocyanatoformate, isocyanatocyclopentane, 1-isocyanatopentane, 1-isocyanato-5-methoxypentane, 1-isocyanato-5-ethoxypentane, 2-(isocyanatomethyl)furan, isocyanatocyclohexane, 1-isocyanatohexane, 1-isocyanato-6-methoxyhexane, 1-isocyanato-6-ethoxyhexane, ethylisocyanatoacetate, isocyanatocyclopentane, isocyanatomethyl (cyclohexane), monomethylenediisocyanate, dimethylenediisocyanate, trimethylenediisocyanate, tetramethylenediisocyanate, pentamethylenediisocyanate, hexamethylenediisocyanate, heptamethylenediisocyanate, octamethylenediisocyanate, nonamethylenediisocyanate, decamethylenediisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluenediisocyanate, xylenediisocyanate, tolylenediisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate, isophoronediisocyanate or the like. Other examples include, for instance, modified polyisocyanates of biuret, isocyanurate, adduct and bifunctional type, represented by the basic structure of formulas (5-1) to (5-4) below (in the formulas, $R^7$ and $R^8$ denote each any hydrocarbon group).

[Chem. 70]

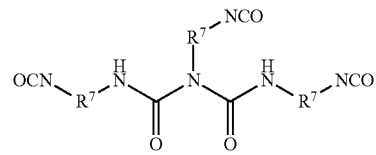

(5-1)

[Chem. 71]

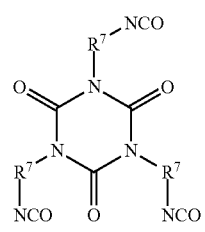

(5-2)

[Chem. 72]

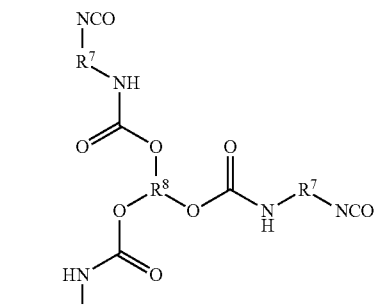

(5-3)

[Chem. 73]

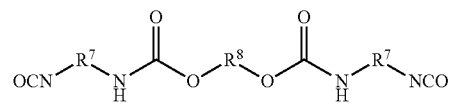

(5-4)

A preferred compound, from among compounds having an isocyanate group, is the compound represented by formula (5), in terms of forming an appropriate protective coating.

[Chem. 74]

$$A(-NCO)_{n'} \quad (5)$$

(In the formula, A denotes a C1 to C20 organic group comprising atoms selected from the group consisting of hydrogen atoms, carbon atoms, nitrogen atoms, oxygen atoms, sulfur atoms, phosphorus atoms and halogen atoms; and n' is an integer equal to or greater than 2.)

The C1 to C20 organic group comprising atoms selected from the group consisting of hydrogen atoms, carbon atoms, nitrogen atoms, oxygen atoms, sulfur atoms, phosphorus atoms and halogen atoms, denotes organic groups comprising carbon atoms and hydrogen atoms, and, in addition, organic groups that may comprise nitrogen atoms, oxygen atoms, sulfur atoms, phosphorus atoms or halogen atoms. Organic groups that may comprise nitrogen atoms, oxygen atoms, sulfur atoms, phosphorus atoms or halogen atoms include organic groups in which some of the carbon atoms in the skeleton are substituted with any of the foregoing atoms, or organic groups having a substituent that is made up of the foregoing atoms.

The molecular weight of the compound represented by formula (5) is not particularly limited, and may be any molecular weight so long as the effect of the present invention is not significantly impaired thereby. Preferably, the molecular weight is 80 or greater, more preferably 115 or greater, and yet more preferably 180 or greater, and 400 or smaller, more preferably 270 or smaller. Within the above ranges, the solubility of the compound represented by formula (5) towards the nonaqueous electrolyte solution is readily secured, and the effect of the present invention is readily brought out. Methods for producing the compound represented by formula (5) are not particularly limited, and the compound represented by formula (5) may be produced in accordance with an arbitrarily selected known method.

Specific examples of A in formula (5) include, for instance, alkylene groups or derivatives thereof, alkenylene groups or derivatives thereof, cycloalkylene groups or derivatives thereof, alkynylene groups or derivatives thereof, cycloalkenylene groups or derivatives thereof, arylene groups or derivatives thereof, carbonyl groups or derivatives thereof, sulfonyl groups or derivatives thereof, sulfinyl groups or derivatives thereof, phosphonyl groups or derivatives thereof, phosphinyl groups or derivatives thereof, amide groups or derivatives thereof, imide groups or derivatives thereof, ether groups or derivatives thereof, thioether groups or derivatives thereof, borinic acid groups or derivatives thereof, and borane groups or derivatives thereof.

Preferred among the foregoing, in terms of enhancing battery characteristics, are alkylene groups or derivatives thereof, alkenylene groups or derivatives thereof, cycloalkylene groups or derivatives thereof, alkynylene groups or derivatives thereof, and arylene groups or derivatives thereof. More preferably, A is a C2 to C14 organic group optionally having a substituent.

Specific examples of the compound represented by formula (5) include, for instance, monomethylenediisocyanate, dimethylenediisocyanate, trimethylenediisocyanate, tetramethylenediisocyanate, pentamethylenediisocyanate, hexamethylenediisocyanate, heptamethylenediisocyanate, octamethylenediisocyanate, nonamethylenediisocyanate, decamethylenediisocyanate, 1,3-diisocyanatopropane, 1,4-diisocyanato-2-butene, 1,4-diisocyanato-2-fluorobutane, 1,4-diisocyanato-2,3-difluorobutane, 1,5-diisocyanato-2-pentene, 1,5-diisocyanato-2-methylpentane, 1,6-diisocyanato-2-hexene, 1,6-diisocyanato-3-hexene, 1,6-diisocyanato-3-fluorohexane, 1,6-diisocyanato-3,4-difluorohexane, toluenediisocyanate, xylenediisocyanate, tolylenediisocyanate, 1,2-bis(isocyanatomethyl)cyclohexane, 1,3-bis(isocyanatomethyl)cyclohexane, 1,4-bis(isocyanatomethyl)cyclohexane, 1,2-diisocyanatocyclohexane, 1,3-diisocyanatocyclohexane, 1,4-diisocyanatocyclohexane, dicyclohexylmethane-1,1'-diisocyanate, dicyclohexylmethane-2,2'-diisocyanate, dicyclohexylmethane-3,3'-diisocyanate, dicyclohexylmethane-4,4'-diisocyanate and isophoronediisocyanate. Other examples include, for instance, modified polyisocyanates of biuret, isocyanurate, adduct and bifunctional type, represented by the basic structure of formulas (5-1) to (5-4) (in the formulas, $R^7$ and $R^8$ denote each any hydrocarbon group).

[Chem. 75]

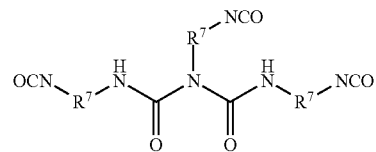

(5-1)

[Chem. 76]

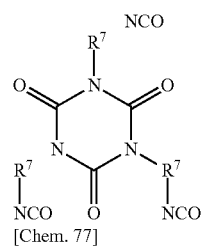

(5-2)

[Chem. 77]

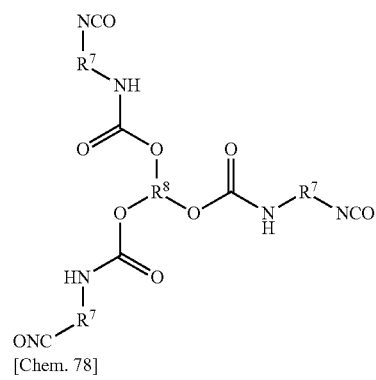

(5-3)

[Chem. 78]

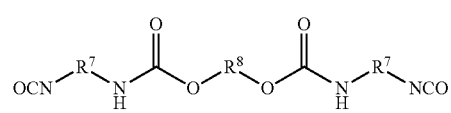

(5-4)

Preferred among the foregoing are trimethylenediisocyanate, hexamethylenediisocyanate, 1,3-bis(isocyanatomethyl)cyclohexane and dicyclohexylmethane-4,4'-diisocyanate, and modified polyisocyanates of biuret, isocyanurate, adduct and bifunctional type, represented by the basic structure of formulas (5-1) to (5-4), in terms of forming a more stable coating film.

The compound represented by formula (5) may be used singly as one type, or as two or more concurrent types in any combinations and ratios. The blending amount of the compound represented by formula (5) with respect to the total nonaqueous electrolyte solution of the present invention is not particularly limited, and may be any blending amount so long as the effect of the present invention is not significantly impaired thereby, but the compound represented by formula (5) is present at a concentration that is ordinarily 0.01 wt % or more, preferably 0.1 wt % or more, more preferably 0.2 wt % or more, and ordinarily 5 wt % or less, preferably 4 wt % or less, and more preferably 2 wt % or less, with respect to 100 wt % of the nonaqueous electrolyte solution. If the abovementioned ranges are satisfied, the effects on output characteristic, load characteristic, low-temperature characteristic, cycle characteristic, high-temperature storage characteristic and so forth become more pronounced.

1-5. Auxiliary Agents

Besides the compound of formula (1) and so forth, the nonaqueous electrolyte battery of the present invention may use appropriate auxiliary agents, in accordance with the intended purpose. Examples of the auxiliary agents include, for instance, a cyclic carbonate having an unsaturated bond, a linear carbonate having an unsaturated bond, a cyclic carbonate having a fluorine atom, an unsaturated cyclic carbonate having a fluorine atom, an overcharge preventing agent and other auxiliary agents, as described below.

<Cyclic Carbonate Having an Unsaturated Bond>

In order to form the coating film on the negative electrode surface of the nonaqueous electrolyte battery in the nonaqueous electrolyte solution of the present invention, there can be used, in addition to the compound of formula (1), a cyclic carbonate having an unsaturated bond (hereafter also referred to as unsaturated cyclic carbonate) excluding the compound of formula (1).

The unsaturated cyclic carbonate that can be used is not particularly limited and any unsaturated cyclic carbonate can be used, so long it has a carbon-carbon double bond. Cyclic carbonates having a substituent that has an aromatic ring are included herein among unsaturated cyclic carbonates. Examples of unsaturated cyclic carbonates include, for instance, vinylene carbonates, ethylene carbonate substituted with an aromatic ring or a substituent having a carbon-carbon double bond, phenyl carbonates, vinyl carbonates, allyl carbonates or the like.

Examples of vinylene carbonates include, for instance, vinylene carbonate, methylvinylene carbonate, 4,5-dimethylvinylene carbonate, phenylvinylene carbonate, 4,5-diphenylvinylene carbonate, vinylvinylene carbonate, 4,5-divinylvinylene carbonate, allylvinylene carbonate, 4,5-diallylvinylene carbonate and the like.

Specific examples of ethylene carbonate substituted with an aromatic ring or a substituent having a carbon-carbon unsaturated bond include, for instance, vinylethylene carbonate, 4,5-divinylethylene carbonate, 4-methyl-5-vinylethylene carbonate, 4-allyl-5-vinylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, 4-methyl-5-allylethylene carbonate or the like.

Examples of particularly preferred unsaturated cyclic carbonates that can be used concomitantly with the compound of formula (1) include, for instance, vinylene carbonate, methylvinylene carbonate, 4,5-dimethylvinylene carbonate, vinylvinylene carbonate, 4,5-divinylvinylene carbonate, allylvinylene carbonate, 4,5-diallylvinylene carbonate, vinylethylene carbonate, 4,5-divinylethylene carbonate, 4-methyl-5-vinylethylene carbonate, allylethylene carbonate, 4,5-diallylethylene carbonate, 4-methyl-5-allylethylene carbonate and 4-allyl-5-vinylethylene carbonate. Using the foregoing is more appropriate, since they form a stable interface protective coating.

The molecular weight of the unsaturated cyclic carbonate is not particularly limited, and may be any molecular weight, so long as the effect of the present invention is not significantly impaired thereby. The molecular weight is preferably 50 or greater and 250 or smaller. Within those ranges, the solubility of the unsaturated cyclic carbonate towards the nonaqueous electrolyte solution can be readily secured, and the effect of the present invention is readily brought out. The molecular weight of the unsaturated cyclic carbonate is more preferably 80 or greater and more preferably 150 or smaller.

The method for producing the unsaturated cyclic carbonate is not particularly limited, and the unsaturated cyclic carbonate may be produced in accordance with an arbitrarily selected known method.

The unsaturated cyclic carbonate may be used singly as one type, or as two or more concurrent types in any combinations and ratios. The blending amount of the unsaturated cyclic carbonate is not particularly limited, and may be any blending amount, so long as the effect of the present invention is not significantly impaired thereby. The blending amount of the unsaturated cyclic carbonate is preferably 0.01 wt % or more, more preferably 0.1 wt % or more, and yet more preferably 0.2 wt % or more, and preferably 5 wt % or less, more preferably 4 wt % or less, and yet more preferably 3 wt % or less, with respect to 100 wt % of the nonaqueous electrolyte solution. Within these ranges, a sufficient enhancing effect on cycle characteristic is readily brought out in the nonaqueous electrolyte secondary battery, and drops in high-temperature storage characteristic such as drops in discharge capacity retention rate, caused by excessive gas generation amount, are readily avoided. If the blending amount is too small, the effect of the present invention may be difficult to bring out sufficiently, while if the blending amount is too large, the output and load characteristic may drop, on account of increased resistance.

<Linear Carbonate Having an Unsaturated Bond>

In order to form the coating film on the negative electrode surface of the nonaqueous electrolyte battery in the nonaqueous electrolyte solution of the present invention, there can be used, in addition to the compound of formula (1), a linear carbonate having an unsaturated bond (hereafter also referred to as unsaturated linear carbonate) excluding the compound of formula (1).

Examples of unsaturated linear carbonates include, for instance, linear carbonates having a carbon-carbon unsaturated bond, and linear carbonates substituted with a substituent having an aromatic ring.

Examples of linear carbonates having a linear hydrocarbon that has a carbon-carbon unsaturated bond include, for instance, methylvinyl carbonate, ethylvinyl carbonate, divinyl carbonate, methyl-1-propenyl carbonate, ethyl-1-propenyl carbonate, di-1-propenyl carbonate, methyl(1-methylvinyl)carbonate, ethyl(1-methylvinyl)carbonate, di(1-methylvinyl)carbonate, methyl-2-propenyl carbonate, ethyl-2-propenyl carbonate, di(2-propenyl)carbonate, 1-butenylmethyl carbonate, 1-butenylethyl carbonate, di(1-butenyl)carbonate, methyl(1-methyl-1-propenyl)carbonate, ethyl(1-methyl-1-propenyl)carbonate, di(1-methyl-1-propenyl)carbonate, methyl-1-ethylvinyl carbonate, ethyl-1-ethylvinyl carbonate, di-1-ethylvinyl carbonate, methyl(2-methyl-1-propenyl) carbonate, ethyl(2-methyl-1-propenyl) carbonate, di(2-methyl-1-propenyl)carbonate, 2-butenylmethyl carbonate, 2-butenylethyl carbonate, di-2-butenyl carbonate, methyl(1-methyl-2-propenyl)carbonate, ethyl(1-methyl-2-propenyl) carbonate, di(1-methyl-2-propenyl)carbonate, methyl(2-methyl-2-propenyl)carbonate, ethyl(2-methyl-2-propenyl)carbonate, di(2-methyl-2-propenyl)carbonate, methyl(1,2-dimethyl-1-propenyl)carbonate, ethyl(1,2-dimethyl-1-propenyl)carbonate, di(1,2-dimethyl-1-propenyl)carbonate, ethynylmethyl carbonate, ethylethynyl carbonate, diethynyl carbonate, methyl-1-propynyl carbonate, ethyl-1-propynyl carbonate, di-1-propynyl carbonate, methyl-2-propynyl carbonate, ethyl-2-propynyl carbonate, di-2-propynyl carbonate, 1-butynylmethyl carbonate, 1-butynylethyl carbonate, di-1-butynyl carbonate, 2-butynylmethyl carbonate, 2-butynylethyl carbonate, di-2-butynyl carbonate, methyl(1-methyl-2-propynyl)carbonate, ethyl(1-methyl-2-propynyl)carbonate, di(1-methyl-2-propynyl)carbonate, 3-butynylmethyl carbonate, 3-butynylethyl carbonate, di-3-butynyl carbonate, methyl(1,1-dimethyl-2-propynyl)carbonate, ethyl(1,1-dimethyl-2-propynyl)carbonate, bis(1,1-dimethyl-2-propynyl)carbonate, methyl(1,3-dimethyl-2-propynyl)carbonate, ethyl(1,3-dimethyl-2-propynyl)carbonate, bis(1,3-dimethyl-2-propynyl)carbonate, methyl(1,1,3-trimethyl-2-propynyl)carbonate, ethyl(1,1,3-trimethyl-2-propynyl)carbonate, bis(1,1,3-trimethyl-2-propynyl)carbonate or the like.

Examples of linear carbonates substituted with a substituent having an aromatic ring include, for instance, methylphenyl carbonate, ethylphenyl carbonate, phenylvinyl carbonate, allylphenyl carbonate, ethynylphenyl carbonate, 2-propenylphenyl carbonate, diphenyl carbonate, methyl(2-methylphenyl)carbonate, ethyl(2-methylphenyl)carbonate, (2-methylphenyl)vinyl carbonate, allyl(2-methylphenyl)carbonate, ethynyl(2-methylphenyl)carbonate, 2-propenyl(2-methylphenyl)carbonate, di(2-methylphenyl)carbonate, methyl(3-methylphenyl)carbonate, ethyl(3-methylphenyl)carbonate, (3-methylphenyl)vinyl carbonate, allyl(3-methylphenyl)carbonate, ethynyl(3-methylphenyl)carbonate, 2-propenyl(3-methylphenyl)carbonate, di(3-methylphenyl)carbonate, methyl(4-methylphenyl)carbonate, ethyl(4-methylphenyl)carbonate, (4-methylphenyl)vinyl carbonate, allyl(4-methylphenyl)carbonate, ethynyl(4-methylphenyl)carbonate, 2-propenyl(4-methylphenyl)carbonate, di(4-methylphenyl)carbonate, benzylmethyl carbonate, benzylethyl carbonate, benzylphenyl carbonate, benzylvinyl carbonate, benzyl-2-propenyl carbonate, benzylethynyl carbonate, benzyl-2-propynyl carbonate, dibenzyl carbonate, methyl(2-cyclohexylphenyl)carbonate, methyl(3-cyclohexylphenyl)carbonate, methyl(4-cyclohexylphenyl)carbonate, ethyl(2-cyclohexylphenyl)carbonate, di(2-cyclohexylphenyl)carbonate or the like.

Preferred among the foregoing, as the unsaturated linear carbonate, are methylvinyl carbonate, ethylvinyl carbonate, divinyl carbonate, allylmethyl carbonate, allylethyl carbonate, diallyl carbonate, 2-propynylmethyl carbonate, 2-propynylethyl carbonate, 1-methyl-2-propynylmethyl carbonate, 1-methyl-2-propynylethyl carbonate, 1,1-dimethyl-2-propynylmethyl carbonate, dipropynyl carbonate, 2-butynylmethyl carbonate, 1-methyl-2-butynylmethyl carbonate, 1,1-dimethyl-2-butynylmethyl carbonate, dibutynyl carbonate, methylphenyl carbonate, ethylphenyl carbonate, phenylvinyl carbonate, allylphenyl carbonate, diphenyl carbonate, benzylmethyl carbonate, benzylethyl carbonate, benzylphenyl carbonate, allylbenzyl carbonate, dibenzyl carbonate, 2-propynylphenyl carbonate and 2-butynylphenyl carbonate, and particularly preferably methylvinyl carbonate, ethylvinyl carbonate, divinyl carbonate, allylmethyl carbonate, allylethyl carbonate, diallyl carbonate, 2-propynylmethyl carbonate, 1-methyl-2-propynylmethyl carbonate, 1,1-dimethyl-2-propynylmethyl carbonate, dipropynyl carbonate, 2-butynylmethyl carbonate, 1-methyl-2-butynylmethyl carbonate, 1,1-dimethyl-2-butynylmethyl carbonate, dibutynyl carbonate, methylphenyl carbonate, ethylphenyl carbonate and diphenyl carbonate. Using the foregoing is more appropriate, since they form a stable interface protective coating.

The unsaturated linear carbonate may be used singly as one type, or as two or more concurrent types in any combinations and ratios.

<Fluorinated Unsaturated Cyclic Carbonate>

As the fluorinated cyclic carbonate there is preferably used a cyclic carbonate having an unsaturated bond and a fluorine atom (hereafter also referred to as fluorinated unsaturated cyclic carbonates). The number of fluorine atoms in the fluorinated unsaturated cyclic carbonate is not particularly limited, so long as it is 1 or more. The number of fluorine atoms is ordinarily 6 or fewer, preferably 4 or fewer and most preferably 1 or 2.

Examples of the fluorinated unsaturated cyclic carbonate include, for instance, a fluorinated vinylene carbonate derivative or a fluorinated ethylene carbonate derivative substituted with an aromatic ring or a substituent having a carbon-carbon double bond.

Examples of fluorinated vinylene carbonate derivatives include, for instance, 4-fluorovinylene carbonate, 4-fluoro-5-methylvinylene carbonate, 4-fluoro-5-phenylvinylene carbonate, 4-allyl-5-fluorovinylene carbonate, 4-fluoro-5-vinylvinylene carbonate and the like.

Examples of fluorinated ethylene carbonate derivatives substituted with an aromatic ring or with a substituent having a carbon-carbon unsaturated bond include, for instance, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-5-vinylethylene carbonate, 4,4-difluoro-5-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate, 4-fluoro-4-phenylethylene carbonate, 4-fluoro-5-phenylethylene carbonate, 4,4-difluoro-5-phenylethylene carbonate, 4,5-difluoro-4-phenylethylene carbonate and the like.

Examples of particularly preferred fluorinated unsaturated cyclic carbonates that can be used concomitantly with the compound of formula (1) include, for instance, 4-fluorovinylene carbonate, 4-fluoro-5-methylvinylene carbonate, 4-fluoro-5-vinylvinylene carbonate, 4-allyl-5-fluorovinylene carbonate, 4-fluoro-4-vinylethylene carbonate, 4-fluoro-4-allylethylene carbonate, 4-fluoro-5-vinylethylene carbonate, 4-fluoro-5-allylethylene carbonate, 4,4-difluoro-5-vinylethylene carbonate, 4,4-difluoro-5-allylethylene carbonate, 4,5-difluoro-4-vinylethylene carbonate, 4,5-difluoro-4-allylethylene carbonate, 4-fluoro-4,5-divinylethylene carbonate, 4-fluoro-4,5-diallylethylene carbonate, 4,5-difluoro-4,5-divinylethylene carbonate, 4,5-difluoro-4,5-diallylethylene carbonate or the like. Using the foregoing is more appropriate, since they form a stable interface protective coating.

The molecular weight of the fluorinated unsaturated cyclic carbonate is not particularly limited, and may be any molecular weight, so long as the effect of the present invention is not significantly impaired thereby. The molecular weight is preferably 50 or greater and 250 or smaller. Within those ranges, the solubility of the fluorinated cyclic carbonate towards the nonaqueous electrolyte solution can be readily secured, and the effect of the present invention is readily brought out. The method for producing the fluorinated unsaturated cyclic carbonate is not particularly limited, and the fluorinated unsaturated cyclic carbonate may be produced in accordance with an arbitrarily selected known method. The molecular weight is more preferably 80 or greater, and more preferably 150 or less.

The fluorinated unsaturated cyclic carbonate may be used singly as one type, or as two or more concurrent types in any combinations and ratios. The blending amount of the fluorinated unsaturated cyclic carbonate is not particularly limited, and may be any blending amount, so long as the effect of the present invention is not significantly impaired thereby. The blending amount of the fluorinated unsaturated cyclic carbonate is preferably 0.01 wt % or more, more preferably 0.1 wt % or more, and yet more preferably 0.2 wt % or more, and preferably 5 wt % or less, more preferably 4 wt % or less, and yet more preferably 3 wt % or less with respect to 100 wt % of the nonaqueous electrolyte solution. Within these ranges, a sufficient enhancing effect on cycle characteristic is readily brought out in the nonaqueous electrolyte secondary battery, and drops in high-temperature storage characteristic such as drops in discharge capacity retention rate, caused by excessive gas generation amount, are readily avoided. If the blending amount is too small, the effect of the present invention may be difficult to bring out sufficiently, while if the blending amount is too large, the output and load characteristic may drop, on account of increased resistance.

<Overcharge Preventing Agent>

An overcharge preventing agent can be used in the nonaqueous electrolyte solution of the present invention with a view to effectively suppressing bursting/ignition of the battery, for instance in an overcharged state of the nonaqueous electrolyte battery.

Examples of overcharge preventing agents include, for instance, aromatic compounds such as biphenyl, alkyl biphenyl, terphenyl, partially hydrogenated products of terphenyl, cyclohexyl benzene, t-butylbenzene, t-amylbenzene, diphenyl ether, dibenzofuran or the like; partially fluorinated products of the abovementioned aromatic compounds, for instance 2-fluorobiphenyl, o-cyclohexylfluorobenzene, p-cyclohexylfluorobenzene or the like; or fluorine-containing anisole compounds such as 2,4-difluoroanisole, 2,5-difluoroanisole, 2,6-difluoroanisole, 3,5-difluoroanisole or the like. Preferred aromatic compounds among the foregoing are biphenyl, alkylbiphenyl, terphenyl, partially hydrogenated products of terphenyl, cyclohexylbenzene, t-butylbenzene, t-amylbenzene, diphenyl ether, di-benzofuran or the like. The foregoing may be used as a single type or concomitantly as two or more types. When using two or more types concomitantly, there is preferably used, in particular, a combination of cyclohexylbenzene and t-butylbenzene or t-amylbenzene; or at least one compound selected from among aromatic compounds containing no oxygen atoms, for instance, biphenyl, alkylbiphenyl, terphenyl, partially hydrogenated products of terphenyl, cyclohexylbenzene, t-butylbenzene, t-amylbenzene or the like, and at least one compound selected from among oxygen-containing aromatic compounds such as diphenyl ether, dibenzofuran or the like, in terms of striking a balance between the overcharge prevention characteristic and high-temperature storage characteristic.

The blending amount of the overcharge preventing agent is not particularly limited, and may be any blending amount, so long as the effect of the present invention is not significantly impaired thereby. The overcharge preventing agent is present, preferably, as 0.1 wt % or more, and 5 wt % or less, with respect to 100 wt % of the nonaqueous electrolyte solution. Within such a range, the effect elicited by the overcharge preventing agent is readily brought out at a sufficient level, and impairment of battery characteristics, for instance high-temperature storage characteristic, is readily avoided. The content of overcharge preventing agent is more preferably 0.2 wt % or greater, yet more preferably 0.3 wt % or greater, particularly preferably 0.5 wt % or greater, and more preferably 3 wt % or smaller, yet more preferably 2 wt % or smaller.

<Other Auxiliary Agents>

Other known auxiliary agents may be used in the non-aqueous electrolyte solution of the present invention. Examples of other auxiliary agents include, for instance, carbonate compounds such as erythritan carbonate, spirobis-dimethylene carbonate, methoxyethyl-methyl carbonate and the like; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, phenylsuccinic anhydride and the like; spiro compounds such as 2,4,8,10-tetraoxaspiro[5.5]undecane and 3,9-divinyl-2,4,8,10-tetraoxaspiro[5.5]undecane; sulfur-containing compounds such as ethylene sulfite, methyl fluorosulfonate, ethyl fluorosulfonate, methyl methanesulfonate, ethyl methanesulfonate, busulfan, sulfolene, diphenyl sulfone, N,N-dimethylmethane sulfoneamide and N,N-diethylmethanesulfoneamide; nitrogen-containing compounds such as 1-methyl-2-pyrrolidinone, 1-methyl-2-piperidone, 3-methyl-2-oxazolidinone, 1,3-dimethyl-2-imidazolidinone and N-methyl succinimide; hydrocarbon compounds such as heptane, octane, nonane, decane, cycloheptane or the like; and fluorine-containing aromatic compounds such as fluorobenzene, difluorobenzene, hexafluorobenzene, benzotrifluoride or the like. These may be used singly as one type, or as two or more concurrent types. The capacity retention characteristic after storage at high-temperature, as well as the cycle characteristic, can be enhanced through the addition of such auxiliary agents.

The blending amount of these other auxiliary agents is not particularly limited, and may be any blending amount, so long as the effect of the present invention is not significantly impaired thereby. The content of other auxiliary agents is preferably 0.01 wt % or more, and 5 wt % or less, with respect to 100 wt % of the nonaqueous electrolyte solution. Within such a range, the effect elicited by the other auxiliary agents is readily brought out at a sufficient level, and impairment of battery characteristics such as high-load discharge characteristic is readily avoided. The blending amount of the other auxiliary agents is more preferably 0.1 wt % or more, yet more preferably 0.2 wt % or more, and more preferably 3 wt % or less, and yet more preferably 1 wt % or less.

The nonaqueous electrolyte solution described above encompasses a nonaqueous electrolyte solution that is present inside the nonaqueous electrolyte battery that is disclosed in the present invention. Specific such instances include an instance where the constituent elements of the nonaqueous electrolyte solution such as the lithium salt, the solvent, the auxiliary agents and so forth are synthesized separately, and there is prepared a nonaqueous electrolyte solution out of the substantially isolated constituent elements, and then the nonaqueous electrolyte solution is poured into a battery assembled separately, to yield a nonaqueous electrolyte solution in a nonaqueous electrolyte battery; an instance where the constituent elements of the nonaqueous electrolyte solution of the present invention are provided individually in the battery, and are then mixed within the battery, to yield as a result a composition identical to that of the nonaqueous electrolyte solution of the present invention; or an instance where the compounds that make up the nonaqueous electrolyte solution of the present invention are generated in the nonaqueous electrolyte battery, to yield thereby a composition identical to that of the nonaqueous electrolyte solution of the present invention.

2. Battery Configuration

The nonaqueous electrolyte solution of the present invention is appropriate for use as an electrolyte solution for secondary batteries, for instance lithium secondary batteries, from among nonaqueous electrolyte batteries. A nonaqueous electrolyte battery that uses the nonaqueous electrolyte solution of the present invention is explained next.

The nonaqueous electrolyte secondary battery of the present invention can have a known structure, and is typically provided with a negative electrode and a positive electrode that can absorb and release ions (for instance, lithium ions), plus the above-described nonaqueous electrolyte solution of the present invention.

2-1. Negative Electrode

The negative electrode active material that is used in the negative electrode is explained next. The negative electrode active material is not particularly limited, so long as it is capable of electrochemically absorbing and releasing lithium ions. Specific examples thereof include, for instance, carbonaceous materials, alloy-based materials, lithium-containing metal complex oxide materials and the like. The foregoing may be used singly as one type, or concomitantly in the form of any combination of two or more types.

<Negative Electrode Active Material>

Examples of the negative electrode active material include, for instance, carbonaceous materials, alloy-based materials, lithium-containing metal complex oxide materials and the like.

Preferably, the carbonaceous material that is used as the negative electrode active material is selected from among:

(1) natural graphite;

(2) a carbonaceous material obtained as a result of one or several heating treatments, at a temperature ranging from 400 to 3200° C., of an artificial carbonaceous substance and an artificial graphitic substance;

(3) a carbonaceous material such that the negative electrode active material layer comprises at least two or more carbonaceous substances of dissimilar crystallinity, and/or a carbonaceous material having interfaces at which such carbonaceous substances of dissimilar crystallinity come into contact with each other;

(4) a carbonaceous material such that the negative electrode active material layer comprises at least two or more carbonaceous substances having dissimilar orientation, and/or has interfaces at which such carbonaceous substances of dissimilar orientation come into contact with each other, since in that case a good balance is struck between initial irreversible capacity and high current density charge-discharge characteristic. The carbonaceous materials of (1) to (4) may be used singly as one type, or as two or more concurrent types in any combinations and ratios.

Examples of the artificial carbonaceous substance and artificial graphitic substance of (2) include, for instance, natural graphite, coal-based coke, petroleum coke, coal-based pitch, petroleum pitch, and products obtained as a result of an oxidation treatment of the foregoing pitches; needle coke, pitch coke and carbon materials resulting from partial graphitization thereof; furnace black, acetylene black and organic pyrolysis products of pitch-based carbon fibers or the like; a carbonizable organic material or a carbonized product thereof; or a solution resulting from dissolving a carbonizable organic material in a low-molecular weight organic solvent such as benzene, toluene, xylene, quinoline, n-hexane or the like, or a carbonized product of the solution.

The alloy-based material that is used as the negative electrode active material is not particularly limited so long as it is capable of absorbing and releasing lithium, and may be any from among single lithium, or a single metal or alloy that forms a lithium alloy, or a compound, for instance an oxide, carbide, nitride, silicide, sulfide or phosphide of the foregoing. The single metal and alloy that forms a lithium alloy is preferably a material comprising a metal/semimetal element (excluding carbon) of groups 13 and 14, more preferably a single metal such as aluminum, silicon or tin (hereafter, also referred to as "specific metal elements" for short), as well as alloys or compounds that comprise the foregoing atoms. These metals be used singly as one type, or as two or more concurrent types in any combinations and ratios.

Examples of the negative electrode active material having at least one type of atom selected from among the specific metal elements include, for instance, a single metal of any one type of the specific metal elements; alloys comprising two or more types of the specific metal elements; alloys that comprise one type or two or more types of the specific metal elements plus another one type or two or more types of metal elements; compounds containing one type or two or more types of the specific metal elements; as well as complex compounds thereof, such as oxides, carbides, nitrides, silicides, sulfides or phosphides. The capacity of the battery can be increased through the use of these single metals, alloys and metal compounds as the negative electrode active material.

Examples of the complex compounds include, for instance, compounds wherein a plurality of types of elements, for instance single metals, alloys and non-metallic elements, are bonded to each other in complex manners. Specifically, in the case of silicon and tin, for instance, there can be used alloys of these elements with metals that do not act as a negative electrode. In the case of tin, for instance, there can be used a complex compound that comprises 5 to 6 elements including a combination of a metal, other than tin and silicon, that acts as a negative electrode, a metal that does not act as a negative electrode, and a non-metallic element.

From among the abovementioned negative electrode active materials there is preferably used, for instance, any one single metal of the specific metal elements, or an alloy of two or more types of the specific metal elements, or an oxide, carbide or nitride of the specific metal elements, on account of the substantial capacity per unit mass that is afforded in the resulting battery. In particular, a single metal, alloy, oxide, carbide, nitride or the like of silicon and/or tin is preferably used in terms of capacity per unit mass and environmental impact.

The lithium-containing metal complex oxide material used as the negative electrode active material is not particularly limited, so long as it is capable of absorbing and releasing lithium, but, in terms of high current density charge-discharge characteristic, is preferably a material that contains titanium and lithium, more preferably a lithium-containing complex metal oxide material that comprises titanium, and yet more preferably a complex oxide of lithium and titanium (hereafter also referred to as "lithium titanium complex oxide" for short). In particular, there is preferably used a negative electrode active material for nonaqueous electrolyte secondary batteries that comprises a lithium-titanium complex oxide having a spinel structure, since output resistance is significantly reduced in such a case.

Preferably, lithium and/or titanium in the lithium-titanium complex oxide are preferably substituted by another metal element, for instance at least one element selected from the group consisting of Na, K, Co, Al, Fe, Ti, Mg, Cr, Ga, Cu, Zn and Nb.

Preferably, the metal oxide is a lithium-titanium complex oxide represented by formula (A), wherein $0.7 \leq x \leq 1.5$, 1.5≤y≤2.3, 0≤z≤1.6, since in that case a stable structure is achieved upon doping and de-doping of lithium ions.

$$Li_xTi_yM_zO_4 \quad (A)$$

(In formula (A), M denotes at least one element selected from the group consisting of Na, K, Co, Al, Fe, Ti, Mg, Cr, Ga, Cu, Zn and Nb).

From among the compositions represented by formula (A), particularly preferred are those wherein
(a) 1.2≤x≤1.4, 1.5≤y≤1.7, z=0
(b) 0.9≤x≤1.1, 1.9≤y≤2.1, z=0
(c) 0.7≤x≤0.9, 2.1≤y≤2.3, z=0
since a battery performance balance is achieved in such structures.

Particularly preferred representative compositions of the above compounds include $Li_{4/3}Ti_{5/3}O_4$ for (a), $Li_1Ti_2O_4$ for (b) and $Li_{4/5}Ti_{11/5}O_4$ for (c). Preferred instances of a structure where Z≠0 include $Li_{4/3}Ti_{4/3}Al_{1/3}O_4$.

<Characteristics of the Carbonaceous Material>

When using a carbonaceous material as the negative electrode active material, the carbonaceous material preferably has the following properties.

(Rhombohedral Rate)

The rhombohedral rate is obtained, in accordance with the expression below, on the basis of the proportion of rhombohedral-structure graphite layers (ABC-stacking layers) and hexagonal-structure graphite layers (AB stacking layers) as measured by X-ray wide-angle diffraction (XRD).

Rhombohedral rate(%)=integrated intensity of *ABC* (101) peak by *XRD*/*AB*(101) peak integrated intensity by *XRD*×100

The lower limit value of the rhombohedral rate of the carbonaceous material that can be used in the present invention is ordinarily 0% or more, preferably 3% or more, yet more preferably 5% or more and particularly preferably 12% or more. The upper limit value is preferably 35% or smaller, more preferably 27% or smaller, yet more preferably 24% or smaller and particularly preferably 20% or smaller. A rhombohedral rate of 0% denotes herein that no XRD peaks derived from ABC stacking layers are detected at all. A rhombohedral rate greater than 0% indicates that there is detected some XRD peak, even small, derived from ABC stacking layers.

Preferably, the rhombohedral rate lies within the abovementioned range, since in that case defects in the crystal structure of the carbonaceous material are few, reactivity with the electrolyte solution is low, consumption of electrolyte solution during cycling is low, and cycle characteristic is superior.

The XRD measurement method for working out the rhombohedral rate involved filling a 0.2 mm sample plate with graphite powder in such a manner that the graphite powder was not oriented, followed by measurement using a X-ray diffraction device (for instance, X'Pert Pro MPD, by PANalytical, CuKα rays, output 45 kV, 40 mA). The integrated intensities of the peaks are calculated, using the obtained diffraction pattern, by profile-fitting according to an asymmetrical Pearson VII function, using analysis software JADE 5.0, to work out the rhombohedral rate on the basis of the abovementioned expression.

The X-ray diffraction measurement conditions are as follows. Herein, "2θ" is the diffraction angle.
Target: Cu(Kα rays) graphite monochromator
Slit:
Soller slit: 0.04 degrees
Divergent slit: 0.5 degrees
Horizontal divergence mask: 15 mm
Scattering-preventing slit: 1 degree
Measurement range and step angle/measurement time:
(101) plane: 41 degrees≤2θ≤47.5 degrees 0.3 degrees/60 seconds
Background correction:
Interval from 42.7 to 45.5 degrees joined by a straight line, and subtracted as background.
Peak of rhombohedral-structure graphite particle layers: peak around of 43.4 degrees.
Peak of hexagonal-structure graphite particle layers: peak around of 44.5 degrees.

The method for obtaining graphite particles having a rhombohedral rate that lies within the abovementioned range is not particularly limited, and may be a production method that relies on conventional techniques. Preferably, however, the graphite particles are produced as a result of a thermal treatment at a temperature of 500° C. or higher. In particular, mechanical action in the form mainly of impact forces but also compression, friction, shear forces and the like, including interactions between particles, are exerted on the graphite particles. The rhombohedral rate prescribed in the present invention can be adjusted by varying, for instance, the intensity of the mechanical action, the treatment time, or whether or not the treatment is repeated. Particularly preferred is a surface-treatment apparatus having a rotor, with multiple blades disposed thereon, inside a casing, and wherein mechanical action in the form of impact compression, friction, shearing forces and the like is exerted, through high-speed rotation of the rotor, to the carbon material that is introduced into the apparatus. Preferably, the apparatus has a mechanism that repeatedly exerts a mechanical action on the carbon material, by causing the latter to circulate, or an apparatus having a mechanism wherein there is connected a plurality units that lack a circulation mechanism. Preferred examples of the apparatus include, for instance, a hybridization system by Nara Machinery Co., Ltd.

Preferably, a thermal treatment is additionally performed after imparting the mechanical action.

Particularly preferably, imparting of the mechanical action is followed by compositing with a carbon precursor and by a thermal treatment at a temperature of 700° C. or higher.

(X-Ray Parameters)

The carbonaceous material has a d-value (interlayer distance) of lattice planes (002 planes), as determined by X-ray diffraction in accordance with the method by the Japan Society for Promotion of Scientific Research, that is preferably 0.335 nm or greater, and is ordinarily 0.360 nm or smaller, preferably 0.350 nm or smaller, and yet more preferably 0.345 nm or smaller. The crystallite size (Lc) of the carbonaceous material, as determined by X-ray diffraction in accordance with the method of the Japan Society for Promotion of Scientific Research, is preferably 1.0 nm or greater, and yet more preferably 1.5 nm or greater.

(Volume-Average Particle Diameter)

The volume-average particle diameter of the carbonaceous material, which denotes the average particle diameter (median diameter), referred to volume, and that is worked out by laser diffraction/scattering, is ordinarily 1 µm or greater, preferably 3 µm or greater, yet more preferably 5 µm or greater, and particularly preferably 7 µm or greater, and is ordinarily 100 µm or smaller, preferably 50 µm or smaller, more preferably 40 µm or smaller, yet more preferably 30 µm or smaller, and particularly preferably 25 µm or smaller.

If the volume-average particle diameter is below the abovementioned range, irreversible capacity may increase, which may result in loss of initial battery capacity. If the volume-average particle diameter exceeds the above-mentioned range, coating surfaces are likely to be uneven during production of the electrode by coating, which is an undesirable occurrence in the battery production process.

The volume-average particle diameter is measured using a laser diffraction/scattering-type particle size distribution analyzer (LA-700, by Horiba Ltd.), by dissolving the carbon powder in a 0.2 wt % aqueous solution (about 10 mL) of polyoxyethylene (20) sorbitan monolaurate, which is a surfactant. The median diameter obtained in the measurement is defined as the volume-average particle diameter of the carbonaceous material of the present invention.

(Raman R Value, Raman Half-Width)

The Raman R value of the carbonaceous material is a value measured by argon-ion laser Raman spectroscopy, and is ordinarily 0.01 or greater, preferably 0.03 or greater, and yet more preferably 0.1 or greater, and ordinarily 1.5 or smaller, preferably 1.2 or smaller, yet more preferably 1 or smaller, and particularly preferably 0.5 or smaller.

If the Raman R value is below the abovementioned range, the crystallinity of the particle surface becomes excessively high, and there may be fewer sites for Li intercalation between layers accompanying charge and discharge. That is, charge acceptance may decrease. If the density of the negative electrode is increased through pressing, after coating onto the collector, then crystals become readily oriented in a direction parallel to the electrode plate, and the load characteristic may be impaired. In particular, if the compound according to formula (1) is concomitantly used with a negative electrode active material having a Raman R value of 0.1 or greater, then the coating film forms a good network on the negative electrode surface, and an appropriate coating film density is achieved. The storage characteristic, cycle characteristic and load characteristic can be dramatically improved as a result.

If the abovementioned range is exceeded, the crystallinity at the particle surface may drop, reactivity with the nonaqueous electrolyte solution may increase, efficiency may drop, and generation of gas may increase.

The Raman half-width of the carbonaceous material around 1580 $cm^{-1}$ is not particularly limited, and is ordinarily 10 $cm^{-1}$ or greater, preferably 15 $cm^{-1}$ or greater, and ordinarily 100 $cm^{-1}$ or smaller, preferably 80 $cm^{-1}$ or smaller, yet more preferably 60 $cm^{-1}$ or smaller and particularly preferably 40 $cm^{-1}$ or smaller.

If the Raman half-width is below the above-mentioned range, the crystallinity of the particle surface becomes excessively high, and there may be fewer sites for Li intercalation between layers accompanying charge and discharge. That is, charge acceptance may decrease. If the density of the negative electrode is increased through pressing after coating onto the collector, the crystals become readily oriented in a direction parallel to the electrode plate, then the load characteristic may be impaired. If the abovementioned range is exceeded, the crystallinity at the particle surface may drop, reactivity with the nonaqueous electrolyte solution may increase, efficiency may drop, and generation of gas may increase.

The Raman spectrum is measured using a Raman spectrometer (Raman spectrometer, by JASCO) by filling a sample, through natural dropping, into a measurement cell, and causing the cell to rotate within a plane perpendicular to an argon-ion laser beam while irradiating the sample surface in the cell with the laser beam. In the obtained Raman spectrum there is calculated the intensity ratio R ($R=I_B/I_A$) between the intensity $I_A$ of peak $P_A$ around 1580 $cm^{-1}$ and the intensity $I_B$ of peak $P_B$ around 1360 $cm^{-1}$. The Raman R value calculated in the above-described measurement is defined as the Raman R value of the carbonaceous material of the present invention. The half-width of the peak $P_A$ around 1580 $cm^{-1}$ of the obtained Raman spectrum is measured, and the measured half-width is defined as the Raman half-width of the carbonaceous material of the present invention.

The conditions of Raman measurement are as follows.
Argon-ion laser wavelength: 514.5 nm
laser power on sample: 15 to 25 mW
Resolution: 10 to 20 $cm^{-1}$
Measurement range: 1100 $cm^{-1}$ to 1730 $cm^{-1}$
Raman R value, Raman half-width analysis: background processing
Smoothing: simple average, 5-point convolution (Orientation Ratio)

The orientation ratio of the carbonaceous material is ordinarily 0.005 or greater, preferably 0.01 or greater, and yet more preferably 0.015 or greater, and ordinarily 0.67 or smaller. The high-density charge-discharge characteristic may become poorer if the orientation ratio is below the above-described range. The upper limit of the abovementioned range is the theoretical upper limit value of the orientation ratio of the carbonaceous material.

The orientation ratio is measured by X-ray diffraction after pressure-molding of a sample. A sample of 0.47 g is stuffed into a 17 mm-diameter molding machine, and is compressed at 58.8 $MN \cdot m^{-2}$, to yield a molded product that is then measured by X-ray diffraction by being set flush with the surface of a measurement sample holder, using clay. The ratio represented by (110) diffraction peak intensity/(004) diffraction peak intensity is calculated from the peak intensities of (110) diffraction and (004) diffraction for carbon. The orientation ratio as calculated in the above-described measurement is defined as the orientation ratio of the carbonaceous material of the present invention.

The X-ray diffraction measurement conditions are as follows. Herein, "2θ" is the diffraction angle.
Target: Cu(Kα rays) graphite monochromator
Slit:
Divergent slit=0.5 degrees
Light-receiving slit=0.15 mm
scattering slit=0.5 degrees
Measurement range and step angle/measurement time:
(110) plane: 75 degrees≤2θ≤80 degrees 1 degree/60 seconds
(004) plane: 52 degrees≤2θ≤57 degrees 1 degree/60 seconds (Aspect Ratio (Powder))

The aspect ratio of the carbonaceous material is ordinarily 1 or greater, and ordinarily 10 or smaller, preferably 8 or smaller and yet more preferably 5 or smaller. If the aspect ratio exceeds the abovementioned range, streaks may appear during formation of electrode plates, a homogeneous coating surface may fail to be achieved, and the charge-discharge characteristic at a high current density may be impaired. The lower limit of the abovementioned range is a theoretical lower limit value of the aspect ratio of the carbonaceous material.

The aspect ratio is measured through observation of enlarged scanning electron micrographs of the carbonaceous material particles. There are selected 50 arbitrary graphite particles fixed to the edge face of metal of thickness no greater than 50 µm. The particles are each observed three-dimensionally through rotation and tilting of a stage to which the sample is fixed; the longest length a and the shortest length b perpendicular thereto, of each carbonaceous material particle at that time, are measured, and the average value of a/b is worked out. The aspect ratio (a/b) worked out in the above-described measurement is defined as the aspect ratio of the carbonaceous material of the present invention.

<Configuration and Production Method of the Negative Electrode>

Any known method can be used to produce the electrode, so long as the effect of the present invention is not significantly impaired thereby. For instance, the binder, the solvent and, as the case may require, a thickener, a conductive material, a filler and the like, are added to the negative electrode active material, to yield a slurry that is then applied onto a collector and is dried, followed by pressing. The negative electrode can be formed thereby.

In a case where an alloy-based material is used, a method is resorted to wherein a thin film layer (negative electrode active material layer) that contains the above-described negative electrode active material is formed by vapor deposition, sputtering, plating or the like.

(Collector)

Any known collector can be used as the collector that holds the negative electrode active material. Examples of the metallic material of the collector of the negative electrode include, for instance, aluminum, copper, nickel, stainless steel, nickel-plated steel or the like, but preferably copper, in terms of cost and ease of processing.

In a case where the collector is a metallic material, the collector may be shaped, for instance, as a metal foil, metal cylinder, metal coil, metal plate, metal thin film, expanded metal, punched metal, foamed metal or the like. Preferably, the collector is a metal thin film, more preferably a copper foil, and yet more preferably a rolled copper foil obtained by rolling or an electrolytic copper foil obtained by electrolysis.

The thickness of the collector is ordinarily 1 μm or greater, preferably 5 μm or greater, and ordinarily 100 μm or smaller, preferably 50 μm or smaller. That is because the capacity of the battery as a whole may decrease if the thickness of the negative electrode collector is excessive. Conversely, battery handleability may be poor if the thickness is excessively small.

(Binder)

The binder that binds the negative electrode active material is not particularly limited, provided that it is a stable material towards the nonaqueous electrolyte solution and towards the solvent that is used during the production of the electrodes.

Specific examples thereof include, for instance, resin-based polymers such as polyethylene, polypropylene, polyethylene terephthalate, polymethyl methacrylate, aromatic polyamide, polyimide, cellulose, nitrocellulose or the like; rubber-like polymers such as SBR (styrene-butadiene rubber), isoprene rubber, butadiene rubber, fluororubber, NBR (acrylonitrile-butadiene rubber), ethylene-propylene rubber or the like; styrene-butadiene-styrene block copolymers or hydrogenated products thereof; thermoplastic elastomeric polymers such as EPDM (ethylene-propylene-diene terpolymer), styrene-ethylene-butadiene-styrene copolymers, styrene-isoprene-styrene block copolymers, or hydrogenated products thereof; hard resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride, polytetrafluoroethylene, fluorinated polyvinylidene fluoride, polytetrafluoroethylene-ethylene copolymers and the like; and polymer compositions having ionic conductivity towards alkali metal ions (in particular, lithium ions). The foregoing may be used singly as one type, or as two or more concurrent types in any combinations and ratios.

The proportion of binder in the negative electrode active material is preferably 0.1 wt % or more, yet more preferably 0.5 wt % or more, and particularly preferably 0.6 wt % or more, and preferably 20 wt % or less, more preferably 15 wt % or less, yet more preferably 10 wt % or less, and particularly preferably 8 wt % or less. If the proportion of the binder in the negative electrode active material exceeds the abovementioned range, there increases the proportion of binder that makes no contribution to battery capacity, and battery capacity may drop. If the proportion is below the abovementioned range, the strength of the negative electrode may decrease.

In a case, in particular, in which the main component of the binder is a rubber-like polymer typified by SBR, the proportion of binder in the negative electrode active material is ordinarily 0.1 wt % or more, preferably 0.5 wt % or more, yet more preferably 0.6 wt % or more, and ordinarily 5 wt % or less, preferably 3 wt % or less and yet more preferably 2 wt % or less. In a case where the main component is a fluoropolymer typified by polyvinylidene fluoride, the proportion in the negative electrode active material is ordinarily 1 wt % or more, preferably 2 wt % or more, yet more preferably 3 wt % or more, and ordinarily 15 wt % or less, preferably 10 wt % or less and yet more preferably 8 wt % or less.

(Thickener)

A thickener is ordinarily used in order to adjust the viscosity of the slurry during production of the negative electrode active material layer. The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios.

If a thickener is further used, then the proportion of thickener in the negative electrode active material is ordinarily 0.1 wt % or more, preferably 0.5 wt % or more, yet more preferably 0.6 wt % or more, and ordinarily 5 wt % or less, preferably 3 wt % or less and yet more preferably 2 wt % or less.

(Electrode Density)

The electrode structure upon formation of the negative electrode active material to yield an electrode is not particularly limited. However, the density of the negative electrode active material that is present on the collector is preferably 1 g·cm$^{-3}$ or greater, yet more preferably 1.2 g·cm$^{-3}$ or greater, a particularly preferably 1.3 g·cm$^{-3}$ or greater, and preferably 2.2 g·cm$^{-3}$ or less, more preferably 2.1 g·cm$^{-3}$ or less, yet more preferably 2.0 g·cm$^{-3}$ or less, and particularly preferably 1.9 g·cm$^{-3}$ or less. If the density of the negative electrode active material that is present on the collector exceeds the abovementioned range, negative electrode active material particles may break, initial irreversible capacity may increase, and the high-current density charge-discharge characteristic may worsen on account of lower permeability of the nonaqueous electrolyte solution in the vicinity of the interface of the collector/negative electrode active material. Below the abovementioned range, conduction between negative electrode active material particles may drop, battery resistance may increase, and capacity per unit volume may decrease.

(Thickness of the Negative Electrode Plate)

The thickness of the negative electrode plate is designed in accordance with the positive electrode plate that is used, and is not particularly limited. The thickness of the negative electrode active material layer, resulting from subtracting the thickness of the metal foil (collector) from that of the negative electrode plate, is ordinarily 15 μm or greater, preferably 20 μm or greater, more preferably 30 μm or greater, and ordinarily 300 μm or smaller, preferably 280 μm or smaller, and more preferably 250 μm or smaller.

(Surface Cover of the Negative Electrode Plate)

A surface cover may be used in which a substance having composition different from that of the surface of the negative electrode plate is deposited on the surface of the negative electrode plate. Examples of surface deposition substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; and carbonates such as lithium carbonate, calcium carbonate, magnesium carbonate and the like.

2-2. Positive Electrode

<Positive Electrode Active Material>

Positive electrode active materials that are used in the positive electrode are explained next.

(Composition)

The positive electrode active material is not particularly limited, so long as it is capable of electrochemically absorbing and releasing lithium ions, but, for instance, is preferably a substance that contains lithium and at least one transition metal. Specific examples include, for instance, lithium-transition metal complex oxides, lithium-containing transition metal phosphate compounds and the like.

Preferred examples of transition metals in lithium-transition metal complex oxides include, for instance, V, Ti, Cr, Mn, Fe, Co, Ni, Cu or the like. Specific examples include, for instance, lithium-cobalt complex oxides such a $LiCoO_2$, lithium-manganese complex oxides such as $LiMnO_2$, $LiMn_2O_4$, $Li_2MnO_4$ or the like; and lithium-nickel complex oxide such as $LiNiO_2$ or the like. In other instances, some of the transition metal atoms that are the main constituent of the lithium-transition metal complex oxide may be replaced by other metals, such as Al, Ti, V, Cr, Mn, Fe, Co, Li, Ni, Cu, Zn, Mg, Ga, Zr, Si or the like. Specific examples include, for instance, lithium-nickel-cobalt-aluminum complex oxides, lithium-cobalt-nickel complex oxides, lithium-cobalt-manganese complex oxides, lithium-nickel-manganese complex oxides and lithium-nickel-cobalt-manganese complex oxides. Preferred among the foregoing are lithium-nickel-manganese complex oxides and lithium-nickel-cobalt-manganese complex oxides, on account of the good battery characteristics that they afford.

Specific examples of substituted lithium-transition metal complex oxides include, for instance, $Li_{1+a}Ni_{0.5}Mn_{0.5}O_2$, $Li_{1+a}Ni_{0.8}Co_{0.2}O_2$, $Li_{1+a}Ni_{0.85}CO_{0.10}Al_{0.05}O_2$, $Li_{1+a}Ni_{0.33}Co_{0.33}Mn_{0.33}O_2$, $Li_{1+a}Ni_{0.45}Mn_{0.45}Co_{0.1}O_2$, $Li_{1+a}Ni_{0.475}Mn_{0.475}Co_{0.05}O_2$, $Li_{1+a}Mn_{1.8}Al_{0.2}O_4$, $Li_{1+a}Mn_2O_4$, $Li_{1+a}Mn_{1.5}Ni_{0.5}O_4$ and $xLi_2MnO_3 \cdot (1-x)Li_{1+a}MO_2$ (M=transition metal, for instance, a metal selected from the group consisting of Li, Ni, Mn and Co) and the like (where $0 < a \le 3.0$). The ratio of substituted metal element in the composition is appropriately adjusted depending on a relationship with, for instance, material costs and battery characteristics of the battery in which the substituted metal elements are used.

The lithium-containing transition metal phosphate compound can be represented by $Li_xMPO_4$ (where M=one element selected from the group consisting of transition metals of group 4 to group 11 of the fourth period of the periodic table; and x is $0<x<1.2$). Preferably, the transition metal (M) is at least one element selected from the group consisting of V, Ti, Cr, Mg, Zn, Ca, Cd, Sr, Ba, Co, Ni, Fe, Mn and Cu, more preferably at least one element selected from the group consisting of Co, Ni, Fe and Mn. Examples include, for instance, iron phosphates such as $LiFePO_4$, $Li_3Fe_2(PO_4)_3$, $LiFeP_2O_7$ or the like; cobalt phosphates such as $LiCoPO_4$; manganese phosphates such as $LiMnPO_4$; nickel phosphates such as $LiNiPO_4$; and lithium transition metal phosphate compounds wherein some of the transition metal atoms that are the main constituents of the lithium transition metal phosphate compound is substituted by another metal such as Al, Ti, V, Cr, Mn, Fe, Co, Li, Ni, Cu, Zn, Mg, Ga, Zr, Nb, Si or the like.

Suitable among the foregoing are iron phosphates such as $LiFePO_4$, $Li_3Fe_2(PO_4)_3$, $LiFeP_2O_7$ or the like, since they are unlikely to give rise to metal leaching in a high-temperature/charged state, and are inexpensive.

The abovementioned "having $Li_xMPO_4$ as a basic composition" denotes not only instances of a composition represented by that composition formula, but also instances in which some sites of Fe or the like in the crystal structure are replaced by other elements. Also, the feature "having $Li_xMPO_4$ as a basic composition" denotes not only instances of stoichiometric composition, but also instances of non-stoichiometric composition in which some elements are for instance missing. Preferred other substituting elements include, for instance, Al, Ti, V, Cr, Mn, Fe, Co, Li, Ni, Cu, Zn, Mg, Ga, Zr and Si. Substitution by the above-mentioned other elements, if any, ranges preferably from 0.1 mol % to 5 mol % yet more preferably from 0.2 mol % to 2.5 mol %.

The abovementioned positive electrode active material may be used singly as one type, or as two or more concurrent types.

The lithium transition metal-based compound powder of the present invention may have foreign elements introduced therein. The foreign element may be any one or more elements selected from among B, Na, Mg, Al, K, Ca, Ti, V, Cr, Fe, Cu, Zn, Sr, Y, Zr, Nb, Ru, Rh, Pd, Ag, In, Sn, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, Cl, Br and I. The foreign elements may be incorporated into the crystal structure of the lithium transition metal-based compound, or instead of being incorporated into the crystal structure of the lithium transition metal-based compound, may be present locally concentrated, as a single element, or in the form of a compound, at, for instance, the particle surface or the grain boundaries of the lithium transition metal-based compound.

(Surface Cover)

A surface cover may be used in which a substance having composition different from that of the surface of the positive electrode active material is deposited on the surface of the positive electrode active material. Examples of surface deposition substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; carbonates such as lithium carbonate, calcium carbonate, magnesium carbonate or the like; and carbons.

The surface deposition substances may be deposited on the positive electrode active material surface in accordance with a method that involves, for instance, dissolving or suspending the surface deposition substance in a solvent, and causing the surface deposition substance to be impregnated into/added to the positive electrode active material, followed by drying, or a method that involves dissolving or suspending a surface deposition substance precursor in a solvent, and causing the precursor to be impregnated into/added to the positive electrode active material, followed by heating or the like to elicit a reaction; or a method that involves addition of a surface deposition substance precursor to a positive electrode active material precursor, with simultaneous firing of the foregoing. In a case where carbon is to be deposited, a method may be resorted to wherein a carbonaceous substance, for instance in the form of activated carbon or the like, is mechanically deposited at a later time.

The amount of surface deposition substance is preferably, as a lower limit, 0.1 ppm or more, more preferably 1 ppm or more, yet more preferably 10 ppm or more, and, as an upper limit, is preferably 20% or less, more preferably 10% or less and yet more preferably 5% or less. The surface deposition substance allows suppressing oxidation reactions of the electrolyte solution at the positive electrode active material surface, and allows enhancing battery life. However, the effect elicited by the surface deposition substance fails to be sufficiently brought out if the deposition amount is excessively low, while if the deposition amount is excessively large, resistance may increase as a result of hindered traffic of lithium ions. The present composition ranges are accordingly preferred.

In the present invention, "positive electrode active material" denotes also a positive electrode active material such that a substance of a composition different from that of the positive electrode active material is deposited on the surface of the positive electrode active material.

(Shape)

The shape of the particles of the positive electrode active material may be, for instance, lumpy, polyhedral, spherical, oval-spherical, plate-like, needle-like or columnar, as in conventional instances. Preferred among the foregoing, however, is a spherical to oval-spherical shape in secondary particles that are formed through aggregation of primary particles. In electrochemical elements, ordinarily, the active materials in the electrodes expand and contract accompanying charge and discharge of the element. The resulting stress is likely to give rise to deterioration of the active material on account of breakage or conductive path depletion. Therefore, in order to relieve stress derived from expansion and contraction and avert thereby deterioration, an active material in which secondary particles are formed through aggregation of primary particles is preferable to a single-particle active material of primary particles alone. Herein, spherical to oval-spherical particles are preferable to particles having axial orientation, such as plate-like particles or the like, since in the former case orientation during electrode molding is low, and, accordingly, expansion and contraction of the electrodes during charge and discharge is likewise low, while, moreover, homogeneous mixing with the conductive material is likelier to be achieved during production of the electrode.

(Median Diameter $d_{50}$)

The median diameter $d_{50}$ of the particles of the positive electrode active material (secondary particle diameter in a case where secondary particles are formed through aggregation of primary particles) is preferably 0.1 µm or greater, more preferably 0.5 µm or greater, yet more preferably 1.0 µm or greater and most preferably 2 µm or greater, and, as an upper limit, is preferably 20 µm or smaller, more preferably 18 µm or smaller, yet more preferably 16 µm or smaller and most preferably 15 µm or smaller. Below the abovementioned lower limit, a high tap-density product may fail to be achieved, while if the upper limit is exceeded, diffusion of lithium into the particles takes a longer time; as a result, problems may arise in that battery performance is impaired, and streaks may be formed during production of the positive electrode of the battery, i.e. during preparation of a slurry using the active material, the conductive material, the binder and so forth, and upon coating of the slurry in the form of thin film. Fillability during production of the positive electrode can be further enhanced by mixing two or more types of positive electrode active materials having different median diameters $d_{50}$.

In the present invention, the median diameter $d_{50}$ is measured using a known laser diffraction/scattering particle size measurement instrument. In a case where LA-920, by HORIBA, is used as a particle size distribution analyzer, measurements are performed by using a 0.1 wt % aqueous solution of sodium hexametaphosphate, as the dispersion medium during measurement, and by setting the measurement refractive index to 1.24 after 5 minutes of ultrasonic dispersion.

(Average Primary Particle Size)

In a case where secondary particles are formed through aggregation of primary particles, the average primary particle size of the positive electrode active material is preferably 0.03 µm or greater, more preferably 0.05 µm or greater, yet more preferably 0.08 µm or greater, particularly preferably 0.1 µm or greater, and, as an upper limit, is preferably 5 µm or smaller, more preferably 4 µm or smaller, yet more preferably 3 µm or smaller and most preferably 2 µm or smaller. If the abovementioned upper limit is exceeded, formation of spherical secondary particles becomes difficult, powder fillability is adversely affected, and the specific surface area decreases significantly, as a result of which the likelihood of impairment of battery performance in terms of output characteristic and the like may be very high. Below the above abovementioned lower limit, by contrast, crystals are ordinarily underdeveloped, and hence problems arise in terms of, for instance, poorer charge-discharge reversibility.

In the present invention, the primary particle size is measured through observation using a scanning electron microscope (SEM). Specifically, the largest value of a section by a left-right boundary of primary particles with respect to a straight line in the horizontal direction, is worked out, in micrographs at a 10000× magnification, for 50 arbitrary primary particles. The average of the values is taken then as the primary particle size.

<Configuration and Production Method of the Positive Electrode>

The configuration of the positive electrode is explained next. In the present invention, the positive electrode is produced by forming, onto a collector a positive electrode active material layer that contains the positive electrode active material and a binder. The positive electrode that uses a positive electrode active material can be produced in accordance with ordinary methods. Specifically, the positive electrode active material and the binder, and, as the case may require, a conductive material, a thickener and the like, are dry-mixed to yield a sheet-like mixture that is then pressure-bonded against a positive electrode collector; alternatively, these materials are dissolved or dispersed in a liquid medium, to yield a slurry that is then coated onto a positive electrode collector, followed by drying, to form a positive electrode active material layer on the collector. The positive electrode can be obtained thereby.

The content of the positive electrode active material in the positive electrode active material layer is preferably 80 wt % or greater, more preferably 82 wt % or greater and particularly preferably 84 wt % or greater, and, as an upper limit, preferably 95 wt % or smaller and more preferably 93 wt % or smaller. If the content of positive electrode active material in the positive electrode active material layer is low, electric capacity may be insufficient. If the content is too high, by contrast, the strength of the positive electrode may be insufficient.

In order to increase the packing density of the positive electrode active material, the positive electrode active material layer that is obtained by coating and drying is preferably compacted using a hand press, a roller press or the like. The density of the positive electrode active material layer is, as a lower limit, preferably 1.5 g/cm$^3$ or higher, more preferably 2 g/cm$^3$, yet more preferably 2.2 g/cm$^3$ or higher, and, as an upper limit, is preferably 4.0 g/cm$^3$ or lower, more preferably 3.8 g/cm$^3$ or lower, and yet more preferably 3.6 g/cm$^3$ or lower. Above that range, there is less penetration of the electrolyte solution up to the vicinity of the collector/active material interface; also, the charge-discharge characteristic becomes poorer, and high output may fail to be obtained, in particular at high current densities. Below the abovementioned range, conduction between active material particles drops, battery resistance increases, and high output may fail to be achieved.

(Conductive Material)

Any known materials can be used as the conductive material. Specific examples thereof include, for instance, metallic materials such as copper, nickel or the like; graphite such as natural graphite, artificial graphite or the like; carbon black such as acetylene black; and carbon materials such as amorphous carbon, for instance needle coke or the like. The foregoing may be used singly as one type, or as two or more concurrent types in any combinations and ratios. The content of conductive material that is used in the positive electrode active material layer is ordinarily 0.01 wt % or more, preferably 0.1 wt % or more, more preferably 1 wt % or more and, as an upper limit, ordinarily 50 wt % or less, preferably 30 wt % or less, more preferably 15 wt % or less. If the content is lower than the abovementioned range, conduction may be insufficient. A content higher than the above-mentioned range may result in lower battery capacity.

(Binder)

The binder used to produce of the positive electrode active material layer is not particularly limited, and may be any material that is dissolved or dispersed in the liquid medium that is used during electrode production, in the case of a coating method. Specific examples thereof include, for instance, resin-based polymers such as polyethylene, polypropylene, polyethylene terephthalate, polymethyl methacrylate, polyimide, aromatic polyamide, cellulose, nitrocellulose or the like; rubber-like polymers such as SBR (styrene-butadiene rubber), NBR (acrylonitrile-butadiene rubber), fluororubber, isoprene rubber, butadiene rubber, ethylene-propylene rubber or the like; thermoplastic elastomeric polymers such as styrene-butadiene-styrene block copolymers and hydrogenated products thereof, EPDM (ethylene-propylene-diene terpolymer), styrene-ethylene-butadiene-ethylene copolymers, styrene-isoprene-styrene block copolymers, or hydrogenated products thereof; hard resin-like polymers such as syndiotactic-1,2-polybutadiene, polyvinyl acetate, ethylene-vinyl acetate copolymers, propylene-α-olefin copolymers and the like; fluoropolymers such as polyvinylidene fluoride (PVdF), polytetrafluoroethylene, fluorinated polyvinylidene fluoride, polytetrafluoroethylene-ethylene copolymers and the like; and polymer compositions having ionic conductivity towards alkali metal ions (in particular, lithium ions). These substances may be used singly as one type, or as two or more concurrent types in any combinations and ratios.

The proportion of binder in the positive electrode active material layer is ordinarily 0.1 wt % or more, preferably 1 wt % or more, and yet more preferably 3 wt % or more, and, as an upper limit, is ordinarily 80 wt % or less, preferably 60 wt % or less, yet more preferably 40 wt % or less and most preferably 10 wt % or less. If the proportion of the binder is too low, the binder may fail to sufficiently hold the positive electrode active material, the mechanical strength of the positive electrode may be insufficient, and battery performance in terms of cycle characteristic may be poorer. If the proportion of binder is excessively high, battery capacity and conduction may decrease.

(Thickener)

A thickener can be used ordinarily in order to adjust the viscosity of the slurry that is used to produce the positive electrode active material layer. If an aqueous medium is used, in particular, a slurry is preferably formed using a thickener and a latex of styrene-butadiene rubber (SBR) or the like. The thickener is not particularly limited, and specific examples thereof include, for instance, carboxymethyl cellulose, methyl cellulose, hydroxymethyl cellulose, ethyl cellulose, polyvinyl alcohol, starch oxide, phosphorylated starch, casein, as well as salts thereof. The foregoing may be used singly as one type, or as two or more concurrent types in any combinations and ratios. If a thickener is further added, then the proportion of the thickener with respect to the active material is 0.1 wt % or more, preferably 0.5 wt % or more, and more preferably 0.6 wt % or more, and, as an upper limit, is 5 wt % or less, preferably 3 wt % or less and more preferably 2 wt % or less. Coatability may become significantly poor below that range. Above that range, the proportion of active material in the positive electrode active material layer drops, which gives rise to problems such as lower battery capacity, and greater resistance between positive electrode active material particles.

(Collector)

The material of the positive electrode collector is not particularly limited, and any known material can be used. Specific examples thereof include, for instance, metallic materials such as aluminum, stainless steel, nickel plating, titanium, tantalum or the like; and carbon materials such as carbon cloth, carbon paper or the like. Aluminum is particularly preferred from among the above metallic materials.

In a case where the collector is a metallic material, the collector may be shaped, for instance, as a metal foil, metal cylinder, metal coil, metal plate, metal thin film, expanded metal, punched metal, foamed metal or the like. In the case of a carbon material, the collector may be shaped as a carbon plate, carbon thin film, carbon cylinder or the like. A metal thin film is preferred among the foregoing. The thin film may be appropriately formed as a mesh. The thickness of the thin film may be any thickness, but is ordinarily 1 μm or greater, preferably 3 μm or greater, more preferably 5 μm or greater, and, as an upper limit, is ordinarily 1 mm or smaller, preferably 100 μm or smaller and more preferably 50 μm or smaller. The thin film may fail to be strong enough, as required for a collector, if it is thinner than the abovementioned range, while handleability may be impaired if the thin film is thicker than the abovementioned range.

Preferably, a conductive aid is coated onto the surface of the collector, in terms of lowering the electron contact resistance between the collector and the positive electrode active material layer. Examples of conductive aids include, for instance, carbon and noble metals such as gold, platinum, silver or the like.

(Thickness of the Positive Electrode Plate)

The thickness of the positive electrode plate is not particularly limited. In terms of high capacity and high output, however, the thickness of the positive electrode active material layer resulting from subtracting the thickness of the metal foil (collector) from that of the positive electrode plate, has a lower limit, with respect to one face of the collector, that is preferably 10 µm or greater, more preferably 20 µm or greater, and, as an upper limit, is preferably 500 µm or smaller and more preferably 450 µm or smaller.

(Surface Cover of the Positive Electrode Plate)

A surface cover may be used in which a substance having composition different from that of the surface of the positive electrode plate is deposited on the surface of the positive electrode plate. Examples of surface-deposited substances include, for instance, oxides such as aluminum oxide, silicon oxide, titanium oxide, zirconium oxide, magnesium oxide, calcium oxide, boron oxide, antimony oxide, bismuth oxide or the like; sulfates such as lithium sulfate, sodium sulfate, potassium sulfate, magnesium sulfate, calcium sulfate, aluminum sulfate or the like; carbonates such as lithium carbonate, calcium carbonate, magnesium carbonate or the like; and carbons.

2-3. Separator

Ordinarily, a separator is interposed between the positive electrode and the negative electrode, in order to prevent short-circuits. Ordinarily, the nonaqueous electrolyte solution of the present invention is used by being impregnated into such a separator.

The material and shape of the separator are not particularly limited, and any known materials and shapes may be used, so long as the effect of the present invention is not significantly impaired thereby. Among the foregoing there are preferably used, for instance, a resin, glass fibers, inorganic materials or the like that are formed out of a stable material towards the nonaqueous electrolyte solution of the present invention, in the form of a porous sheet or nonwoven fabric-like member having excellent liquid retention.

Examples of materials of resin and glass-fiber separators include, for instance, polyolefins such as polyethylene or polypropylene, aromatic polyamide, polytetrafluoroethylene, polyether sulfone, glass filters and the like. Preferred among the foregoing are glass filters and polyolefins, and yet more preferably polyolefins. These materials may be used singly as one type, or as two or more concurrent types in any combinations and ratios.

The separator may be of any thickness, but the thickness is ordinarily 1 µm or greater, preferably 5 µm or greater, more preferably 10 µm or greater, and ordinarily 50 µm or smaller, preferably 40 µm or smaller and more preferably 30 µm or smaller. The insulation properties and mechanical strength of the separator may be impaired if the thickness thereof is excessively smaller than the abovementioned range. If the thickness is excessively greater than the abovementioned range, not only may battery performance may drop, in terms of rate characteristic and so forth, but also the energy density of the nonaqueous electrolyte secondary battery as a whole may decrease.

When using a porous separator such as a porous sheet or a nonwoven fabric, the separator may have any porosity, but the porosity is ordinarily 20% or more, preferably 35% or more, and yet more preferably 45% or more, and ordinarily 90% or less, preferably 85% or less and yet more preferably 75% or less. If the porosity is excessively smaller than the abovementioned range, membrane resistance increases, and rate characteristic tends to become poorer. If porosity is excessively greater than the abovementioned range, the mechanical strength of the separator tends to drop, and insulation properties tend to become poorer.

The separator may have any average pore diameter, but the average pore diameter is ordinarily 0.5 µm or smaller, preferably 0.2 µm or smaller and ordinarily 0.05 µm or greater. Short-circuits are likely to occur if the average pore diameter exceeds the abovementioned range. Below the abovementioned range, membrane resistance may increase, and rate characteristic may drop.

The inorganic material that is used is, for instance, an oxide such as alumina or silicon dioxide, a nitride such as aluminum nitride or silicon nitride, or a sulfate such as barium sulfate or calcium sulfate, in the form of particles or fibers.

The separator may be used in the form of a thin film of a nonwoven fabric, a woven fabric, a micro-porous film or the like. As regards thin-film shape, a thin film having a pore diameter ranging from 0.01 to 1 µm and thickness ranging from 5 to 50 µm is appropriately used. Other than the above independent thin-film shape, a separator can also be used that is obtained by forming, on the surface layer of the positive electrode and/or the negative electrode, a composite porous layer containing particles of the above-described inorganic material, using a resin binder. For instance, a porous layer can be formed, on both sides of a positive electrode, out of alumina particles such that 90%-particle size is smaller than 1 µm, using a fluororesin as a binder.

The characteristics of the separator in the nonaqueous electrolyte secondary battery can be grasped on the basis of the Gurley value. The Gurley value denotes the difficulty with which air passes in a film thickness direction, and is represented by the number of seconds that it takes for 100 ml of air to pass through the film. Therefore, a small numerical value indicates that passage is easy, whereas a large numerical value indicates that passage is difficult. That is, a small numerical value indicates good connectedness in the thickness direction of the film, whereas a large numerical value denotes poor connectedness in the thickness direction of the film. Herein, connectedness is the degree to which pores are connected to each other in the film thickness direction. The separator of the present invention can be used in many applications if the Gurley value of the separator is low. In a case where, for instance, the separator is used as a separator of a nonaqueous lithium secondary battery, the Gurley value is preferably low, since in that case lithium ions can move easily, and battery performance is superior. The separator may have any Gurley value, but the latter ranges preferably from 10 to 1000 sec/100 ml, more preferably from 15 to 800 sec/100 ml and yet more preferably from 20 to 500 sec/100 ml. In a preferred separator, the Gurley value thereof is no greater than 1000 sec/100 ml, since in that case electric resistance is substantially low.

2-4. Battery Design

<Electrode Group>

The electrode group may be a stacked structure in which the above-described separator is interposed between the above-described positive electrode plate and negative electrode plate, or a structure wherein the above-described positive electrode plate and negative electrode plate are wound spirally, with the above-described separator interposed in between. The proportion of the volume of the electrode group in the internal volume of the battery (hereafter, referred to as electrode group occupancy rate) is ordinarily 40% or more, preferably 50% or more, and ordinarily 90% or less, preferably 80% or less.

Battery capacity decreases if the electrode group occupancy rate is below the abovementioned range. If the abovementioned range is exceeded, void spaces are fewer, and when the battery reaches a high temperature, various members expand, and the internal pressure rises through increased vapor proportion of the liquid components of the electrolyte, various battery characteristics are impaired, for instance charge-discharge repetition performance and high-temperature storage, and in some instances there operates a gas release valve that relieves internal pressure to the exterior.

<Outer Case>

The material of the outer case is not particularly limited, so long as it is a substance that is stable in the nonaqueous electrolyte solution that is used. Specific examples of the material that can be used include, for instance, metals such as nickel-plated steel plate, stainless steel, aluminum or aluminum alloys, magnesium alloys or the like; or a multi-layer film (laminate film) of resin and aluminum foil. A metal such as aluminum or aluminum alloy, or a laminate film, are appropriately used from the viewpoint of achieving lighter weights.

Examples of outer cases that utilize metals include, for instance, outer cases having an airtight sealed structure resulting from welding metals together by laser welding, resistance welding, ultrasonic welding or the like. In an alternative structure, the metals may be crimped to each other with a resin-made gasket interposed in between. Examples of an outer case that utilizes the abovementioned laminate film include, for instance, outer cases having an airtight sealed structure through thermal pressure-bonding of resin layers to each other. In order to enhance sealability, a resin that is different from that of the resins used in the laminate film may be interposed between the abovementioned resin layers. In the particular case of a sealed structure resulting from thermal pressure-bonding of resin layers with interposed collecting terminals, metal and resin are joined to each other, and hence a resin having polar groups or a resin that is modified through introduction of polar groups is appropriately used as the interposed resin.

<Protective Element>

As the protective element there can be used, for instance, a PTC (positive temperature coefficient) in which resistance increases upon abnormal heat generation or upon excessive current flow, a temperature fuse, a thermistor, or a valve (current shutoff valve) that shuts off current that flows in a circuit when the internal pressure and/or internal temperature in the battery rise suddenly upon abnormal heat generation. As the protective element there is preferably selected a protective element that is in an inoperative condition during ordinary use with high current. More preferably, the battery is designed so that abnormal heat generation or thermal runaway does not occur even in the absence of the protective element.

<Outer Package>

The nonaqueous electrolyte secondary battery of the present invention is ordinarily configured by housing the above-described nonaqueous electrolyte solution, negative electrode, positive electrode, separator and so forth inside an outer package. The outer package is not particularly limited, and any known outer package can be used, so long as the effect of the present invention is not significantly impaired thereby. Specifically, the outer package may be of any material, but ordinarily there is used, for instance, nickel-plated iron, stainless steel, aluminum or alloys thereof, nickel, titanium or the like.

The shape of the outer package may be any shape. For instance the outer package may be of cylindrical type, box-like type, laminate type, coin type, large type and the like.

EXAMPLES

The present invention will be explained in more detail next based on examples and comparative examples. However, the present invention is not limited to these examples.

The compound of formula (1) used in the present examples was synthesized according to the method described below.

(Compound A)

Starting material 1) was synthesized in accordance with the method of Non-Patent Document (JOC., 56(3), 1083-1088 (1991)). Next, compound A was obtained in accordance with the method set forth in Eur. J.O.C, 2009(20), 2836-2844, using the starting material 1).

[Chem. 79]

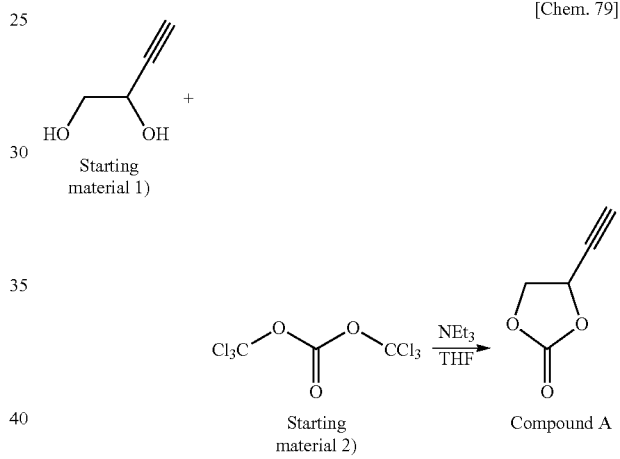

The spectral data of compound A is as follows.

TABLE 1

| Compound | Mass Spectrum | | $^1$H NMR in CDCl$_3$ |
| --- | --- | --- | --- |
| | CI, m/z | EI, m/z | ppm vs TMS |
| Compound A | | 112 [M$^+$] 52 [C$_4$H$_4$] | 2.80(1H) 4.39-4.44(1H) 4.64-4.68(1H) 5.30-5.34(1H) |

Example A

Production of a Negative Electrode

A slurry was formed by adding 100 parts by weight of an aqueous dispersion of sodium carboxymethyl cellulose (sodium carboxymethyl cellulose concentration 1 wt %), and 1 part by weight of an aqueous dispersion of styrene-butadiene rubber (styrene-butadiene rubber concentration 50 wt %), as a thickener and a binder, respectively, to 98 parts by weight of a carbonaceous material, with mixing in a disperser. The obtained slurry was coated onto a 10 μm-thick copper foil, was dried, and was rolled using a press. The rolled product was cut to a shape having a width of 30 mm and a length of 40 mm, as the size of the active material layer, and having an uncoated portion having a width of 5 mm and a length of 9 mm, to yield a negative electrode that was used in Examples 1 to 7, Comparative Examples 1 to 5 and Reference Example 1.

Production of a Positive Electrode

A slurry was formed by mixing, in an N-methyl pyrrolidone solvent, 90 wt % of $LiCoO_2$, as a positive electrode active material, 5 wt % of acetylene black, as a conductive material, and 5 wt % of polyvinylidene fluoride, as a binder. The obtained slurry was coated onto a 15 μm-thick aluminum foil, was dried, and was rolled using a press. The rolled product was cut to a shape having a width of 30 mm and a length of 40 mm, as the size of the active material layer, and having an uncoated portion having a width of 5 mm and a length of 9 mm, to yield a positive electrode that was used in Examples 1 to 7, Comparative Examples 1 to 5 and Reference Example 1.

Production of an Electrolyte Solution

A base electrolyte solution was prepared by dissolving dried $LiPF_6$ in a mixture of monofluoroethylene carbonate and dimethyl carbonate (volume ratio 30:70), to a proportion of 1 mol/L, in a dry argon atmosphere. The compounds set forth in Table 2 were mixed into this base electrolyte solution, in the proportions set forth in the table, to yield electrolyte solutions that were used in Examples 1 to 7 Comparative examples 1 to 5 and Reference Example 1.

Production of a Lithium Secondary Battery

The above-described positive electrode, negative electrode, and a polyethylene separator were sequentially stacked, in the order of negative electrode, separator and positive electrode, to produce a battery element. The battery element was inserted into a bag comprising a laminate film in which aluminum (thickness 40 μm) was covered, on both sides, by a resin layer, while causing the terminals of the positive electrode and the negative electrode to be disposed protrusively. Thereafter, each electrolyte solution set forth in Table 1 was poured into a bag, which was then vacuum-sealed, to prepare a sheet-like battery, and yield thus the batteries of Examples 1 to 7, Comparative examples 1 to 5 and Reference example 1.

Evaluation of Initial Discharge Capacity

To work out the initial discharge capacity, each nonaqueous electrolyte secondary battery was charged up to 4.1 V at constant current, at a current equivalent to 0.2 C, at a temperature of 25° C., with the nonaqueous electrolyte secondary battery sandwiched between glass plates. Thereafter, the battery was discharged down to 3 V at a 0.2 C constant current, was charged at constant current-constant voltage (hereafter also referred to as "CCCV charging") (0.05 C cut) up to 4.33 V at a current equivalent to 0.2 C, and was thereafter discharged down to 3 V at 0.2 C, to stabilize the battery. Next, the battery was subjected to CCCV charging (0.05 C cut) up to 4.3 V at 0.2 C, and was discharged again down to 3 V at 0.2 C. Herein, 1 C represents the current value for discharge of the reference capacity of the battery over 1 hour, and 0.2 C represents a current value that is 1/5 of 1 C.

Evaluation of High-Temperature Storage Characteristic

Each lithium secondary battery for which the evaluation of initial discharge capacity had been completed was subjected again to CCCV charging (0.05 C cut) to 4.3 V, and was stored thereafter at high temperature, at 85° C., for 24 hours. After sufficient cooling of the battery, the volume of the latter was measured through immersion in an ethanol bath, to work out the amount of gas generated, on the basis of changes in volume before and after storage. Next, the battery was discharged down to 3 V, at 0.2 C, at a temperature of 25° C., and the residual capacity after the high-temperature storage characteristic test was measured. The proportion of the residual capacity with respect to the initial discharge capacity was worked out and was taken as the residual capacity (%) after high-temperature storage.

TABLE 2

| | Compound represented by formula (1) | | Cyclic ester compound comprising a sulfur atom | | Compound having a cyano group | | Compound having an isocyanate group | | Other compounds | | Gas generation amount during high-temperature storage | Capacity retention rate |
|---|---|---|---|---|---|---|---|---|---|---|---|---|
| | Structural formula | Parts by weight | Structural formula | Parts by weight | Structural formula | Parts by weight | Structural formula | Parts by weight | Structural formula | Parts by weight | | |
| Example 1 | 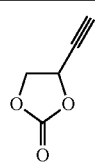 | 0.50 | PS | 0.50 | None | | None | | None | | 56.8 | 106.3 |
| Example 2 | | 0.50 | | 1.00 | None | | None | | None | | 46.3 | 107.6 |
| Example 3 | | 0.30 | None | | AdpN | 0.50 | None | | None | | 51.5 | 102.7 |
| Example 4 | | 1.00 | None | | | 0.50 | None | | None | | 45.5 | 106.3 |
| Example 5 | | 0.25 | None | | | 1.00 | HMDI | 0.25 | VC | 1.00 | 41.5 | 106.9 |

TABLE 2-continued

| | Compound represented by formula (1) | | Cyclic ester compound comprising a sulfur atom | | Compound having a cyano group | | Compound having an isocyanate group | | Other compounds | | Gas generation amount during high-temperature storage | Capacity retention rate |
|---|---|---|---|---|---|---|---|---|---|---|---|---|
| | Structural formula | Parts by weight | Structural formula | Parts by weight | Structural formula | Parts by weight | Structural formula | Parts by weight | Structural formula | Parts by weight | | |
| Example 6 | | 0.25 | None | | None | | | 0.25 | | 1.00 | 54.4 | 107.1 |
| Example 7 | | 0.50 | None | | None | | | 0.50 | None | | 37.4 | 107.8 |
| Reference Example 1 | | 0.50 | None | | None | | None | | None | | 64.6 | 105.4 |
| Comparative Example 1 | None | | None | | None | | None | | VC | 1.00 | 89.2 | 102.1 |
| Comparative Example 2 | None | | None | | AdpN | 0.50 | None | | None | | 79.8 | 96.2 |
| Comparative Example 3 | None | | PS | 0.50 | None | | | None | None | | 82.3 | 99.7 |
| Comparative Example 4 | None | | None | | None | | HMDI | 0.50 | None | | 66.2 | 105.8 |
| Comparative Example 5 | None | | None | | None | | None | | None | | 100.0 | 100.0 |

※1 PS: 1,3-propanesultone, AdpN: adiponitrile, HMDI: hexamethylenediisocyanate, VC: vinylene carbonate
※2 The gas generation amount during high-temperature storage and the capacity retention rate are relative values with respect to 100 for Comparative Example 5.

As Table 2 shows, batteries (Examples 1 to 7) that used the nonaqueous electrolyte solution according to the present invention exhibited lower gas generation amount upon high-temperature storage, and superior residual capacity after high-temperature storage, than batteries that used a nonaqueous electrolyte solution other than the nonaqueous electrolyte solution according to the present invention (Comparative Examples 1 to 5, Reference Example 1). Although the compound represented by formula (1) has the function of enhancing battery durability by protecting the electrode surface, even when used singly (Reference Example 1), the gas generation amount upon high-temperature storage and residual capacity after high-temperature storage are improved by including, together with the compound represented by formula (1), also at least one compound selected from the group consisting of a compound having a cyano group, a cyclic ester compound comprising a sulfur atom and a compound having an isocyanate group.

The underlying reason for this is deemed to be the significant increase in electrode surface durability that is brought about by incorporating at least one compound selected from the group consisting of a compound having a cyano group, a cyclic ester compound comprising a sulfur atom and a compound having an isocyanate group, into the electrode protective layer that is formed by the compound represented by formula (1), such that the increased electrode surface durability results in a remarkable enhancement of battery durability performance, as described above.

Example B

Production of a Positive Electrode

A slurry was formed by mixing, in an N-methyl pyrrolidone solvent, 90 wt % of $Li(Ni_{1/3}Mn_{1/3}Co_{1/3})O_2$, as a positive electrode active material, 5 wt % of acetylene black, as a conductive material, and 5 wt % of polyvinylidene fluoride, as a binder. The obtained slurry was applied onto a 15 μm-thick aluminum foil that had been coated beforehand with a conductive aid, was dried, and was rolled using a press. The rolled product was cut to a shape having a width of 30 mm and a length of 40 mm, as the size of the active material layer, and having an uncoated portion having a width of 5 mm and a length of 9 mm, to yield a positive electrode that was used in Examples 8 to 10, Comparative Examples 6 to 11 and Reference Example 2.

Production of an Electrolyte Solution

A base electrolyte solution was prepared by dissolving dried $LiPF_6$ in a mixture of ethylene carbonate, dimethyl carbonate and ethylmethyl carbonate (volume ratio 30:30:40), to a proportion of 1 mol/L, in a dry argon atmosphere. The compounds set forth in Table 3 were mixed into this base electrolyte solution, in the proportions set forth in the table, to yield electrolyte solutions that were used in Examples 8 to 10, Comparative Examples 6 to 11 and Reference Example 2.

Production of a Lithium Secondary Battery

Sheet-like batteries were produced in the same way as in Example <A>, but using herein the above-described positive electrode and electrolyte solutions.

Evaluation of Initial Discharge Capacity

Each nonaqueous electrolyte solution secondary battery underwent two repetitions of a cycle of being charged up to 4.1 V at constant current, at a current equivalent to 0.2 C, at a temperature of 25° C., with the battery sandwiched between glass plates, and being then discharged down to 3 V at a 0.2 C constant current. The battery was subjected to then to CCCV charging (0.05 C cut) up to 4.4 V, at a current equivalent to 0.2 C, and was thereafter discharged down to 3 V at 0.2 C, to stabilize the battery. Next, the battery was subjected to CCCV charging (0.05 C cut) up to 4.4 V at 0.2 C, and was discharged again down to 3 V at 0.2 C, to work out the initial discharge capacity.

Evaluation of High-Temperature Storage Characteristic

Each lithium secondary battery for which the evaluation of initial discharge capacity had been completed was subjected again to CCCV charging (0.05 C cut) up to 4.4 V, and was thereafter stored a high temperature of 75° C., for 5 days. After sufficient cooling of the battery, the latter was discharged down to 3 V, at 0.2 C, at a temperature of 25° C., and the residual capacity after the high-temperature storage characteristic test was measured. The proportion of the residual capacity with respect to the initial discharge capacity was worked out and was taken as the residual capacity (%) after high-temperature storage.

High-Temperature Cycle Characteristic Evaluation Test

Each battery for which initial discharge capacity evaluation was complete underwent then one cycle of being charged up to 4.4 V at a 2 C constant current, at 60° C., and being thereafter discharged down to 3.0 V at a 2 C constant current; this process was carried out over 300 cycles. The discharge capacity retention rate was worked out based on the expression (300-th cycle discharge capacity)/(1st cycle discharge capacity)×100.

1 C-Discharge Capacity Evaluation Test at 25° C. After High-Temperature Cycle Evaluation The battery, after completion of the high-temperature cycle characteristic evaluation, was subjected to CCCV charging (0.05 C cut) at 0.2 C, up to 4.4V, at a temperature of 25° C., and was thereafter discharged down to 3.0 V at 1 C constant current, at a temperature of 25° C., and the discharge capacity was worked out.

amples 8 to 10) exhibited superior high-temperature storage capacity retention rate, high-temperature cycle capacity retention rate and discharge capacity after high-temperature cycling than those batteries in which a nonaqueous electrolyte solution was used that was not the nonaqueous electrolyte solution according to the present invention (Comparative Examples 6 to 11, Reference Example 2).

In particular, no remarkable battery performance enhancement, like that afforded by the present invention, was observed even for a combination of a cyclic carbonate compound having a carbon-carbon double bond or a linear carbonate having a carbon-carbon triple bond with a cyclic ester comprising a sulfur atom (Comparative Examples 7 and 9). This indicates that the superior effect of the present invention cannot be elicited unless the compound represented by formula (1) is also used. The distinctive effect of the present invention is elicited also for a high upper-limit battery voltage of 4.4 V, as made clear from the results of Example B with respect to those of Example A where the upper-limit charging voltage was 4.3 V.

Although the compound represented by formula (1) has the function of enhancing battery durability by protecting the electrode surface, even when used singly (Reference Example 2), yet better high-temperature storage capacity retention rate, high-temperature cycle capacity retention rate and discharge capacity after high-temperature cycling can be achieved by incorporating a cyclic ester compound comprising a sulfur atom together with the compound represented by formula (1).

The underlying reason for this is deemed to be the significant increase in electrode surface durability that is

TABLE 3

|  | Compound represented by formula (1) | | Cyclic ester compound comprising a sulfur atom | | Other compounds | | | | 1C discharge |
| --- | --- | --- | --- | --- | --- | --- | --- | --- | --- |
|  | Structural formula | Parts by weight | Structural formula | Parts by weight | Structural formula | Parts by weight | Storage capacity retention rate (%) | Cycle capacity retention rate (%) | capacity after cycling |
| Example 8 | 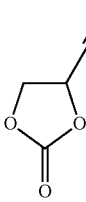 | 0.50 | PS | 1.00 | None |  | 79.3 |  | Not performed |
| Example 9 |  | 0.50 | 1-propene-1,3-sultone | 1.00 | None |  | 80.6 |  | Not performed |
| Example 10 |  | 0.50 | Ethylene diol sulfate | 0.50 | None |  | Not performed | 82.1 | 111.6 |
| Reference Example 2 |  | 0.50 | None |  | None |  | 76.5 | 80.8 | 108.8 |
| Comparative Example 6 | None |  | PS | 1.00 | None |  | 67.0 |  | Not performed |
| Comparative Example 7 | None |  | PS | 1.00 | VC | 1.00 | 71.3 |  | Not performed |
| Comparative Example 8 | None |  | Ethylene diol sulfate | 0.50 | None |  | Not performed | 73.5 | 103.4 |
| Comparative Example 9 | None |  |  | 0.50 | PMC | 0.50 | Not performed | 69.6 | 98.8 |
| Comparative Example 10 | None |  | None |  |  | 1.00 | Not performed | 70.3 | 102.0 |
| Comparative Example 11 | None |  | None |  | None |  | 68.1 | 70.7 | 100.0 |

※1 PS: 1,3-propanesultone, VC: vinylene carbonate, PMC: propargylmethyl carbonate
※2 The 1C discharge capacity after cycling is a relative value with respect to 100 for Comparative Example 11.

As Table 3 shows, the batteries that used the nonaqueous electrolyte solution according to the present invention (Examples elicited through uptake of the compound comprising a sulfur atom into the electrode protective layer that is formed by the compound represented by formula (1), whereupon the increased electrode surface durability results in a remarkable enhancement of battery durability performance, such as the above-described one.

INDUSTRIAL APPLICABILITY

The nonaqueous electrolyte solution of the present invention allows improving the initial charging capacity and input-output characteristic of a nonaqueous electrolyte secondary battery. The nonaqueous electrolyte secondary battery that uses the nonaqueous electrolyte solution of the present invention is useful in that the capacity retention rate thereof is high, the input-output performance is excellent, and the input-output characteristic is superior, also at low temperature, even after a durability test, namely a high-temperature storage test or a cycle test. As a result, the nonaqueous electrolyte solution of the present invention, and the nonaqueous electrolyte battery that uses that nonaqueous electrolyte solution, can be used in various known applications. Specific examples thereof include, for instance, notebook computers, pen-input PCs, mobile PCs, e-book players, mobile phones, portable fax machines, portable copiers, mobile printers, stereo headphones, video movies, LCD TVs, handy cleaners, portable CDs, Mini Discs, walkie-talkies, electronic organizers, calculators, memory cards, portable tape recorders, radios, back-up power supplies, motors, automobiles, motorcycles, mopeds, bicycles, lighting fixtures, toys, gaming devices, clocks, electric tools, strobes, cameras, power sources for load leveling, and power sources for natural energy storage.

The invention has been described in detail and with reference to specific embodiments thereof, it will be apparent to one skilled in the art that various changes and modifications can be made therein without departing from the spirit and scope thereof.

The invention claimed is:

1. A nonaqueous electrolyte solution, comprising a lithium salt and a nonaqueous solvent that dissolves the lithium salt, wherein the nonaqueous electrolyte solution comprises 0.001 to 30 wt % of a compound represented by formula (1) and 0.001 to 5 wt % of a compound having a cyano group represented by formula (3):

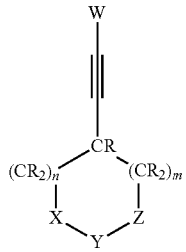
(1)

wherein

X and Z, which may be identical or different, represent $CR'_2$, C=O, C=N—R', C=P—R', O, S, N—R' and P—R';

Y represents $CR^1_2$, C=O, S=O, S(=O) P(=O)—$R^2$ and P(=O)—$OR^3$;

R and $R^1$, which may be identical or different, are each hydrogen, a halogen, a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom;

$R^2$ is a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom;

$R^3$ is Li, $NR^4_4$, a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom;

$R^4$ are mutually identical or different and are a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom; and n and m are 0 or 1;

wherein adjacent endocyclic carbons may form further bonds with each other, whereupon respective R of the carbons is decreased by one; and W is hydrogen, a halogen, a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom,

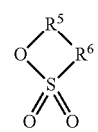
(3)

wherein

U is a C1 to C10 V-valent organic group comprising an atom selected from the group consisting of carbon atom, hydrogen atom, nitrogen atom, oxygen atom, sulfur atom, phosphorus atom and halogen atom; and V is an integer from 1 to 3

(4)

(5).

2. The nonaqueous electrolyte solution according to claim 1, wherein said compound represented by formula (1) is a compound represented by formula (2):

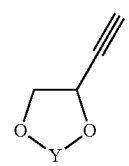
(2)

wherein Y represents C=O, S=O, S(=O)$_2$, P(=O)—$R^2$ and P(=O)—$OR^3$;

$R^2$ is a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom;

$R^3$ is Li, $NR^4_4$, a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom; and $R^4$, which are mutually identical or different, are a C1 to C20 saturated aliphatic hydrocarbon group optionally having a halogen atom, a C1 to C20 unsaturated aliphatic hydrocarbon group optionally having a halogen atom, or a C1 to C20 aromatic hydrocarbon group optionally having a halogen atom.

3. The nonaqueous electrolyte solution according to claim 1, wherein said compound having a cyano group is a compound represented by $NC-(CH_2)_n-CN$ (n=2 to 6).

4. The nonaqueous electrolyte solution according to claim 1, comprising at least one compound selected from the group consisting of a cyclic carbonate having a double bond and a cyclic carbonate having a fluorine atom.

5. A nonaqueous electrolyte battery, comprising a negative electrode and a positive electrode that are capable of absorbing and releasing lithium ions, and the nonaqueous electrolyte solution according to claim 1.

6. A nonaqueous electrolyte battery, comprising a negative electrode and a positive electrode that are capable of absorbing and releasing lithium ions, and the nonaqueous electrolyte solution according to claim 2.

7. A nonaqueous electrolyte battery, comprising a negative electrode and a positive electrode that are capable of absorbing and releasing lithium ions, and the nonaqueous electrolyte solution according to claim 3.

8. A nonaqueous electrolyte battery, comprising a negative electrode and a positive electrode that are capable of absorbing and releasing lithium ions, and the nonaqueous electrolyte solution according to claim 4.

* * * * *

UNITED STATES PATENT AND TRADEMARK OFFICE
CERTIFICATE OF CORRECTION

PATENT NO. : 9,553,333 B2
APPLICATION NO. : 13/842473
DATED : January 24, 2017
INVENTOR(S) : Hiroyuki Tokuda et al.

It is certified that error appears in the above-identified patent and that said Letters Patent is hereby corrected as shown below:

In the Claims

Column 141, Line 60, "$CR'_2$, C=O, C=N—R', C=P—R', O, S, N—R' and" should read -- $CR^1_2$, C=O, C=N—$R^1$, C=P—$R^1$, O, S, N—$R^1$ and --.

Line 61, "P—R'" should read -- P—$R^1$ --.

Line 62, "Y represents $CR^1_2$, C=O, S(=O) P(=O)—$R^2$" should read -- Y represents $CR^1_2$, C=O, S(=O)$_2$, P(=O)—$R^2$ --.

Signed and Sealed this
Sixth Day of June, 2017

Michelle K. Lee
*Director of the United States Patent and Trademark Office*